(12) United States Patent
Fields et al.

(10) Patent No.: US 10,106,083 B1
(45) Date of Patent: **\*Oct. 23, 2018**

(54) VEHICULAR WARNINGS BASED UPON PEDESTRIAN OR CYCLIST PRESENCE

(71) Applicant: STATE FARM MUTUAL AUTOMOBILE INSURANCE COMPANY, Bloomington, IL (US)

(72) Inventors: Brian Mark Fields, Normal, IL (US); Steven C. Cielocha, Bloomington, IL (US); Jacob J. Alt, Downs, IL (US); Laura Anne Uphoff, Normal, IL (US); Leo Nelson Chan, Normal, IL (US); Mohamed A. Wazeer, Normal, IL (US); Kristopher Keith Gaudin, Bloomington, IL (US); Justin Davis, Normal, IL (US); Nathan W. Baumann, Bloomington, IL (US); Giles Roll, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,974

(22) Filed: Nov. 10, 2017

Related U.S. Application Data

(63) Continuation of application No. 15/241,849, filed on Aug. 19, 2016, now Pat. No. 9,868,394.

(Continued)

(51) Int. Cl.
*B60Q 9/00* (2006.01)

(52) U.S. Cl.
CPC .................. *B60Q 9/008* (2013.01)

(58) Field of Classification Search
CPC ..................................... B60Q 9/008
See application file for complete search history.

(56) References Cited

U.S. PATENT DOCUMENTS

| 4,218,763 A | 8/1980 | Kelley et al. |
| 4,386,376 A | 5/1983 | Takimoto et al. |

(Continued)

FOREIGN PATENT DOCUMENTS

| DE | 102010001006 A1 | 7/2011 |
| EP | 700009 A2 | 3/1996 |

(Continued)

OTHER PUBLICATIONS

"Driverless Cars . . . The Future is Already Here", AutoInsurance Center, downloaded from the Internet at: <http://www.autoinsurancecenter.com/driverless-cars...the-future-is-already-here.htm> (2010; downloaded on Mar. 27, 2014).

(Continued)

*Primary Examiner* — Leon Flores
(74) *Attorney, Agent, or Firm* — Marshall, Gerstein & Borun LLP

(57) ABSTRACT

Systems and methods are described for providing alerts. In various aspects, sensor data is received at one or more sensors associated with a vehicle, where the sensor data defines an electronic vehicle environment that indicates an electronic location of the vehicle. An electronic pedestrian or cyclist location is identified within the electronic vehicle environment, which is determined by a mobile device associated with a pedestrian or cyclist. Where a determination is made that the pedestrian or cyclist meets predetermined alert criteria based upon the electronic vehicle location and the electronic pedestrian or cyclist location, an alert is generated (Continued)

that indicates the presence of the pedestrian or cyclist within the vicinity of the vehicle. The alert is presented on a display screen.

20 Claims, 17 Drawing Sheets

Related U.S. Application Data

(60) Provisional application No. 62/369,563, filed on Aug. 1, 2016, provisional application No. 62/369,537, filed on Aug. 1, 2016, provisional application No. 62/369,577, filed on Aug. 1, 2016, provisional application No. 62/369,531, filed on Aug. 1, 2016, provisional application No. 62/369,552, filed on Aug. 1, 2016, provisional application No. 62/367,474, filed on Jul. 27, 2016, provisional application No. 62/367,467, filed on Jul. 27, 2016, provisional application No. 62/367,479, filed on Jul. 27, 2016, provisional application No. 62/367,460, filed on Jul. 27, 2016, provisional application No. 62/367,466, filed on Jul. 27, 2016, provisional application No. 62/367,470, filed on Jul. 27, 2016, provisional application No. 62/296,839, filed on Feb. 18, 2016, provisional application No. 62/262,671, filed on Dec. 3, 2015, provisional application No. 62/211,337, filed on Aug. 28, 2015.

(56) References Cited

U.S. PATENT DOCUMENTS

| | | |
|---|---|---|
| 4,565,997 A | 1/1986 | Seko et al. |
| 4,833,469 A | 5/1989 | David |
| 5,363,298 A | 11/1994 | Survanshi et al. |
| 5,367,456 A | 11/1994 | Summerville et al. |
| 5,368,484 A | 11/1994 | Copperman et al. |
| 5,436,839 A | 7/1995 | Dausch et al. |
| 5,499,182 A | 3/1996 | Ousborne |
| 5,515,026 A | 5/1996 | Ewert |
| 5,626,362 A | 5/1997 | Mottola |
| 5,797,134 A | 8/1998 | McMillan et al. |
| 5,835,008 A | 11/1998 | Colemere, Jr. |
| 5,983,161 A | 11/1999 | Lemelson et al. |
| 6,031,354 A | 2/2000 | Wiley et al. |
| 6,064,970 A | 5/2000 | McMillan et al. |
| 6,067,488 A | 5/2000 | Tano |
| 6,141,611 A | 10/2000 | Mackey et al. |
| 6,246,933 B1 | 6/2001 | Bague |
| 6,253,129 B1 | 6/2001 | Jenkins et al. |
| 6,285,931 B1 | 9/2001 | Hattori et al. |
| 6,298,290 B1 | 10/2001 | Abe et al. |
| 6,313,749 B1 | 11/2001 | Horne et al. |
| 6,400,835 B1 | 6/2002 | Lemelson et al. |
| 6,473,000 B1 | 10/2002 | Secreet et al. |
| 6,477,117 B1 | 11/2002 | Narayanaswami et al. |
| 6,553,354 B1 | 4/2003 | Hausner et al. |
| 6,556,905 B1 | 4/2003 | Mittelsteadt et al. |
| 6,570,609 B1 | 5/2003 | Heien |
| 6,661,345 B1 | 12/2003 | Bevan et al. |
| 6,704,434 B1 | 3/2004 | Sakoh et al. |
| 6,795,759 B2 | 9/2004 | Doyle |
| 6,832,141 B2 | 12/2004 | Skeen et al. |
| 6,889,137 B1 | 5/2005 | Rychlak |
| 6,909,947 B2 | 6/2005 | Douros et al. |
| 6,934,365 B2 | 8/2005 | Suganuma et al. |
| 6,944,536 B2 | 9/2005 | Singleton |
| 6,989,737 B2 | 1/2006 | Yasui |
| 7,027,621 B1 | 4/2006 | Prokoski |
| 7,054,723 B2 | 5/2006 | Seto et al. |
| 7,138,922 B2 | 11/2006 | Strumolo et al. |
| 7,149,533 B2 | 12/2006 | Laird et al. |
| 7,253,724 B2 | 8/2007 | Prakah-Asante et al. |
| 7,254,482 B2 | 8/2007 | Kawasaki et al. |
| 7,302,344 B2 | 11/2007 | Olney et al. |
| 7,315,233 B2 | 1/2008 | Yuhara |
| 7,330,124 B2 | 2/2008 | Ota |
| 7,356,392 B2 | 4/2008 | Hubbard et al. |
| 7,386,376 B2 | 6/2008 | Basir et al. |
| 7,424,414 B2 | 9/2008 | Craft |
| 7,499,774 B2 | 3/2009 | Barrett et al. |
| 7,565,230 B2 | 7/2009 | Gardner et al. |
| 7,609,150 B2 | 10/2009 | Wheatley et al. |
| 7,639,148 B2 | 12/2009 | Victor |
| 7,692,552 B2 | 4/2010 | Harrington et al. |
| 7,719,431 B2 | 5/2010 | Bolourchi |
| 7,783,505 B2 | 8/2010 | Roschelle et al. |
| 7,792,328 B2 | 9/2010 | Albertson et al. |
| 7,812,712 B2 | 10/2010 | White et al. |
| 7,813,888 B2 | 10/2010 | Vian et al. |
| 7,835,834 B2 | 11/2010 | Smith et al. |
| 7,865,378 B2 | 1/2011 | Gay |
| 7,870,010 B2 | 1/2011 | Joao |
| 7,877,275 B2 | 1/2011 | Ball |
| 7,881,951 B2 | 2/2011 | Roschelle et al. |
| 7,890,355 B2 | 2/2011 | Gay et al. |
| 7,904,219 B1 | 3/2011 | Lowrey et al. |
| 7,979,172 B2 | 7/2011 | Breed |
| 7,979,173 B2 | 7/2011 | Breed |
| 7,987,103 B2 | 7/2011 | Gay et al. |
| 7,991,629 B2 | 8/2011 | Gay et al. |
| 8,005,467 B2 | 8/2011 | Gerlach et al. |
| 8,009,051 B2 | 8/2011 | Omi |
| 8,010,283 B2 | 8/2011 | Yoshida et al. |
| 8,016,595 B2 | 9/2011 | Aoki et al. |
| 8,027,853 B1 | 9/2011 | Kazenas |
| 8,035,508 B2 | 10/2011 | Breed |
| 8,040,247 B2 | 10/2011 | Gunaratne |
| 8,068,983 B2 | 11/2011 | Vian et al. |
| 8,090,598 B2 | 1/2012 | Bauer et al. |
| 8,095,394 B2 | 1/2012 | Nowak et al. |
| 8,108,655 B2 | 1/2012 | Abernathy et al. |
| 8,117,049 B2 | 2/2012 | Berkobin et al. |
| 8,139,109 B2 | 3/2012 | Schmiedel et al. |
| 8,140,249 B2 | 3/2012 | Hessling et al. |
| 8,140,358 B1 | 3/2012 | Ling et al. |
| 8,140,359 B2 | 3/2012 | Daniel |
| 8,164,432 B2 | 4/2012 | Broggi et al. |
| 8,180,522 B2 | 5/2012 | Tuff |
| 8,180,655 B1 | 5/2012 | Hopkins, III |
| 8,185,380 B2 | 5/2012 | Kameyama |
| 8,188,887 B2 | 5/2012 | Catten et al. |
| 8,190,323 B2 | 5/2012 | Maeda et al. |
| 8,255,243 B2 | 8/2012 | Raines et al. |
| 8,255,244 B2 | 8/2012 | Raines et al. |
| 8,260,489 B2 | 9/2012 | Nielsen et al. |
| 8,260,639 B1 | 9/2012 | Medina, III et al. |
| 8,265,861 B2 | 9/2012 | Ikeda et al. |
| 8,275,417 B2 | 9/2012 | Flynn |
| 8,280,752 B1 | 10/2012 | Cripe et al. |
| 8,311,858 B2 | 11/2012 | Everett et al. |
| 8,314,708 B2 | 11/2012 | Gunderson et al. |
| 8,340,893 B2 | 12/2012 | Yamaguchi et al. |
| 8,340,902 B1 | 12/2012 | Chiang |
| 8,344,849 B2 | 1/2013 | Larsson et al. |
| 8,352,118 B1 | 1/2013 | Mittelsteadt et al. |
| 8,355,837 B2 | 1/2013 | Avery et al. |
| 8,364,391 B2 | 1/2013 | Nagase et al. |
| 8,384,534 B2 | 2/2013 | James et al. |
| 8,386,168 B2 | 2/2013 | Hao |
| 8,423,239 B2 | 4/2013 | Blumer et al. |
| 8,447,231 B2 | 5/2013 | Bai et al. |
| 8,451,105 B2 | 5/2013 | McNay |
| 8,457,880 B1 | 6/2013 | Malalur et al. |
| 8,473,143 B2 | 6/2013 | Stark et al. |
| 8,487,775 B2 | 7/2013 | Victor et al. |
| 8,554,468 B1 | 10/2013 | Bullock |
| 8,554,587 B1 | 10/2013 | Nowak et al. |
| 8,566,126 B1 | 10/2013 | Hopkins, III |
| 8,595,034 B2 | 11/2013 | Bauer et al. |
| 8,595,037 B1 | 11/2013 | Hyde et al. |

(56) References Cited

U.S. PATENT DOCUMENTS

| | | |
|---|---|---|
| 8,618,922 B2 | 12/2013 | Debouk et al. |
| 8,645,014 B1 | 2/2014 | Kozlowski et al. |
| 8,645,029 B2 | 2/2014 | Kim et al. |
| 8,698,639 B2 | 4/2014 | Fung et al. |
| 8,700,251 B1 | 4/2014 | Zhu et al. |
| 8,742,936 B2 | 6/2014 | Galley et al. |
| 8,781,442 B1 | 7/2014 | Link, II |
| 8,781,669 B1 | 7/2014 | Teller et al. |
| 8,788,299 B1 | 7/2014 | Medina, III |
| 8,799,034 B1 | 8/2014 | Brandmaier et al. |
| 8,816,836 B2 | 8/2014 | Lee et al. |
| 8,849,558 B2 | 9/2014 | Morotomi et al. |
| 8,874,301 B1 | 10/2014 | Rao et al. |
| 8,876,535 B2 | 11/2014 | Fields et al. |
| 8,880,291 B2 | 11/2014 | Hampiholi |
| 8,909,428 B1 | 12/2014 | Lombrozo |
| 8,954,205 B2 | 2/2015 | Sagar et al. |
| 8,954,226 B1 | 2/2015 | Binion et al. |
| 8,965,677 B2 | 2/2015 | Breed et al. |
| 8,972,100 B2 | 3/2015 | Mullen et al. |
| 9,019,092 B1 | 4/2015 | Brandmaier et al. |
| 9,020,876 B2 | 4/2015 | Rakshit |
| 9,049,584 B2 | 6/2015 | Hatton |
| 9,053,588 B1 | 6/2015 | Briggs et al. |
| 9,056,395 B1 | 6/2015 | Ferguson et al. |
| 9,070,243 B1 | 6/2015 | Kozlowski et al. |
| 9,079,587 B1 | 7/2015 | Rupp et al. |
| 9,123,250 B2 | 9/2015 | Duncan et al. |
| 9,135,803 B1 | 9/2015 | Fields et al. |
| 9,141,996 B2 | 9/2015 | Christensen et al. |
| 9,144,389 B2 | 9/2015 | Srinivasan et al. |
| 9,147,219 B2 | 9/2015 | Binion et al. |
| 9,147,353 B1 | 9/2015 | Slusar |
| 9,164,507 B2 | 10/2015 | Cheatham, III et al. |
| 9,182,942 B2 | 11/2015 | Kelly et al. |
| 9,188,985 B1 | 11/2015 | Hobbs et al. |
| 9,224,293 B2 | 12/2015 | Taylor |
| 9,262,787 B2 | 2/2016 | Binion et al. |
| 9,274,525 B1 | 3/2016 | Ferguson et al. |
| 9,275,417 B2 | 3/2016 | Binion et al. |
| 9,275,552 B1 | 3/2016 | Fields et al. |
| 9,282,430 B1 | 3/2016 | Brandmaier et al. |
| 9,282,447 B2 | 3/2016 | Gianakis |
| 9,299,108 B2 | 3/2016 | Diana et al. |
| 9,317,983 B2 | 4/2016 | Ricci |
| 9,342,074 B2 | 5/2016 | Dolgov et al. |
| 9,342,993 B1 | 5/2016 | Fields et al. |
| 9,352,709 B2 | 5/2016 | Brenneis et al. |
| 9,355,423 B1 | 5/2016 | Slusar |
| 9,361,650 B2 | 6/2016 | Binion et al. |
| 9,376,090 B2 | 6/2016 | Gennermann |
| 9,377,315 B2 | 6/2016 | Grover et al. |
| 9,381,916 B1 | 7/2016 | Zhu et al. |
| 9,384,491 B1 | 7/2016 | Briggs et al. |
| 9,390,451 B1 | 7/2016 | Slusar |
| 9,406,177 B2 | 8/2016 | Attard et al. |
| 9,421,972 B2 | 8/2016 | Davidsson et al. |
| 9,429,943 B2 | 8/2016 | Wilson et al. |
| 9,430,944 B2 | 8/2016 | Grimm et al. |
| 9,454,786 B1 | 9/2016 | Srey et al. |
| 9,466,214 B2 | 10/2016 | Fuehrer |
| 9,505,494 B1 | 11/2016 | Marlow et al. |
| 9,511,765 B2 | 12/2016 | Obradovich |
| 9,542,846 B2 | 1/2017 | Zeng et al. |
| 9,558,667 B2 | 1/2017 | Bowers et al. |
| 9,567,007 B2 | 2/2017 | Cudak et al. |
| 9,604,652 B2 | 3/2017 | Strauss |
| 9,646,428 B1 | 5/2017 | Konrardy et al. |
| 9,665,101 B1 | 5/2017 | Templeton |
| 9,715,711 B1 | 7/2017 | Konrardy et al. |
| 9,754,325 B1 | 9/2017 | Konrardy et al. |
| 9,767,516 B1 | 9/2017 | Konrardy et al. |
| 9,868,394 B1 * | 1/2018 | Fields .................. B60Q 9/008 |
| 2001/0005217 A1 | 6/2001 | Hamilton et al. |
| 2002/0016655 A1 | 2/2002 | Joao |
| 2002/0111725 A1 | 8/2002 | Burge |
| 2002/0116228 A1 | 8/2002 | Bauer et al. |
| 2002/0128882 A1 | 9/2002 | Nakagawa et al. |
| 2002/0146667 A1 | 10/2002 | Dowdell et al. |
| 2003/0028298 A1 | 2/2003 | Macky et al. |
| 2003/0061160 A1 | 3/2003 | Asahina |
| 2003/0139948 A1 | 7/2003 | Strech |
| 2003/0200123 A1 | 10/2003 | Burge et al. |
| 2004/0005927 A1 | 1/2004 | Bonilla et al. |
| 2004/0017106 A1 | 1/2004 | Aizawa et al. |
| 2004/0039503 A1 | 2/2004 | Doyle |
| 2004/0054452 A1 | 3/2004 | Bjorkman |
| 2004/0077285 A1 | 4/2004 | Bonilla et al. |
| 2004/0085198 A1 | 5/2004 | Saito et al. |
| 2004/0090334 A1 | 5/2004 | Zhang et al. |
| 2004/0111301 A1 | 6/2004 | Wahlbin et al. |
| 2004/0122639 A1 | 6/2004 | Qiu |
| 2004/0139034 A1 | 7/2004 | Farmer |
| 2004/0153362 A1 | 8/2004 | Bauer et al. |
| 2004/0158476 A1 | 8/2004 | Blessinger et al. |
| 2004/0169034 A1 | 9/2004 | Park |
| 2004/0198441 A1 | 10/2004 | Cooper et al. |
| 2004/0204837 A1 | 10/2004 | Singleton |
| 2004/0226043 A1 | 11/2004 | Mettu et al. |
| 2004/0260579 A1 | 12/2004 | Tremiti |
| 2005/0007438 A1 | 1/2005 | Busch et al. |
| 2005/0059151 A1 | 3/2005 | Bosch |
| 2005/0071202 A1 | 3/2005 | Kendrick |
| 2005/0073438 A1 | 4/2005 | Rodgers et al. |
| 2005/0107673 A1 | 5/2005 | Ball |
| 2005/0108910 A1 | 5/2005 | Esparza et al. |
| 2005/0131597 A1 | 6/2005 | Raz et al. |
| 2005/0228763 A1 | 10/2005 | Lewis et al. |
| 2005/0237784 A1 | 10/2005 | Kang |
| 2005/0259151 A1 | 11/2005 | Hamilton et al. |
| 2005/0267784 A1 | 12/2005 | Slen et al. |
| 2006/0031103 A1 | 2/2006 | Henry |
| 2006/0052909 A1 | 3/2006 | Cherouny |
| 2006/0053038 A1 | 3/2006 | Warren et al. |
| 2006/0079280 A1 | 4/2006 | LaPerch |
| 2006/0089763 A1 | 4/2006 | Barrett et al. |
| 2006/0092043 A1 | 5/2006 | Lagassey |
| 2006/0136291 A1 | 6/2006 | Morita et al. |
| 2006/0184295 A1 | 8/2006 | Hawkins et al. |
| 2006/0212195 A1 | 9/2006 | Veith et al. |
| 2006/0220905 A1 | 10/2006 | Hovestadt |
| 2006/0229777 A1 | 10/2006 | Hudson et al. |
| 2006/0232430 A1 | 10/2006 | Takaoka et al. |
| 2007/0001831 A1 | 1/2007 | Raz et al. |
| 2007/0027726 A1 | 2/2007 | Warren et al. |
| 2007/0055422 A1 | 3/2007 | Anzai et al. |
| 2007/0080816 A1 | 4/2007 | Haque et al. |
| 2007/0088469 A1 | 4/2007 | Schmiedel et al. |
| 2007/0122771 A1 | 5/2007 | Maeda et al. |
| 2007/0132773 A1 | 6/2007 | Plante |
| 2007/0149208 A1 | 6/2007 | Syrbe et al. |
| 2007/0159344 A1 | 7/2007 | Kisacanin |
| 2007/0219720 A1 | 9/2007 | Trepagnier et al. |
| 2007/0265540 A1 | 11/2007 | Fuwamoto et al. |
| 2007/0282638 A1 | 12/2007 | Surovy |
| 2007/0291130 A1 | 12/2007 | Broggi et al. |
| 2007/0299700 A1 | 12/2007 | Gay et al. |
| 2008/0027761 A1 | 1/2008 | Bracha |
| 2008/0033684 A1 | 2/2008 | Vian et al. |
| 2008/0052134 A1 | 2/2008 | Nowak et al. |
| 2008/0061953 A1 | 3/2008 | Bhogal et al. |
| 2008/0064014 A1 | 3/2008 | Wojtczak et al. |
| 2008/0065427 A1 | 3/2008 | Helitzer et al. |
| 2008/0082372 A1 | 4/2008 | Burch |
| 2008/0084473 A1 | 4/2008 | Romanowich |
| 2008/0106390 A1 | 5/2008 | White |
| 2008/0111666 A1 | 5/2008 | Plante et al. |
| 2008/0114502 A1 | 5/2008 | Breed et al. |
| 2008/0126137 A1 | 5/2008 | Kidd et al. |
| 2008/0143497 A1 | 6/2008 | Wasson et al. |
| 2008/0147266 A1 | 6/2008 | Plante et al. |
| 2008/0147267 A1 | 6/2008 | Plante et al. |
| 2008/0180237 A1 | 7/2008 | Fayyad et al. |
| 2008/0189142 A1 | 8/2008 | Brown et al. |

(56) References Cited

U.S. PATENT DOCUMENTS

| | | |
|---|---|---|
| 2008/0255887 A1 | 10/2008 | Gruter |
| 2008/0255888 A1 | 10/2008 | Berkobin et al. |
| 2008/0258890 A1 | 10/2008 | Follmer et al. |
| 2008/0291008 A1 | 11/2008 | Jeon |
| 2008/0297488 A1 | 12/2008 | Operowsky et al. |
| 2008/0319665 A1 | 12/2008 | Berkobin et al. |
| 2009/0015684 A1 | 1/2009 | Ooga et al. |
| 2009/0063030 A1 | 3/2009 | Howarter et al. |
| 2009/0069953 A1 | 3/2009 | Hale et al. |
| 2009/0079839 A1 | 3/2009 | Fischer et al. |
| 2009/0085770 A1 | 4/2009 | Mergen |
| 2009/0115638 A1 | 5/2009 | Shankwitz et al. |
| 2009/0132294 A1 | 5/2009 | Haines |
| 2009/0207005 A1 | 8/2009 | Habetha et al. |
| 2009/0210257 A1 | 8/2009 | Chalfant et al. |
| 2009/0267801 A1 | 10/2009 | Kawai et al. |
| 2009/0300065 A1 | 12/2009 | Birchall |
| 2009/0303026 A1 | 12/2009 | Broggi et al. |
| 2009/0313566 A1 | 12/2009 | Vian et al. |
| 2010/0004995 A1 | 1/2010 | Hickman |
| 2010/0030540 A1 | 2/2010 | Choi et al. |
| 2010/0030586 A1 | 2/2010 | Taylor et al. |
| 2010/0055649 A1 | 3/2010 | Takahashi et al. |
| 2010/0076646 A1 | 3/2010 | Basir et al. |
| 2010/0106346 A1 | 4/2010 | Badli et al. |
| 2010/0106356 A1 | 4/2010 | Trepagnier et al. |
| 2010/0128127 A1 | 5/2010 | Ciolli |
| 2010/0131300 A1 | 5/2010 | Collopy et al. |
| 2010/0131302 A1 | 5/2010 | Collopy et al. |
| 2010/0131304 A1 | 5/2010 | Collopy et al. |
| 2010/0131307 A1 | 5/2010 | Collopy et al. |
| 2010/0214087 A1 | 8/2010 | Nakagoshi et al. |
| 2010/0219944 A1 | 9/2010 | McCormick et al. |
| 2010/0253541 A1 | 10/2010 | Seder et al. |
| 2010/0286845 A1 | 11/2010 | Rekow et al. |
| 2010/0293033 A1 | 11/2010 | Hall et al. |
| 2010/0299021 A1 | 11/2010 | Jalili |
| 2011/0009093 A1 | 1/2011 | Self et al. |
| 2011/0043377 A1 | 2/2011 | McGrath et al. |
| 2011/0054767 A1 | 3/2011 | Schafer et al. |
| 2011/0060496 A1 | 3/2011 | Nielsen et al. |
| 2011/0066310 A1 | 3/2011 | Sakai et al. |
| 2011/0087505 A1 | 4/2011 | Terlep |
| 2011/0090075 A1 | 4/2011 | Armitage et al. |
| 2011/0090093 A1 | 4/2011 | Grimm et al. |
| 2011/0093350 A1 | 4/2011 | Laumeyer et al. |
| 2011/0106370 A1 | 5/2011 | Duddle et al. |
| 2011/0128161 A1 | 6/2011 | Bae et al. |
| 2011/0133954 A1 | 6/2011 | Ooshima et al. |
| 2011/0137684 A1 | 6/2011 | Peak et al. |
| 2011/0140919 A1 | 6/2011 | Hara et al. |
| 2011/0140968 A1 | 6/2011 | Bai et al. |
| 2011/0153367 A1 | 6/2011 | Amigo et al. |
| 2011/0169625 A1 | 7/2011 | James et al. |
| 2011/0184605 A1 | 7/2011 | Neff |
| 2011/0196571 A1 | 8/2011 | Foladare et al. |
| 2011/0202305 A1 | 8/2011 | Willis et al. |
| 2011/0241862 A1 | 10/2011 | Debouk et al. |
| 2011/0295446 A1 | 12/2011 | Basir et al. |
| 2011/0295546 A1 | 12/2011 | Khazanov |
| 2011/0301839 A1 | 12/2011 | Pudar et al. |
| 2011/0304465 A1 | 12/2011 | Boult et al. |
| 2011/0307188 A1 | 12/2011 | Peng et al. |
| 2011/0307336 A1 | 12/2011 | Smirnov et al. |
| 2012/0004933 A1 | 1/2012 | Foladare et al. |
| 2012/0010906 A1 | 1/2012 | Foladare et al. |
| 2012/0013582 A1 | 1/2012 | Inoue et al. |
| 2012/0019001 A1 | 1/2012 | Hede et al. |
| 2012/0025969 A1 | 2/2012 | Dozza |
| 2012/0028680 A1 | 2/2012 | Breed |
| 2012/0059227 A1 | 3/2012 | Friedlander et al. |
| 2012/0066007 A1 | 3/2012 | Ferrick et al. |
| 2012/0071151 A1 | 3/2012 | Abramson et al. |
| 2012/0072214 A1 | 3/2012 | Cox et al. |
| 2012/0072243 A1 | 3/2012 | Collins et al. |
| 2012/0072244 A1 | 3/2012 | Collins et al. |
| 2012/0083668 A1 | 4/2012 | Pradeep et al. |
| 2012/0083960 A1 | 4/2012 | Zhu et al. |
| 2012/0083974 A1 | 4/2012 | Sandblom |
| 2012/0092157 A1 | 4/2012 | Tran |
| 2012/0101855 A1 | 4/2012 | Collins et al. |
| 2012/0108909 A1 | 5/2012 | Slobounov et al. |
| 2012/0109407 A1 | 5/2012 | Yousefi et al. |
| 2012/0109692 A1 | 5/2012 | Collins et al. |
| 2012/0123806 A1 | 5/2012 | Schumann, Jr. et al. |
| 2012/0135382 A1 | 5/2012 | Winston et al. |
| 2012/0143630 A1 | 6/2012 | Hertenstein |
| 2012/0172055 A1 | 7/2012 | Edge |
| 2012/0185204 A1 | 7/2012 | Jallon et al. |
| 2012/0188100 A1 | 7/2012 | Min et al. |
| 2012/0190001 A1 | 7/2012 | Knight et al. |
| 2012/0191343 A1 | 7/2012 | Haleem |
| 2012/0197669 A1 | 8/2012 | Kote et al. |
| 2012/0209634 A1 | 8/2012 | Ling et al. |
| 2012/0209692 A1 | 8/2012 | Bennett et al. |
| 2012/0215375 A1 | 8/2012 | Chang |
| 2012/0221168 A1 | 8/2012 | Zeng et al. |
| 2012/0235865 A1 | 9/2012 | Nath et al. |
| 2012/0239471 A1 | 9/2012 | Grimm et al. |
| 2012/0246733 A1 | 9/2012 | Schafer et al. |
| 2012/0256769 A1 | 10/2012 | Satpathy |
| 2012/0258702 A1 | 10/2012 | Matsuyama |
| 2012/0277950 A1 | 11/2012 | Plante et al. |
| 2012/0289819 A1 | 11/2012 | Snow |
| 2012/0303222 A1 | 11/2012 | Cooprider et al. |
| 2012/0306663 A1 | 12/2012 | Mudalige |
| 2012/0316406 A1 | 12/2012 | Rahman et al. |
| 2013/0006674 A1 | 1/2013 | Bowne et al. |
| 2013/0006675 A1 | 1/2013 | Bowne et al. |
| 2013/0018677 A1 | 1/2013 | Chevrette |
| 2013/0038437 A1 | 2/2013 | Talati et al. |
| 2013/0044008 A1 | 2/2013 | Gafford et al. |
| 2013/0046562 A1 | 2/2013 | Taylor et al. |
| 2013/0066751 A1 | 3/2013 | Glazer et al. |
| 2013/0073115 A1 | 3/2013 | Levin et al. |
| 2013/0116855 A1 | 5/2013 | Nielsen et al. |
| 2013/0144459 A1 | 6/2013 | Ricci |
| 2013/0151202 A1 | 6/2013 | Denny et al. |
| 2013/0164715 A1 | 6/2013 | Hunt et al. |
| 2013/0179198 A1 | 7/2013 | Bowne et al. |
| 2013/0189649 A1 | 7/2013 | Mannino |
| 2013/0209968 A1 | 8/2013 | Miller et al. |
| 2013/0218603 A1 | 8/2013 | Hagelstein et al. |
| 2013/0218604 A1 | 8/2013 | Hagelstein et al. |
| 2013/0227409 A1 | 8/2013 | Das et al. |
| 2013/0231824 A1 | 9/2013 | Wilson et al. |
| 2013/0237194 A1 | 9/2013 | Davis |
| 2013/0245881 A1 | 9/2013 | Scarbrough |
| 2013/0267194 A1 | 10/2013 | Breed |
| 2013/0289819 A1 | 10/2013 | Hassib et al. |
| 2013/0302758 A1 | 11/2013 | Wright |
| 2013/0304513 A1 | 11/2013 | Hyde et al. |
| 2013/0304514 A1 | 11/2013 | Hyde et al. |
| 2013/0307786 A1 | 11/2013 | Heubel |
| 2013/0317693 A1 | 11/2013 | Jefferies et al. |
| 2013/0317711 A1 | 11/2013 | Plante |
| 2013/0317786 A1 | 11/2013 | Kuhn |
| 2013/0317865 A1 | 11/2013 | Tofte et al. |
| 2013/0332402 A1 | 12/2013 | Rakshit |
| 2013/0339062 A1 | 12/2013 | Brewer et al. |
| 2014/0002651 A1 | 1/2014 | Plante |
| 2014/0004734 A1 | 1/2014 | Hoang |
| 2014/0009307 A1 | 1/2014 | Bowers et al. |
| 2014/0012492 A1 | 1/2014 | Bowers et al. |
| 2014/0039934 A1 | 2/2014 | Rivera |
| 2014/0047347 A1 | 2/2014 | Mohn et al. |
| 2014/0047371 A1 | 2/2014 | Palmer et al. |
| 2014/0052323 A1 | 2/2014 | Reichel et al. |
| 2014/0052336 A1 | 2/2014 | Moshchuk et al. |
| 2014/0058761 A1 | 2/2014 | Freiberger et al. |
| 2014/0059066 A1 | 2/2014 | Koloskov |
| 2014/0070980 A1 | 3/2014 | Park |
| 2014/0080100 A1 | 3/2014 | Phelan et al. |
| 2014/0095214 A1 | 4/2014 | Mathe et al. |

(56) References Cited

U.S. PATENT DOCUMENTS

| | | |
|---|---|---|
| 2014/0099607 A1 | 4/2014 | Armitage et al. |
| 2014/0100892 A1 | 4/2014 | Collopy et al. |
| 2014/0104405 A1 | 4/2014 | Weidl et al. |
| 2014/0106782 A1 | 4/2014 | Chitre et al. |
| 2014/0108198 A1 | 4/2014 | Jariyasunant et al. |
| 2014/0114691 A1 | 4/2014 | Pearce |
| 2014/0125474 A1 | 5/2014 | Gunaratne |
| 2014/0129053 A1 | 5/2014 | Kleve et al. |
| 2014/0129301 A1 | 5/2014 | Van Wiemeersch et al. |
| 2014/0135598 A1 | 5/2014 | Weidl et al. |
| 2014/0167967 A1 | 6/2014 | He et al. |
| 2014/0168399 A1 | 6/2014 | Plummer et al. |
| 2014/0172467 A1 | 6/2014 | He et al. |
| 2014/0172727 A1 | 6/2014 | Abhyanker et al. |
| 2014/0191858 A1 | 7/2014 | Morgan et al. |
| 2014/0218187 A1 | 8/2014 | Chun et al. |
| 2014/0221781 A1 | 8/2014 | Schrauf et al. |
| 2014/0236638 A1 | 8/2014 | Pallesen et al. |
| 2014/0240132 A1 | 8/2014 | Bychkov |
| 2014/0253376 A1 | 9/2014 | Large et al. |
| 2014/0257866 A1 | 9/2014 | Gay et al. |
| 2014/0272810 A1 | 9/2014 | Fields et al. |
| 2014/0277916 A1 | 9/2014 | Mullen et al. |
| 2014/0278840 A1 | 9/2014 | Scofield et al. |
| 2014/0279707 A1 | 9/2014 | Joshua et al. |
| 2014/0301218 A1 | 10/2014 | Luo et al. |
| 2014/0303827 A1 | 10/2014 | Dolgov et al. |
| 2014/0309864 A1 | 10/2014 | Ricci |
| 2014/0310186 A1 | 10/2014 | Ricci |
| 2014/0358324 A1 | 12/2014 | Sagar et al. |
| 2015/0006278 A1 | 1/2015 | Di Censo et al. |
| 2015/0024705 A1 | 1/2015 | Rashidi |
| 2015/0035685 A1 | 2/2015 | Strickland et al. |
| 2015/0045983 A1 | 2/2015 | Fraser et al. |
| 2015/0051752 A1 | 2/2015 | Paszkowicz |
| 2015/0066284 A1 | 3/2015 | Yopp |
| 2015/0070265 A1 | 3/2015 | Cruz-Hernandez et al. |
| 2015/0073645 A1 | 3/2015 | Davidsson et al. |
| 2015/0088334 A1 | 3/2015 | Bowers et al. |
| 2015/0088360 A1 | 3/2015 | Bonnet et al. |
| 2015/0088373 A1 | 3/2015 | Wilkins |
| 2015/0088550 A1 | 3/2015 | Bowers et al. |
| 2015/0100190 A1 | 4/2015 | Yopp |
| 2015/0100191 A1 | 4/2015 | Yopp |
| 2015/0112504 A1 | 4/2015 | Binion et al. |
| 2015/0112543 A1 | 4/2015 | Binion et al. |
| 2015/0112545 A1 | 4/2015 | Binion et al. |
| 2015/0112730 A1 | 4/2015 | Binion et al. |
| 2015/0112731 A1 | 4/2015 | Binion et al. |
| 2015/0112800 A1 | 4/2015 | Binion et al. |
| 2015/0120331 A1 | 4/2015 | Russo et al. |
| 2015/0127570 A1 | 5/2015 | Doughty et al. |
| 2015/0142262 A1 | 5/2015 | Lee |
| 2015/0149265 A1 | 5/2015 | Huntzicker et al. |
| 2015/0158469 A1 | 6/2015 | Cheatham, III et al. |
| 2015/0158495 A1 | 6/2015 | Duncan et al. |
| 2015/0160653 A1 | 6/2015 | Cheatham, III et al. |
| 2015/0161893 A1 | 6/2015 | Duncan et al. |
| 2015/0161894 A1 | 6/2015 | Duncan et al. |
| 2015/0166069 A1 | 6/2015 | Engelman et al. |
| 2015/0170287 A1 | 6/2015 | Tirone et al. |
| 2015/0170522 A1 | 6/2015 | Noh |
| 2015/0178998 A1 | 6/2015 | Attard et al. |
| 2015/0185034 A1 | 7/2015 | Abhyanker |
| 2015/0187013 A1 | 7/2015 | Adams et al. |
| 2015/0187015 A1 | 7/2015 | Adams et al. |
| 2015/0187016 A1 | 7/2015 | Adams et al. |
| 2015/0187019 A1 | 7/2015 | Fernandes et al. |
| 2015/0193219 A1 | 7/2015 | Pandya et al. |
| 2015/0229885 A1 | 8/2015 | Offenhaeuser |
| 2015/0233719 A1 | 8/2015 | Cudak et al. |
| 2015/0235557 A1 | 8/2015 | Engelman et al. |
| 2015/0241241 A1 | 8/2015 | Cudak et al. |
| 2015/0242953 A1 | 8/2015 | Suiter |
| 2015/0254955 A1 | 9/2015 | Fields et al. |
| 2015/0294422 A1 | 10/2015 | Carver et al. |
| 2015/0310742 A1 | 10/2015 | Albornoz |
| 2015/0336502 A1 | 11/2015 | Hillis et al. |
| 2015/0348337 A1 | 12/2015 | Choi |
| 2016/0027276 A1 | 1/2016 | Freeck et al. |
| 2016/0036899 A1 | 2/2016 | Moody et al. |
| 2016/0071418 A1 | 3/2016 | Oshida et al. |
| 2016/0086285 A1 | 3/2016 | Jordan Peters et al. |
| 2016/0092962 A1 | 3/2016 | Wasserman et al. |
| 2016/0093212 A1 | 3/2016 | Barfield, Jr. et al. |
| 2016/0105365 A1 | 4/2016 | Droste et al. |
| 2016/0116293 A1 | 4/2016 | Grover et al. |
| 2016/0117928 A1 | 4/2016 | Hodges et al. |
| 2016/0189544 A1 | 6/2016 | Ricci |
| 2016/0203560 A1 | 7/2016 | Parameshwaran |
| 2016/0264132 A1 | 9/2016 | Paul et al. |
| 2016/0275790 A1 | 9/2016 | Kang et al. |
| 2016/0277911 A1 | 9/2016 | Kang et al. |
| 2016/0282874 A1 | 9/2016 | Kurata et al. |
| 2016/0288833 A1 | 10/2016 | Heimberger et al. |
| 2016/0304027 A1 | 10/2016 | Di Censo et al. |
| 2016/0304091 A1 | 10/2016 | Remes |
| 2016/0314224 A1 | 10/2016 | Wei et al. |
| 2016/0323233 A1 | 11/2016 | Song et al. |
| 2016/0327949 A1 | 11/2016 | Wilson et al. |
| 2016/0343249 A1 | 11/2016 | Gao et al. |
| 2016/0347329 A1 | 12/2016 | Zelman et al. |
| 2016/0370194 A1 | 12/2016 | Colijn et al. |
| 2017/0017734 A1 | 1/2017 | Groh et al. |
| 2017/0024938 A1 | 1/2017 | Lindsay |

FOREIGN PATENT DOCUMENTS

| | | |
|---|---|---|
| GB | 2268608 A | 1/1994 |
| GB | 2494727 A | 3/2013 |
| JP | 2002-259708 A | 9/2002 |
| WO | WO-2005/083605 A1 | 9/2005 |
| WO | WO-2010/034909 A1 | 4/2010 |
| WO | WO-2014/139821 A1 | 9/2014 |
| WO | WO-2014/148976 A1 | 9/2014 |
| WO | WO-2016/156236 A1 | 10/2016 |

OTHER PUBLICATIONS

"Integrated Vehicle-Based Safety Systems (IVBSS)", Research and Innovative Technology Administration (RITA), http://www.its.dot.gov/ivbss/, retrieved from the internet on Nov. 4, 2013, 3 pages.

"Linking Driving Behavior to Automobile Accidents and Insurance Rates: An Analysis of Five Billion Miles Driven", Progressive Insurance brochure (Jul. 2012).

"Self-Driving Cars: The Next Revolution", KPMG, Center for Automotive Research (2012).

The Influence of Telematics on Customer Experience: Case Study of Progressive's Snapshot Program, J.D. Power Insights, McGraw Hill Financial (2013).

Advisory Action dated Apr. 1, 2015 for U.S. Appl. No. 14/269,490, 4 pgs.

Alberi et al., A proposed standardized testing procedure for autonomous ground vehicles, Virginia Polytechnic Institute and State University, 63 pages. (Apr. 29, 2008).

Broggi et al., Extensive Tests of Autonomous Driving Technologies, IEEE Trans on Intelligent Transportation Systems, 14(3):1403-15 (May 30, 2013).

Campbell et al., Autonomous Driving in Urban Environments: Approaches, Lessons, and Challenges, Phil. Trans. R. Soc. A, 368:4649-72 (2010).

Carroll et al. "Where Innovation is Sorely Needed", http://www.technologyreview.com/news/422568/where-innovation-is-sorely-needed/?nlid, retrieved from the internet on Nov. 4, 2013, 3 pages.

Davies, Avoiding Squirrels and Other Things Google's Robot Car Can't Do, downloaded from the Internet at: <http://www.wired.com/2014/05/google-self-driving-car-can-cant/ (downloaded on May 28, 2014).

Figueiredo et al., An Approach to Simulate Autonomous Vehicles in Urban Traffic Scenarios, University of Porto, 7 pages (Nov. 2009).

(56) References Cited

OTHER PUBLICATIONS

Gechter et al., Towards a Hybrid Real/Virtual Simulation of Autonomous Vehicles for Critical Scenarios, International Academy Research and Industry Association (IARIA), 4 pages (2014).
Hancock et al., "The Impact of Emotions and Predominant Emotion Regulation Technique on Driving Performance," pp. 5882-5885 (2012).
Hars, Autonomous Cars: The Next Revolution Looms, Inventivio GmbH, 4 pages (Jan. 2010).
Lee et al., Autonomous Vehicle Simulation Project, Int. J. Software Eng. and Its Applications, 7(5):393-402 (2013).
Levendusky, Advancements in automotive technology and their effect on personal auto insurance, downloaded from the Internet at: <http://www.verisk.com/visualize/advancements-in-automotive-technology-and-their-effect> (2013).
McCraty et al., "The Effects of Different Types of Music on Mood, Tension, and Mental Clarity." Alternative Therapies in Health and Medicine 4.1 (1998): 75-84. NCBI PubMed. Web. Jul. 11, 2013.
Miller, A simulation and regression testing framework for autonomous workers, Case Western Reserve University, 12 pages. (Aug. 2007).
Mui, Will auto insurers survive their collision with driverless cars? (Part 6), downloaded from the Internet at: <http://www.forbes.com/sites/chunkamui/2013/03/28/will-auto-insurers-survive-their-collision> (Mar. 28, 2013).
Notice of Allowance in U.S. Appl. No. 14/057,408 dated Sep. 25, 2014.
Notice of Allowance in U.S. Appl. No. 14/057,419 dated Oct. 5, 2015.
Notice of Allowance in U.S. Appl. No. 14/208,626 dated May 11, 2015.
Notice of Allowance in U.S. Appl. No. 14/255,934 dated May 27, 2015.
Notice of Allowance in U.S. Appl. No. 14/729,290 dated Aug. 5, 2015.
U.S. Appl. No. 14/511,712, Office Action, dated for Dec. 26, 2014.
Office Action in U.S. Appl. No. 13/844,090 dated Dec. 4, 2013.
Office Action in U.S. Appl. No. 14/057,419 dated Mar. 31, 2015.
Office Action in U.S. Appl. No. 14/057,419 dated Oct. 9, 2014.
Office Action in U.S. Appl. No. 14/057,456 dated Mar. 17, 2015.
Office Action in U.S. Appl. No. 14/201,491 dated Apr. 29, 2015.
Office Action in U.S. Appl. No. 14/201,491 dated Jan. 16, 2015.
Office Action in U.S. Appl. No. 14/201,491 dated Sep. 11, 2015.
Office Action in U.S. Appl. No. 14/201,491 dated Sep. 26, 2014.
Office Action in U.S. Appl. No. 14/215,789 dated Sep. 17, 2015.
Office Action in U.S. Appl. No. 14/255,934 dated Jan. 15, 2015.
Office Action in U.S. Appl. No. 14/255,934 dated Jun. 18, 2014.
Office Action in U.S. Appl. No. 14/255,934 dated Sep. 23, 2014.
Office Action in U.S. Appl. No. 14/269,490 dated Jan. 23, 2015.
Office Action in U.S. Appl. No. 14/269,490 dated Jun. 11, 2015.
Office Action in U.S. Appl. No. 14/269,490 dated Sep. 12, 2014.
Office Action in U.S. Appl. No. 14/511,712 dated Jun. 25, 2015.
Office Action in U.S. Appl. No. 14/511,712 dated Oct. 10, 2014.
Office Action in U.S. Appl. No. 14/511,750 dated Dec. 19, 2014.
Office Action in U.S. Appl. No. 14/511,750 dated Jun. 30, 2015.
Office Action in U.S. Appl. No. 14/057,408 dated Jan. 28, 2014.
Office Action in U.S. Appl. No. 14/057,408 dated May 22, 2014.
Office Action in U.S. Appl. No. 14/057,419 dated Jan. 28, 2014.
Office Action in U.S. Appl. No. 14/057,419 dated Jun. 18, 2014.
Office Action in U.S. Appl. No. 14/057,435 dated Jul. 23, 2014.
Office Action in U.S. Appl. No. 14/057,435 dated Mar. 20, 2014.
Office Action in U.S. Appl. No. 14/057,435 dated May 29, 2015.
Office Action in U.S. Appl. No. 14/057,435 dated Nov. 18, 2014.
Office Action in U.S. Appl. No. 14/057,447 dated Aug. 28, 2014.
Office Action in U.S. Appl. No. 14/057,447 dated Dec. 18, 2014.
Office Action in U.S. Appl. No. 14/057,447 dated Feb. 24, 2014.
Office Action in U.S. Appl. No. 14/057,447 dated Jul. 6, 2015.
Office Action in U.S. Appl. No. 14/057,456 dated Mar. 14, 2014.
Office Action in U.S. Appl. No. 14/057,456 dated Oct. 28, 2014.
Office Action in U.S. Appl. No. 14/057,467 dated Feb. 23, 2015.
Office Action in U.S. Appl. No. 14/057,467 dated Jan. 27, 2014.
Office Action in U.S. Appl. No. 14/057,467 dated Jun. 11, 2014.
Office Action in U.S. Appl. No. 14/057,467 dated Oct. 17, 2014.
Office Action in U.S. Appl. No. 14/208,626 dated Apr. 29, 2014.
Office Action in U.S. Appl. No. 14/208,626 dated Aug. 13, 2014.
Office Action in U.S. Appl. No. 14/208,626 dated Dec. 23, 2014.
Office Action in U.S. Appl. No. 14/339,652 dated May 15, 2015.
Office Action in U.S. Appl. No. 14/339,652 dated Oct. 23, 2014.
Office Action in U.S. Appl. No. 14/339,652 dated Sep. 24, 2015.
Office Action in U.S. Appl. No. 14/528,424 dated Feb. 27, 2015.
Office Action in U.S. Appl. No. 14/528,424 dated Jul. 30, 2015.
Office Action in U.S. Appl. No. 14/528,642 dated Jan. 13, 2015.
Office Action in U.S. Appl. No. 14/713,230 dated Oct. 9, 2015.
Office Action in U.S. Appl. No. 14/713,254 dated Oct. 9, 2015.
Office Action in U.S. Appl. No. 14/718,338 dated Jul. 7, 2015.
Office Action, U.S. Appl. No. 14/713,261, dated Oct. 21, 2015.
Pereira, An Integrated Architecture for Autonomous Vehicle Simulation, University of Porto., 114 pages (Jun. 2011).
Quinlan et al., Bringing Simulation to Life: A Mixed Reality Autonomous Intersection, Proc. IROS 2010—IEEE/RSJ International Conference on Intelligent Robots and Systems, Taipei Taiwan, 6 pages (Oct. 2010).
Read, Autonomous cars & the death of auto insurance, downloaded from the Internet at: <http://www.thecarconnection.com/news/1083266_autonomous-cars-the-death-of-auto-insurance> (Apr. 1, 2013).
Reddy, The New Auto Insurance Ecosystem: Telematics, Mobility and the Connected Car, Cognizant (Aug. 2012).
Reifel et al., "Telematics: The Game Changer—Reinventing Auto Insurance", A.T. Kearney (2010).
Riley et al., U.S. Appl. No. 14/269,490, filed May 5, 2014.
Roberts, "What is Telematics Insurance?", MoneySupermarket (Jun. 20, 2012).
Ryan, Can having safety features reduce your insurance premiums? (Dec. 15, 2010).
Search Report in EP Application No. 13167206.5 dated Aug. 13, 2013, 6 pages.
Sharma, Driving the future: the legal implications of autonomous vehicles conference recap, downloaded from the Internet at: <http://law.scu.edu/hightech/autonomousvehicleconfrecap2012> (2012).
Stavens, Learning to Drive: Perception for Autonomous Cars, Stanford University, 104 pages (May 2011).
Stienstra, Autonomous Vehicles & the Insurance Industry, 2013 CAS Annual Meeting—Minneapolis, MN (2013).
U.S. Appl. No. 13/844,090, Notice of Allowance, dated Jul. 8, 2014.
U.S. Appl. No. 13/844,090, Office Action, dated Dec. 4, 2013.
U.S. Appl. No. 14/057,408, Notice of Allowance, dated Sep. 25, 2014.
U.S. Appl. No. 14/057,419, Notice of Allowance, dated Oct. 5, 2015.
U.S. Appl. No. 14/057,435, Notice of Allowance, dated Apr. 1, 2016.
U.S. Appl. No. 14/057,447, Final Office Action, dated Jun. 20, 2016.
U.S. Appl. No. 14/057,447, Nonfinal Office Action, dated Dec. 11, 2015.
U.S. Appl. No. 14/057,456, Final Office Action, dated Jun. 16, 2016.
U.S. Appl. No. 14/057,456, Final Office Action, dated Mar. 17, 2015.
U.S. Appl. No. 14/057,456, Nonfinal Office Action, dated Dec. 3, 2015.
U.S. Appl. No. 14/057,467, Final Office Action, dated Mar. 16, 2016.
U.S. Appl. No. 14/057,467, Nonfinal Office Action, dated Jul. 1, 2016.
U.S. Appl. No. 14/057,467, Nonfinal Office Action, dated Nov. 12, 2015.
U.S. Appl. No. 14/201,491, Final Office Action, dated Sep. 11, 2015.
U.S. Appl. No. 14/208,626, Notice of Allowance, dated May 11, 2015.
U.S. Appl. No. 14/208,626, Notice of Allowance, dated Sep. 1, 2015.
U.S. Appl. No. 14/215,789, filed Mar. 17, 2014, Baker et al., "Split Sensing Method".

(56) References Cited

OTHER PUBLICATIONS

U.S. Appl. No. 14/215,789, Final Office Action, dated Mar. 11, 2016.
U.S. Appl. No. 14/255,934, Final Office Action, dated Sep. 23, 2014.
U.S. Appl. No. 14/255,934, Nonfinal Office Action, dated Jan. 15, 2015.
U.S. Appl. No. 14/255,934, Nonfinal Office Action, dated Jun. 18, 2014.
U.S. Appl. No. 14/255,934, Notice of Allowance, dated May 27, 2015.
U.S. Appl. No. 14/269,490, Final Office Action, dated Jan. 23, 2015.
U.S. Appl. No. 14/269,490, Nonfinal Office Action, dated Sep. 12, 2014.
U.S. Appl. No. 14/339,652, filed Jul. 24, 2014, Freeck et al., "System and Methods for Monitoring a Vehicle Operator and Monitoring an Operating Environment Within the Vehicle".
U.S. Appl. No. 14/339,652, Final Office Action, dated Apr. 22, 2016.
U.S. Appl. No. 14/339,652, Nonfinal Office Action, dated Sep. 24, 2015.
U.S. Appl. No. 14/511,712, filed Oct. 10, 2014, Fields et al., "Real-Time Driver Observation and Scoring for Driver's Education".
U.S. Appl. No. 14/511,712, Final Office Action, dated Jun. 25, 2015.
U.S. Appl. No. 14/511,712, Notice of Allowance, dated Oct. 22, 2015.
U.S. Appl. No. 14/511,712, Office Action, dated Dec. 26, 2014.
U.S. Appl. No. 14/511,750, filed Oct. 10, 2014, Fields et al., Real-Time Driver Observation and Scoring for Driver's Education.
U.S. Appl. No. 14/511,750, Nonfinal Office Action, dated Nov. 3, 2015.
U.S. Appl. No. 14/511,750, Notice of Allowance, dated Mar. 4, 2016.
U.S. Appl. No. 14/528,424, filed Oct. 30, 2014, Christensen et al., "Systems and Methods for Processing Trip-Based Insurance Policies".
U.S. Appl. No. 14/528,424, Final Office Action, dated Apr. 22, 2016.
U.S. Appl. No. 14/528,424, Nonfinal Office Action, dated Dec. 3, 2015.
U.S. Appl. No. 14/528,642, filed Oct. 30, 2014, Christensen et al., "Systems and Methods for Managing Units Associated with Time-Based Insurance Policies".
U.S. Appl. No. 14/528,642, Final Office Action, dated Mar. 9, 2016.
U.S. Appl. No. 14/713,184, filed May 15, 2015, Konrardy et al., "Autonomous Vehicle Insurance Pricing".
U.S. Appl. No. 14/713,184, Final Office Action, dated Jul. 15, 2016.
U.S. Appl. No. 14/713,184, Nonfinal office action, dated Mar. 10, 2017.
U.S. Appl. No. 14/713,184, Nonfinal Office Action, dated Feb. 1, 2016.
U.S. Appl. No. 14/713,188, filed May 15, 2015, Konrardy et al., "Autonomous Feature Use Monitoring and Insurance Pricing".
U.S. Appl. No. 14/713,188, Final Office Action, dated May 31, 2016.
U.S. Appl. No. 14/713,188, Nonfinal Office Action, dated Dec. 3, 2015.
U.S. Appl. No. 14/713,188, Nonfinal Office Action, dated Feb. 24, 2017.
U.S. Appl. No. 14/713,194, filed May 15, 2015, Konrardy et al., "Autonomous Communication Feature Use and Insurance Pricing".
U.S. Appl. No. 14/713,194, Final Office Action, dated Jan. 25, 2017.
U.S. Appl. No. 14/713,194, Nonfinal Office Action, dated Jul. 29, 2016.
U.S. Appl. No. 14/713,201, filed May 15, 2015, Konrardy et al., "Autonomous Vehicle Insurance Pricing and Offering Based Upon Accident Risk Factors".
U.S. Appl. No. 14/713,201, Final Office Action, dated Sep. 27, 2016.
U.S. Appl. No. 14/713,201, Nonfinal Office Action, dated May 19, 2016.
U.S. Appl. No. 14/713,206, filed May 15, 2015, Konrardy et al., "Determining Autonomous Vehicle Technology Performance for Insurance Pricing and Offering".
U.S. Appl. No. 14/713,206, Final Office Action, dated May 13, 2016.
U.S. Appl. No. 14/713,206, Nonfinal Office Action, dated Feb. 13, 2017.
U.S. Appl. No. 14/713,206, Nonfinal Office Action, dated Nov. 20, 2015.
U.S. Appl. No. 14/713,214, filed May 15, 2015, Konrardy et al., "Accident Risk Model Determination Using Autonomous Vehicle Operating Data".
U.S. Appl. No. 14/713,214, Final Office Action, dated Aug. 26, 2016.
U.S. Appl. No. 14/713,214, Nonfinal Office Action, dated Feb. 26, 2016.
U.S. Appl. No. 14/713,217, filed May 15, 2015, Konrardy et al., "Autonomous Vehicle Operation Feature Usage Recommendations".
U.S. Appl. No. 14/713,217, Final Office Action, dated Jul. 22, 2016.
U.S. Appl. No. 14/713,217, Nonfinal Office Action, dated Mar. 10, 2017.
U.S. Appl. No. 14/713,217, Nonfinal Office Action, dated Feb. 12, 2016.
U.S. Appl. No. 14/713,223, filed May 15, 2015, Konrardy et al., "Driver Feedback Alerts Based Upon Monitoring Use of Autonomous Vehicle Operation Features".
U.S. Appl. No. 14/713,223, Final Office Action, dated Sep. 1, 2016.
U.S. Appl. No. 14/713,223, Nonfinal Office Action, dated Feb. 26, 2016.
U.S. Appl. No. 14/713,226, filed May 15, 2015, Konrardy et al., "Accident Response Using Autonomous Vehicle Monitoring".
U.S. Appl. No. 14/713,226, Final Office Action, dated May 26, 2016.
U.S. Appl. No. 14/713,226, Nonfinal Office Action, dated Jan. 13, 2016.
U.S. Appl. No. 14/713,226, Notice of Allowance, dated Sep. 22, 2016.
U.S. Appl. No. 14/713,226, Second Notice of Allowance, dated Jan. 12, 2017.
U.S. Appl. No. 14/713,230, filed May 15, 2015, Konrardy et al., "Accident Fault Determination for Autonomous Vehicles".
U.S. Appl. No. 14/713,230, Final Office Action, dated Mar. 22, 2016.
U.S. Appl. No. 14/713,230, Nonfinal Office Action, dated Feb. 10, 2017.
U.S. Appl. No. 14/713,237, filed May 15, 2015, Konrardy et al., "Autonomous Vehicle Technology Effectiveness Determination for Insurance Pricing".
U.S. Appl. No. 14/713,237, Final Office Action, dated Sep. 9, 2016.
U.S. Appl. No. 14/713,237, Nonfinal Office Action, dated Apr. 18, 2016.
U.S. Appl. No. 14/713,240, filed May 15, 2015, Konrardy et al., "Fault Determination with Autonomous Feature Use Monitoring".
U.S. Appl. No. 14/713,240, Final Office Action, dated Sep. 12, 2016.
U.S. Appl. No. 14/713,240, Nonfinal Office Action, dated Apr. 7, 2016.
U.S. Appl. No. 14/713,244, filed May 15, 2015, Konrardy et al., "Autonomous Vehicle Operation Feature Evaulation".
U.S. Appl. No. 14/713,249, filed May 15, 2015, Konrardy et al., "Autonomous Vehicle Operation Feature Monitoring and Evaluation of Effectiveness".
U.S. Appl. No. 14/713,249, Final Office Action, dated Jul. 12, 2016.
U.S. Appl. No. 14/713,249, Nonfinal Office Action, dated Mar. 7, 2017.
U.S. Appl. No. 14/713,249, Nonfinal Office Action, dated Jan. 20, 2016.
U.S. Appl. No. 14/713,254, filed May 15, 2015, Konrardy et al., "Accident Fault Determination for Autonomous Vehicles".
U.S. Appl. No. 14/713,254, Final Office Action, dated Mar. 16, 2016.

(56) References Cited

OTHER PUBLICATIONS

U.S. Appl. No. 14/713,254, Nonfinal Office Action, dated Jan. 30, 2017.
U.S. Appl. No. 14/713,261, filed May 15, 2015, Konrardy et al., "Accident Fault Determination for Autonomous Vehicles".
U.S. Appl. No. 14/713,261, Final Office Action, dated Apr. 1, 2016.
U.S. Appl. No. 14/713,261, Nonfinal Office Action, dated Feb. 23, 2017.
U.S. Appl. No. 14/713,266, filed May 15, 2015, Konrardy et al., "Autonomous Vehicle Operation Feature Monitoring and Evaluation of Effectiveness".
U.S. Appl. No. 14/713,266, Final Office Action, dated Sep. 12, 2016.
U.S. Appl. No. 14/713,266, Nonfinal Office Action, dated Mar. 23, 2016.
U.S. Appl. No. 14/713,271, filed May 15, 2015, Konrardy et al. "Fully Autonomous Vehicle Insurance Pricing".
U.S. Appl. No. 14/713,271, Final Office Action, dated Jun. 17, 2016.
U.S. Appl. No. 14/713,271, Nonfinal Office Action, dated Feb. 28, 2017.
U.S. Appl. No. 14/713,271, Nonfinal Office Action, dated Nov. 6, 2015.
U.S. Appl. No. 14/718,338, Notice of Allowance, dated Nov. 2, 2015.
U.S. Appl. No. 14/729,290, filed Jun. 3, 2015, Fields et al., "Advanced Vehicle Operator Intelligence System".
U.S. Appl. No. 14/729,290, Notice of Allowance, dated Aug. 5, 2015.
U.S. Appl. No. 14/798,757, Nonfinal Office Action, dated Jan. 17, 2017.
U.S. Appl. No. 14/798,769, Final Office Action, dated Mar. 14, 2017.
U.S. Appl. No. 14/798,769, Nonfinal Office Action, dated Oct. 6, 2016.
U.S. Appl. No. 14/857,242, filed Sep. 17, 2015, Fields et al., "Advanced Vehicle Operator Intelligence System".
U.S. Appl. No. 14/887,580, Nonfinal Office Action, dated Apr. 7, 2016.
U.S. Appl. No. 14/934,326, filed Nov. 6, 2015, Fields et al., "Autonomous Vehicle Operating Status Assessment".
U.S. Appl. No. 14/934,333, filed Nov. 6, 2015, Fields et al., "Autonomous Vehicle Control Assessment and Selection".
U.S. Appl. No. 14/934,339, filed Nov. 6, 2015, Fields et al., "Autonomous Vehicle Operator Identification".
U.S. Appl. No. 14/934,343, filed Nov. 6, 2015, Fields et al., "Autonomous Vehicle Operating Style and Mode Monitoring".
U.S. Appl. No. 14/934,345, filed Nov. 6, 2015, Fields et al., "Autonomous Vehicle Feature Recommendations".
U.S. Appl. No. 14/934,347, filed Nov. 6, 2015, Fields et al., "Autonomous Vehicle Software Version Assessment".
U.S. Appl. No. 14/934,352, filed Nov. 6, 2015, Fields et al., "Autonomous Vehicle Automatic Parking".
U.S. Appl. No. 14/934,355, filed Nov. 6, 2015, Fields et al., "Autonomous Vehicle Insurance Based Upon Usage".
U.S. Appl. No. 14/934,357, filed Nov. 6, 2015, Fields et al., "Autonomous Vehicle Salvage and Repair".
U.S. Appl. No. 14/934,361, filed Nov. 6, 2015, Fields et al., "Autonomous Vehicle Infrastructure Communication Device".
U.S. Appl. No. 14/934,371, filed Nov. 6, 2015, Fields et al., "Autonomous Vehicle Accident and Emergency Response".
U.S. Appl. No. 14/934,381, filed Nov. 6, 2015, Fields et al., "Personal Insurance Policies".
U.S. Appl. No. 14/934,385, filed Nov. 6, 2015, Fields et al., "Autonomous Vehicle Operating Status Assessment".
U.S. Appl. No. 14/934,388, filed Nov. 6, 2015, Fields et al., "Autonomous Vehicle Control Assessment and Selection".
U.S. Appl. No. 14/934,393, filed Nov. 6, 2015, Fields et al., "Autonomous Vehicle Control Assessment and Selection".
U.S. Appl. No. 14/934,400, filed Nov. 6, 2015, Fields et al., "Autonomous Vehicle Control Assessment and Selection".
U.S. Appl. No. 14/934,405, filed Nov. 6, 2015, Fields et al., "Autonomous Vehicle Automatic Parking".
U.S. Appl. No. 14/950,492, Final Office Action, dated May 3, 2016.
U.S. Appl. No. 14/950,492, Nonfinal Office Action, dated Jan. 22, 2016.
U.S. Appl. No. 14/950,492, Notice of Allowance, dated Aug. 3, 2016.
U.S. Appl. No. 14/951,774, filed Nov. 25, 2015, Konrardy et al., "Fully Autonomous Vehicle Insurance Pricing".
U.S. Appl. No. 14/951,798, filed Nov. 25, 2015, Konrardy et al., "Accident Fault Determination for Autonomous Vehicles".
U.S. Appl. No. 14/951,798, Nonfinal Office Action, dated Jan. 27, 2017.
U.S. Appl. No. 14/951,803, filed Nov. 25, 2015, Konrardy et al., "Accident Fault Determination for Autonomous Vehicles".
U.S. Appl. No. 14/978,266, filed Dec. 22, 2015, Konrardy et al., "Autonomous Feature Use Monitoring and Telematics".
U.S. Appl. No. 15/005,498, Nonfinal Office Action, dated Mar. 31, 2016.
U.S. Appl. No. 15/005,498, Notice of Allowance, dated Aug. 2, 2016.
U.S. Appl. No. 15/076,142, Nonfinal Office Action, dated Aug. 9, 2016.
U.S. Appl. No. 15/241,769, filed Aug. 19, 2016, Fields et al., "Vehiclular Traffic Alerts for Avoidance of Abnormal Traffic Conditions".
U.S. Appl. No. 15/241,769, Nonfinal Office Action, dated Feb. 10, 2017.
U.S. Appl. No. 15/241,812, filed Aug. 19, 2016, Fields et al., "Using Personal Telematics Data for Rental or Insurance Discounts".
U.S. Appl. No. 15/241,817, filed Aug. 19, 2016, Fields et al.,"Vehicular Accident Risk Monitoring and Assessment".
U.S. Appl. No. 15/241,826, filed Aug. 19, 2016, Fields et al., "Shared Vehicle Usage, Monitoring and Feedback".
U.S. Appl. No. 15/241,826, Nonfinal Office Action, dated May 1, 2017.
U.S. Appl. No. 15/241,832, filed Aug. 19, 2016, Fields et al., "Vehicular Driver Evaluation".
U.S. Appl. No. 15/241,842, filed Aug. 19, 2016, Fields et al.,"Vehicular Driver Warnings".
U.S. Appl. No. 15/241,849, filed Aug. 19, 2016, Fields et al., "Vehicular Warnings Based Upon Pedestrian or Cyclist Presence".
U.S. Appl. No. 15/241,859, filed Aug. 19, 2016, Fields et al.,"Determination of Drvier or Vehicle Discounts and Risk Profiles Based Upon Vehicular Travel Environment".
U.S. Appl. No. 15/241,916, filed Aug. 19, 2016, Fields et al., "Determination and Reconstruction of Vehicular Cause and Collision".
U.S. Appl. No. 15/241,922, filed Aug. 19, 2016, Fields et al., "Electric Vehicle Battery Conservation".
U.S. Appl. No. 15/241,932, filed Aug. 19, 2016, Fields et al., "Vehiclular Driver Profiles and Discounts".
U.S. Appl. No. 15/409,092, filed Jan. 18, 2017, Konrardy et al., "Autonomous Vehicle Action Communications".
U.S. Appl. No. 15/409,099, filed Jan. 18, 2017, Konrardy et al., "Autonomous Vehicle Path Coordination".
U.S. Appl. No. 15/409,107, filed Jan. 18, 2017, Konrardy et al., "Autonomous Vehicle Signal Control".
U.S. Appl. No. 15/409,115, filed Jan. 18, 2017, Konrardy et al., "Autonomous Vehicle Application".
U.S. Appl. No. 15/409,136, filed Jan. 18, 2017, Konrardy et al., "Method and System for Enhancing the Functionality of a Vehicle".
U.S. Appl. No. 15/409,143, filed Jan. 18, 2017, Konrardy et al., "Autonomous Operation Suitability Assessment and Mapping".
U.S. Appl. No. 15/409,146, filed Jan. 18, 2017, Konrardy et al., "Autonomous Vehicle Routing".
U.S. Appl. No. 15/409,148, filed Jan. 18, 2017, Konrardy et al.,"System and Method for Autonomous Vehicle Sharing Using Facial Recognition".
U.S. Appl. No. 15/409,149, filed Jan. 18, 2017, Konrardy et al., "Autonomous Vehicle Routing During Emergencies".
U.S. Appl. No. 15/409,159, filed Jan. 18, 2017, Konrardy et al., "Autonomous Vehicle Trip Routing".

(56) References Cited

OTHER PUBLICATIONS

U.S. Appl. No. 15/409,163, filed Jan. 18, 2017, Konrardy et al., "Autonomous Vehicle Parking".
U.S. Appl. No. 15/409,167, filed Jan. 18, 2017, Konrardy et al., "Autonomous Vehicle Retrieval".
U.S. Appl. No. 15/409,180, filed Jan. 18, 2017, Konrardy et al., "Method and System for Repairing a Malfunctioning Autonomous Vehicle".
U.S. Appl. No. 15/409,198, filed Jan. 18, 2017, Konrardy et al., "System and Method for Autonomous Vehicle Ride Sharing Using Facial Recognition".
U.S. Appl. No. 15/409,213, filed Jan. 18, 2017, Konrardy et al., "Coordinated Autonomous Vehicle Automatic Area Scanning".
U.S. Appl. No. 15/409,215, filed Jan. 18, 2017, Konrardy et al., "Autonomous Vehicle Sensor Malfunction Detection".
U.S. Appl. No. 15/409,220, filed Jan. 18, 2017, Konrardy et al., "Autonomous Electric Vehicle Charging".
U.S. Appl. No. 15/409,228, filed Jan. 18, 2017, Konrardy et al., "Operator-Specific Configuration of Autonomous Vehicle Operation".
U.S. Appl. No. 15/409,236, filed Jan. 18, 2017, Konrardy et al., "Autonomous Vehicle Operation Adjustment Based Upon Route".
U.S. Appl. No. 15/409,239, filed Jan. 18, 2017, Konrardy et al., "Autonomous Vehicle Component Maintenance and Repair".
U.S. Appl. No. 15/409,243, filed Jan. 18, 2017, Konrardy et al., "Anomalous Condition Detection and Response for Autonomous Vehicles".
U.S. Appl. No. 15/409,248, filed Jan. 18, 2017, Konrardy et al., "Sensor Malfunction Detection".
U.S. Appl. No. 15/409,271, filed Jan. 18, 2017, Konrardy et al., "Autonomous Vehicle Component Malfunction Impact Assessment".
U.S. Appl. No. 15/409,305, filed Jan. 18, 2017, Konrardy et al., "Component Malfunction Impact Assessment".
U.S. Appl. No. 15/409,318, filed Jan. 18, 2017, Konrardy et al., "Automatic Repair of Autonomous Vehicles".
U.S. Appl. No. 15/409,336, filed Jan. 18, 2017, Konrardy et al., "Automatic Repair of Autonomous Components".
U.S. Appl. No. 15/409,340, filed Jan. 18, 2017, Konrardy et al., "Autonomous Vehicle Damage and Salvage Assessment".
U.S. Appl. No. 15/409,349, filed Jan. 18, 2017, Konrardy et al., "Component Damage and Salvage Assessment".
U.S. Appl. No. 15/409,359, filed Jan. 18, 2017, Konrardy et al., "Detecting and Responding to Autonomous Vehicle Collisions".
U.S. Appl. No. 15/409,371, filed Jan. 18, 2017, Konrardy et al., "Detecting and Responding to Autonomous Environment Incidents".
U.S. Appl. No. 15/409,445, filed Jan. 18, 2017, Konrardy et al., "Virtual Testing of Autonomous Vehicle Control System".
U.S. Appl. No. 15/409,473, filed Jan. 18, 2017, Konrardy et al., "Virtual Testing of Autonomous Environment Control System".
U.S. Appl. No. 15/410,192, filed Jan. 19, 2017, Konrardy et al., "Autonomous Vehicle Operation Feature Monitoring and Evaluation of Effectiveness".
U.S. Appl. No. 15/413,796, filed Jan. 24, 2017, Konrardy et al., "Autonomous Vehicle Refueling".
U.S. Appl. No. 15/421,508, filed Feb. 1, 2017, Konrardy et al., "Autonomous Vehicle Operation Feature Monitoring and Evaluation of Effectiveness".
U.S. Appl. No. 15/421,521, filed Feb. 1, 2017, Konrardy et al., "Autonomous Vehicle Operation Feature Monitoring and Evaluation of Effectiveness".
U.S. Appl. No. 15/472,813, filed Mar. 29, 2017, Konrardy et al., "Accident Response Using Autonomous Vehicle Monitoring".
U.S. Appl. No. 15/491,487, filed Apr. 19, 2017, Konrardy et al., "Autonomous Vehicle Insurance Pricing and Offering Based Upon Accident Risk Factors".
Wiesenthal et al., "The Influence of Music on Driver Stress," Journal of Applied Social Psychology 30(8):1709-19 (2000).

Wiesenthal et al., "The Influence of Music on Driver Stress," Journal of Applied Social Psychology 30, 8, pp. 1709-1719, 2000.
Young et al., "Cooperative Collision Warning Based Highway Vehicle Accident Reconstruction", Eighth International Conference on Intelligent Systems Design and Applications, Nov. 26-28, 2008, pp. 561-565.
Zhou et al., A Simulation Model to Evaluate and Verify Functions of Autonomous Vehicle Based on Simulink, Tongji University, 12 pages (2009).
U.S. Appl. No. 15/241,849, Nonfinal Office Action, dated Jun. 1, 2017.
U.S. Appl. No. 14/713,271, Final Office Action, dated Jun. 29, 2017.
Pohanka et al., Sensors simulation environment for sensor data fusion, 14th International Conference on Information Fusion, Chicago, IL, pp. 1-8 (2011).
Wang et al., Shader-based sensor simulation for autonomous car testing, 15th International IEEE Conference on Intelligent Transportation Systems, Anchorage, Alaska, pp. 224-229 (2012).
U.S. Appl. No. 14/713,184, Final Office Action, dated Jun. 29, 2017.
U.S. Appl. No. 14/713,188, Final Office Action, dated Sep. 8, 2017.
Garza, "Look Ma, No Hands!" Wrinkles and Wrecks in teh Age of Autonomous Vehicles, New England Law Review, vol. 46, pp. 581-616 (2012).
Al-Shihabi et al., A framework for modeling human-like driving behaviors for autonomous vehicles in driving simulators, Agents'01, pp. 286-291 (2001).
Villasenor, Products liability and driverless cars: Issues and guiding principles for legislation, Brookings Center for Technology Innovation, 25 pages (Apr. 2014).
Duffy et al., Sit, Stay, Drive: The Future of Autonomous Car Liability, SMU Science & Technology Law Review, vol. 16, pp. 101-123 (Winter 2013).
U.S. Appl. No. 14/713,201, Notice of Allowance, dated Mar. 28, 2017.
U.S. Appl. No. 14/713,214, Notice of Allowance, dated Sep. 11, 2017.
Marchant et al., The coming collision between autonomous vehicles and the liability system, Santa Clara Law Review, 52(4): Article 6 (2012).
Peterson, New technology—old law: autonomous vehicles and California's insurance framework, Santa Clara Law Review, 52(4):Article 7 (Dec. 2012).
Funkhouser, Paving the Road Ahead: Autonomous vehicles, products liability, and the need for a new approach, Utah Law Review, vol. 437, Issue 1 (2013).
U.S. Appl. No. 14/713,217, Final Office Action, dated Sep. 8, 2017.
Gurney, Sue my car not me: Products liability and accidents involving autonomous vehicles, Journal of Law, Technology & Policy (2013).
U.S. Appl. No. 14/713,223, Notice of Allowance, dated May 24, 2017.
U.S. Appl. No. 14/713,226, Notice of Allowance (second), dated Jan. 12, 2017.
U.S. Appl. No. 14/713,230, Final Office Action, dated Jun. 29, 2017.
U.S. Appl. No. 14/713,237, Notice of Allowance, dated Aug. 30, 2017.
U.S. Appl. No. 14/713,240, Notice of Allowance, dated Jun. 30, 2017.
U.S. Appl. No. 14/713,249, Final Office Action, dated Sep. 8, 2017.
U.S. Appl. No. 14/713,254, Final Office Action, dated Jun. 29, 2017.
U.S. Appl. No. 14/713,261, Notice of Allowance, dated Jul. 12, 2017.
U.S. Appl. No. 14/951,798, Final Office Action, dated Jul. 26, 2017.
U.S. Appl. No. 14/713,266, Notice of Allowance, dated May 5, 2017.
U.S. Appl. No. 15/606,049, filed May 26, 2017, Konrardy et al. "Autonomous Vehicle Operation Featuer Monitoring and Evaluation of Effectiveness".
U.S. Appl. No. 15/627,596, filed Jun. 20, 2017, Konrardy et al., "Driver Feedback Alerts Based Upon Monitoring Use of Autonomous Vehicle Operation Features".
U.S. Appl. No. 15/689,437, filed Aug. 29, 2017, Konrardy et al., "Accident Fault Determination for Autonomous Vehicles".

(56) References Cited

OTHER PUBLICATIONS

U.S. Appl. No. 14/934,361, Nonfinal Office Action, dated Jul. 10, 2017.
U.S. Appl. No. 14/934,371, Nonfinal Office Action, dated Jun. 1, 2017.
U.S. Appl. No. 14/934,405, Nonfinal Office Action, dated Apr. 20, 2017.
U.S. Appl. No. 14/934,347, Nonfinal Office Action, dated Mar. 16, 2017.
U.S. Appl. No. 15/241,849, Notice of Allowance, dated Sep. 29, 2017.
U.S. Appl. No. 15/241,826, Notice of Allowance, dated Sep. 20, 2017.
U.S. Appl. No. 15/241,769, Notice of Allowance, dated Jul. 7, 2017.
U.S. Appl. No. 15/409,115, Nonfinal Office Action, dated Oct. 3, 2017.

* cited by examiner

VEHICULAR WARNINGS BASED UPON PEDESTRIAN OR CYCLIST PRESENCE

CROSS REFERENCE TO RELATED APPLICATIONS

This application is a continuation of, and claims the benefit of, U.S. application Ser. No. 15/241,849 (filed on Aug. 19, 2016). The entirety of the foregoing application is incorporated by reference herein.

In addition, this application claims the benefit of U.S. Provisional Application No. 62/211,337 (filed on Aug. 28, 2015); U.S. Provisional Application No. 62/262,671 (filed on Dec. 3, 2015); U.S. Provisional Application No. 62/296,839 (filed on Feb. 18, 2016); U.S. Provisional Application No. 62/367,460 (filed on Jul. 27, 2016); U.S. Provisional Application No. 62/367,466 (filed on Jul. 27, 2016); U.S. Provisional Application No. 62/367,467 (filed on Jul. 27, 2016); U.S. Provisional Application No. 62/367,470 (filed on Jul. 27, 2016); U.S. Provisional Application No. 62/367,474 (filed on Jul. 27, 2016); U.S. Provisional Application No. 62/367,479 (filed on Jul. 27, 2016); U.S. Provisional Application No. 62/369,531 (filed on Aug. 1, 2016); U.S. Provisional Application No. 62/369,537 (filed on Aug. 1, 2016); U.S. Provisional Application No. 62/369,552 (filed on Aug. 1, 2016); U.S. Provisional Application No. 62/369,563 (filed on Aug. 1, 2016); and U.S. Provisional Application No. 62/369,577 (filed on Aug. 1, 2016). The entirety of each of the foregoing provisional applications is incorporated by reference herein.

Additionally, the present application is related to co-pending U.S. patent application Ser. No. 15/241,769 (filed on Aug. 19, 2016); co-pending U.S. patent application Ser. No. 15/241,812 (filed on Aug. 19, 2016); co-pending U.S. patent application Ser. No. 15/241,817 (filed on Aug. 19, 2016); co-pending U.S. patent application Ser. No. 15/241,826 (filed on Aug. 19, 2016); co-pending U.S. patent application Ser. No. 15/241,832 (filed on Aug. 19, 2016); co-pending U.S. patent application Ser. No. 15/241,842 (filed on Aug. 19, 2016); co-pending U.S. patent application Ser. No. 15/241,859 (filed on Aug. 19, 2016); co-pending U.S. patent application Ser. No. 15/241,916 (filed on Aug. 19, 2016); co-pending U.S. patent application Ser. No. 15/241,922 (filed on Aug. 19, 2016); and co-pending U.S. patent application Ser. No. 15/241,932 (filed on Aug. 19, 2016).

FIELD OF THE DISCLOSURE

The present disclosure generally relates to vehicle and pedestrian safety, and, more particularly, to generating and collecting data at a connected vehicle, and using the data and/or vehicle-to-other device (V2x) wireless communication (e.g., vehicle-to-vehicle or vehicle-to-infrastructure) and data transmission to facilitate safer vehicle travel and/or provide auto insurance cost savings to consumers.

BACKGROUND

Conventional telematics devices may collect certain types of data regarding vehicle operation. However, conventional telematics devices and data gathering techniques may have several drawbacks. Specifically, conventional telematics devices only monitor the movement and operating status of the vehicle in which they are disposed. Such data is limited to determining the vehicle location, whether the vehicle has been in an accident, or similar simple information regarding the vehicle.

BRIEF SUMMARY

Methods and systems are described for providing vehicular alerts. In various aspects, a vehicle environment may be monitored using one or more sensors associated with a vehicle located in the vehicle environment. One or more pedestrians or cyclists within the vehicle environment may be identified based upon sensor data obtained from the one or more sensors. At least one of the pedestrians or cyclists may be determined to meet predetermined alert criteria based upon the sensor data. An alert indicating a presence of the pedestrians or cyclists may be generated and presented to an output device associated with the vehicle.

In another aspect, a computer system for providing alerts is described. The computer system may include one or more sensors associated with a vehicle and one or more processors communicatively connected to the one or more sensors. The computer system may also include an output device associated with the vehicle and communicatively connected to the one or more processors. The computer system may monitor a vehicle environment in which the vehicle is located using the one or more sensors and identify one or more pedestrians or cyclists within the vehicle environment based upon sensor data obtained from the one or more sensors. The computer system may determine that at least one of the one or more pedestrians or cyclists meets predetermined alert criteria based upon the sensor data. The computer system may then generate an alert indicating a presence of the at least one of the one or more pedestrians or cyclists and present the alert to the output device.

In another aspect, the one or more pedestrians or cyclists may be identified based upon wireless communication between the vehicle and one or more mobile computing devices associated with the one or more pedestrians or cyclists. In a further aspect, the one or more pedestrians or cyclists may be identified based upon global positioning system (GPS) data received via a communication network from GPS-enabled devices associated with the one or more pedestrians or cyclists. In a further aspect, the identification of the one or more pedestrians or cyclists may include determining that the one or more pedestrians or cyclists are within a threshold distance of the vehicle.

In another aspect, a projected path may be determined for each of the identified one or more pedestrians or cyclists based upon the sensor data, and the determination that the at least one of the one or more pedestrians or cyclists meets the predetermined alert criteria may include determining that the projected path of the at least one of the one or more pedestrians or cyclists will pass within an alert threshold distance of the vehicle. In another aspect, the alert threshold distance may depend upon a speed at which the vehicle is traveling. In another aspect, the determination that the at least one of the one or more pedestrians or cyclists meets the predetermined alert criteria may include determining that the at least one of the one or more pedestrians or cyclists will be within a roadway when the projected path of the at least one of the one or more pedestrians or cyclists will pass within the alert threshold distance of the vehicle.

In another aspect, the determination that the at least one of the one or more pedestrians or cyclists meets the predetermined alert criteria may include determining that the at least one of the one or more pedestrians or cyclists will pass the vehicle at a speed exceeding a speed threshold. In another aspect, the alert may indicate a direction of the at least one of the one or more pedestrians or cyclists relative to the vehicle.

In other aspects, telematics data and/or geographic location data may be collected, monitored, measured, and/or generated by one or more computing devices associated with a vehicle. The telematics data may include various metrics that indicate the direction, speed, acceleration, braking, cornering, and/or motion of the vehicle in which the data is associated. The geographic location data may include a geographic location of the vehicle, such as latitude and longitude coordinates, for example. The one or more computing devices may include smart vehicle controller, vehicle central computer, an on-board computer integrated within the vehicle, a mobile device, and/or a combination of these devices working in conjunction with one another. The one or more computing devices may broadcast the telematics data and/or the geographic location data to one or more other devices via V2x communication, such as to other vehicles, infrastructure, remote servers, or mobile devices, including mobile devices of other drivers, pedestrians and/or cyclists.

The telematics data and/or the geographic location data may be received and/or processed by one or more other computing devices to determine whether an anomalous condition exists, such as a traffic accident, for example. These one or more other computing devices may be vehicle computing devices, external computing devices (e.g., a remote server), another mobile computing device, a smart traffic infrastructure device (e.g., a smart traffic light), etc. If an anomalous condition is detected, the geographic location of the vehicle associated with the telematics data may be used as a condition to decide whether to generate an alert at (or send an alert notification to) the one or more other computing devices associated with nearby vehicles.

The telematics, location, and/or other data collected or generated by a connected vehicle may be used for various purposes. The data may be used by an insurance provider to generate auto insurance discount and/or risk averse profiles based upon average or typical vehicle travel environment. The data collected may be used for accident reconstruction and/or accident cause determination. The present embodiments may also entail electric or hybrid vehicle battery conservation. The data collected may be used to generate vehicle-usage profiles that more accurately reflect vehicle risk, or lack thereof, and facilitate more appropriate auto insurance pricing. The data collected may be used to generate a traffic condition broadcast that is broadcasted to nearby vehicles or smart infrastructure via V2x (such as Vehicle-to-Vehicle, Vehicle-to-Infrastructure or Vehicle-to-Person) wireless communication. Individual consumers may also collected their own telematics data, and then share their data when they choose with various merchants, such as rental car companies, to get discounted pricing on products or services.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

Figure 1:
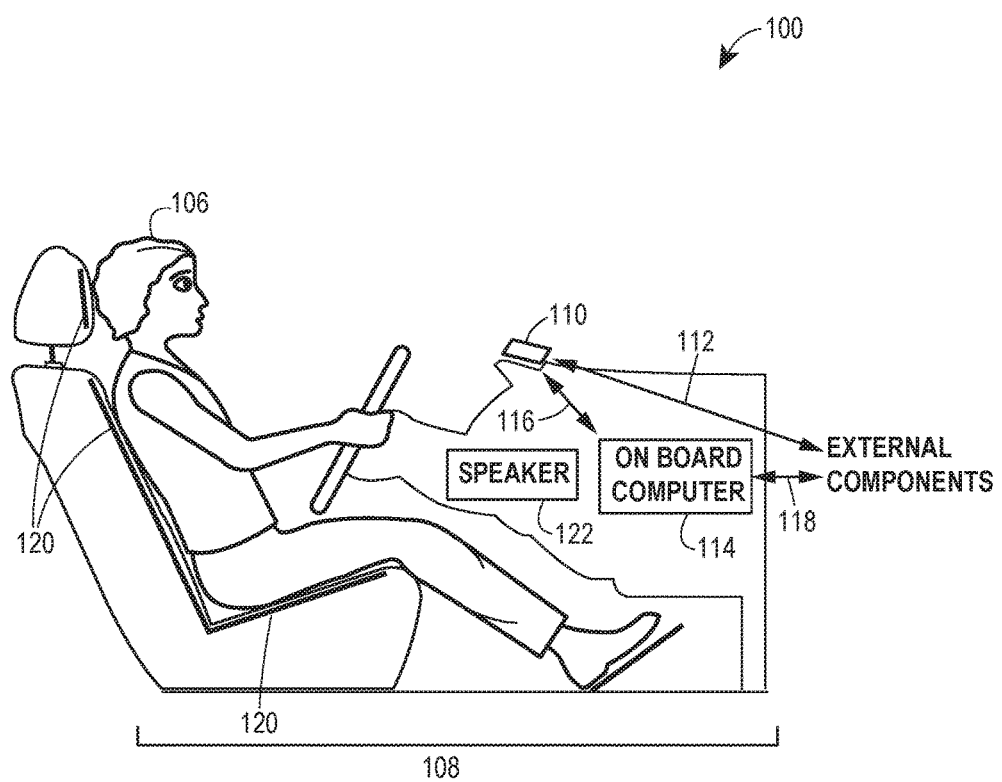
FIG. 1 illustrates a block diagram of an exemplary telematics collection system in accordance with an exemplary aspect of the present disclosure.

The Figures depict preferred embodiments for purposes of illustration only. Alternative embodiments of the systems and methods illustrated herein may be employed without departing from the principles of the invention described herein.

DETAILED DESCRIPTION

The present embodiments relate to, inter alia, determining whether an anomalous condition is detected at the location of a vehicle using one or more computing devices within or otherwise associated with the vehicle. If the detected anomalous condition may impact or affect another vehicle on the road, embodiments are described to generate and/or send alert notifications to other vehicles that may be so affected. As further described throughout the disclosure, the process of detecting anomalous conditions and whether they apply to other vehicles may be performed through an analysis of geographic location data and/or telematics data broadcasted from one or more computing devices within or otherwise associated with one or more respective vehicles.

The present embodiments may relate to collecting, transmitting, and/or receiving telematics data; and may include a mobile device, a vehicle-mounted processor, computer server, web pages, applications, software modules, user interfaces, interactive display screens, memory units, and/or other electronic, electrical, and/or wireless communication equipment configured to provide the functionality discussed herein. As compared with the prior art, the present embodiments include specifically configured computing equipment that provide for an enhanced method of collecting telematics and/or other vehicle/driving conditions related data, and performing certain actions based upon the data collected. Using the telematics and/or other data collected, in conjunction with the novel techniques discussed herein, recommendations and/or travel/driving guidance may be provided to remote vehicles and/or drivers.

The present embodiments may solve one or more technical problems related to (1) vehicle safety, and/or (2) vehicle navigation by using solutions or improvements in another technological field, namely telematics. Vehicle safety and vehicle navigation is often impacted by short-term traffic events that occur with little or no warning. For instance, vehicle accidents may be caused by road construction, other vehicle accidents, traffic being temporarily re-routed, unexpected bad weather, other drivers or vehicles, etc.

To address these and other problems, telematics data (and/or driver behavior or vehicle information) may be captured in real-time, or near real-time, by a computing device, such as a vehicle-mounted computer, smart vehicle controller, or a mobile device of a vehicle driver (or passenger). The computing device may be specifically configured for gathering, collecting, and/or generating telematics and/or other data as a vehicle is traveling.

For instance, the vehicle-mounted computer or the mobile device may be equipped with (i) various sensors and/or meters capable of generating telematics data (GPS unit, speed sensor, speedometer, odometer, gyroscope, compass, accelerometer, etc.) and/or (ii) an application, such as a Telematics Data Application or Telematics "App," that includes computer instructions and/or software modules stored in a non-transitory memory unit that control collecting and generating telematics and/or other data. The computing device and/or the application (or Telematics App) may provide a software module, user interface, and/or interactive display screen configured to facilitate the data collection. The computing device and/or Telematics App executing thereon may be configured to prepare or otherwise format the telematics and/or other data collected or generated for transmission (via wireless communication and/or data transmission) to a mobile device of a second driver, a remote server, another (smart) vehicle, and/or smart infrastructure—all of which may be equipped with its own Telematics App or other telematics related applications. The Telematics App may include other functionality, including the mobile device functionality discussed elsewhere herein.

Alternatively, the computing device may remotely access a web page, such as via wireless communication with a remote server. The web page may provide the computing device with the functionality to collect the telematics and/or other data as the vehicle is moving. Additionally or alternatively, the web page may allow the computing device to upload or transmit data in real-time, or near real-time, to a mobile device of a second driver, a remote server, smart infrastructure, and/or another (smart) vehicle.

Additionally or alternatively, a smart vehicle controller or processor may be configured with the same functionality as that of the computing device described above. For instance, a smart vehicle controller may include an application, software module, or computer instructions that provide for the telematics and/or other data collection and generation functionality discussed herein. The smart vehicle controller may be in wired or wireless communication with various ("smart" or "dumb") vehicle-mounted meters, sensors, and/or detectors, such as speedometers, speed sensors, compasses, gyros, accelerometers, etc. that collect and/or generate telematics data and/or other data detailing or associated with vehicle operation, and/or driving or driver behavior.

In one aspect, by solving problems with collecting telematics data and/or other data associated with driver behavior and/or vehicle operation or performance, problems with vehicle navigation and/or vehicle operation may be resolved. For instance, telematics data associated with a first vehicle may be collected in real-time by a first vehicle computer or a mobile device of a first driver. The first vehicle may be specifically configured to gather or generate telematics and/or other driver/vehicle data in real-time as the first vehicle is traveling, such as via a Telematics App. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers, etc.), the telematics (and/or data) data collected may indicate such.

The computing device, such as a vehicle computer or a mobile device (and/or Telematics App) may be configured to identify the type of traffic event and transmit the type of traffic event to other mobile devices, a remote server, smart vehicles, and/or smart infrastructure. In one embodiment, a mobile device (and/or Telematics App) may be in wireless communication with a smart vehicle control system of the vehicle, and the smart vehicle control system may transmit the telematics and/or other data, and/or any associated warnings, to a remote server, and/or roadside smart infrastructure or nearby mobile device or vehicles of other drivers (such as to conserve battery power of the mobile device).

Alternatively, the mobile device (and/or Telematics App) may transmit the telematics and/or other data collected via wireless communication and/or data transmission to a second computing device—such as a second mobile device (or another driver), a second and smart vehicle, a remote server, and/or road side infrastructure (smart street signs or road posts, smart toll booths, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

An insurance provider may collect an insured's usage of the vehicle safety functionality provided herein, such as at an insurance provider remote server and/or via a mobile device application. Based upon an individual's usage and/or taking travel recommendations, such as travel recommendations that reduce or lower risk and/or enhance driver or vehicle safety, insurance policies (such as vehicle or life insurance policies) may be adjusted, generated, and/or updated. The insurance provider remote server may calculate, update, and/or adjust insurance premiums, rates, discounts, points, programs, etc., such as adjusting an insurance discount or premium based upon the insured having the functionality discussed herein and/or the amount that the insured uses the functionality discussed herein. The updated insurance policies (and/or premiums, rates, discounts, etc.) may be communicated to insurance customers for their review, modification, and/or approval—such as via wireless communication or data transmission from a remote server to a mobile device or the insured.

Telematics and Vehicle Navigation

In one aspect, by solving problems with collecting telematics data and/or other data associated with driver behavior and/or vehicle operation or performance, problems with vehicle navigation and/or vehicle operation may be resolved. For instance, telematics data associated with a first vehicle may be collected in real-time by vehicle computer or a mobile device of a first driver. The computing device may be specifically configured to gather or generate telematics and/or other driver/vehicle data in real-time as the vehicle is traveling. If a traffic event is encountered, about to be encountered, and/or expected or anticipated to be encountered by the vehicle as it travels (e.g., road construction; heavy traffic; congestion; bad weather conditions; unlawful, unexpected or erratic operation of other vehicles; questionable or abnormal driving behavior of other drivers; irresponsible or overly aggressive drivers; un-attentive or tired drivers, etc.), the telematics (and/or other) data collected may indicate such.

The computing device itself may be configured to identify the type of traffic event and transmit the type of traffic event to mobile devices, a remote server, smart vehicles, and/or smart infrastructure. In one embodiment, a mobile device collecting telematics data may be in wireless communication with a smart vehicle control system of the vehicle, and the smart vehicle control system may transmit the telematics and/or other data, and/or any associated warnings, to a remote server, and/or roadside smart infrastructure or nearby mobile device or vehicles of other drivers (such as to conserve battery power of the mobile device).

Additionally or alternatively, the computing device (e.g., vehicle processor, mobile device, or conventional telematics device) may transmit the telematics and/or other data collected via wireless communication and/or data transmission to a second computing device—such as a second mobile device (or another driver), a second and smart vehicle, a remote server, and/or road side infrastructure (smart street signs or road posts, smart toll booths, etc.). After which, the second and remote computing device may analyze the telematics and/or other data that is collected in real-time, or near real-time, to determine traffic events in real-time, or near real-time, respectively. Based upon the type and extent of traffic event detected, the second computing device may issue warnings, determine recommendations, and/or re-route vehicles. For instance, the second computing device may cause a display screen or user interface of a mobile device or smart vehicle controller of remote drivers to display a map with (1) a current route that the vehicle is on, (2) a virtual representation of the traffic event, and/or (3) an alternate or recommended new route to an original destination that avoids the traffic event.

Exemplary Telematics Collection System

FIG. 1 illustrates a block diagram of an exemplary telematics collection system 100 in accordance with an exemplary aspect of the present disclosure. In some aspects, telematics collection system 100 may include hardware and software applications configured to measure, calculate, generate, and/or collect geographic location data and/or telematics data indicative of the speed, direction, and/or motion of vehicle 108. Additionally or alternatively, telematics collection system 100 may include hardware and software applications configured to receive and process geographic location data and/or telematics data sent from another telematics collection system, to determine whether an anomalous condition has been detected, whether to generate an alert, and/or whether to send an alert notification. Telematics collection system 100 may include various data communication channels for facilitating data communications between the various hardware and software components and/or communications with one or more external components.

To accomplish this, telematics collection system 100 may include any suitable number of computing devices, such as mobile computing device 110 and/or on-board computing device 114, for example. These computing devices may be disposed within vehicle 108, permanently installed in vehicle 108, or removably installed in vehicle 108.

In the present aspects, mobile computing device 110 may be implemented as any suitable computing or mobile device, such as a mobile device (e.g., smartphone, tablet, laptop, wearable electronics, phablet, pager, personal digital assistant (PDA), smart glasses, smart watch or bracelet, etc.), while on-board computer 114 may be implemented as a general-use on-board computer or processor(s) installed by the manufacturer of vehicle 108 or as an aftermarket modification to vehicle 108, for example. In various aspects, mobile computing device 110 and/or on-board computer 114 may be a thin-client device configured to outsource any suitable portion of processing via communications with one or more external components.

On-board computer 114 may supplement one or more functions performed by mobile computing device 110 described herein by, for example, sending information to and/or receiving information from mobile computing device 110. Mobile computing device 110 and/or on-board computer 114 may communicate with one or more external components via links 112 and 118, respectively. Additionally, mobile computing device 110 and on-board computer 114 may communicate with one another directly via link 116.

In one aspect, mobile computing device 110 may be configured with suitable hardware and/or software (e.g., one or more applications, programs, files, etc.) to determine a geographic location of mobile computing device 110 and, hence, vehicle 108, in which it is positioned. Additionally or alternatively, mobile computing device 110 may be configured with suitable hardware and/or software to monitor, measure, generate, and/or collect one or more sensor metrics as part of the telematics data. Mobile computing device 110 may be configured to broadcast the geographic location data and/or the one or more sensor metrics to one or more external components.

In some aspects, the external components may include another mobile computing device substantially similar to or identical to mobile computing device 110. In accordance with such aspects, mobile computing device 110 may additionally or alternatively be configured to receive geographic location data and/or sensor metrics broadcasted from another mobile computing device, the details of which are further discussed below. Mobile computing device 110 may be configured to determine, upon receiving the geographic location data and/or sensor metrics, whether an anomalous condition exists at the geographic location indicated by the geographic location data. If so, mobile computing device 110 may be configured to generate one or more audio and/or video alerts indicative of the determined anomalous condition.

On-board computer 114 may be configured to perform one or more functions otherwise performed by mobile computing device 110. However, on-board computer 114 may additionally be configured to obtain geographic location data and/or telematics data by communicating with one or more vehicle sensors that are integrated into vehicle 108. For example, on-board computer 114 may obtain geographic location data via communication with a vehicle-integrated global navigation satellite system (GNSS). To provide additional examples, on-board computer 114 may obtain one or more metrics related to the speed, direction, and/or motion of vehicle 108 via any number of suitable sensors, such as speedometer sensors, braking sensors, airbag deployment sensors, crash detection sensors, accelerometers, etc.

In one aspect, mobile computing device 110 and/or on-board computer 114 may operate independently of one another to generate geographic location data and/or telematics data, to receive geographic location data and/or telematics data broadcasted from another telematics collection system, to determine whether to generate one or more alerts, and/or to generate one or more alert notifications. In accordance with such aspects, telematics collection system 100 may include mobile computing device 110 but not on-board computer 114, and vice-versa.

In other aspects, mobile computing device 110 and/or on-board computer 114 may operate in conjunction with one another to generate geographic location data and/or telematics data, to receive geographic location data and/or telematics data broadcasted from another telematics collection system, to determine whether to generate one or more alerts, and to generate one or more alert notifications. In accordance with such aspects, telematics collection system 100 may include both mobile computing device 110 and on-board computer 114. Mobile computing device 110 and on-board computer 114 may share any suitable portion of processing between one another to facilitate the functionality described herein.

Upon receiving notification alerts from another telematics collection system, aspects include telematics collection system 100 generating alerts via any suitable audio, video, and/or tactile techniques. For example, alerts may be generated via a display implemented by mobile computing device 110 and/or on-board computer 114. To provide another example, a tactile alert system 120 (e.g., a seat that can vibrate) may be configured to generate tactile alerts to a vehicle operator 106 when commanded by mobile computing device 110 and/or on-board computer 114. To provide another example, audible alerts may be generated via a speaker 122, which may be part of vehicle 108's integrated speaker system, for example.

Although telematics collection system 100 is shown in FIG. 1 as including one mobile computing device 110 and one on-board computer 114, various aspects include telematics collection system 100 implementing any suitable number of mobile computing devices 110 and/or on-board computers 114.

Exemplary Telematics Alert Notification System

Figure 2:
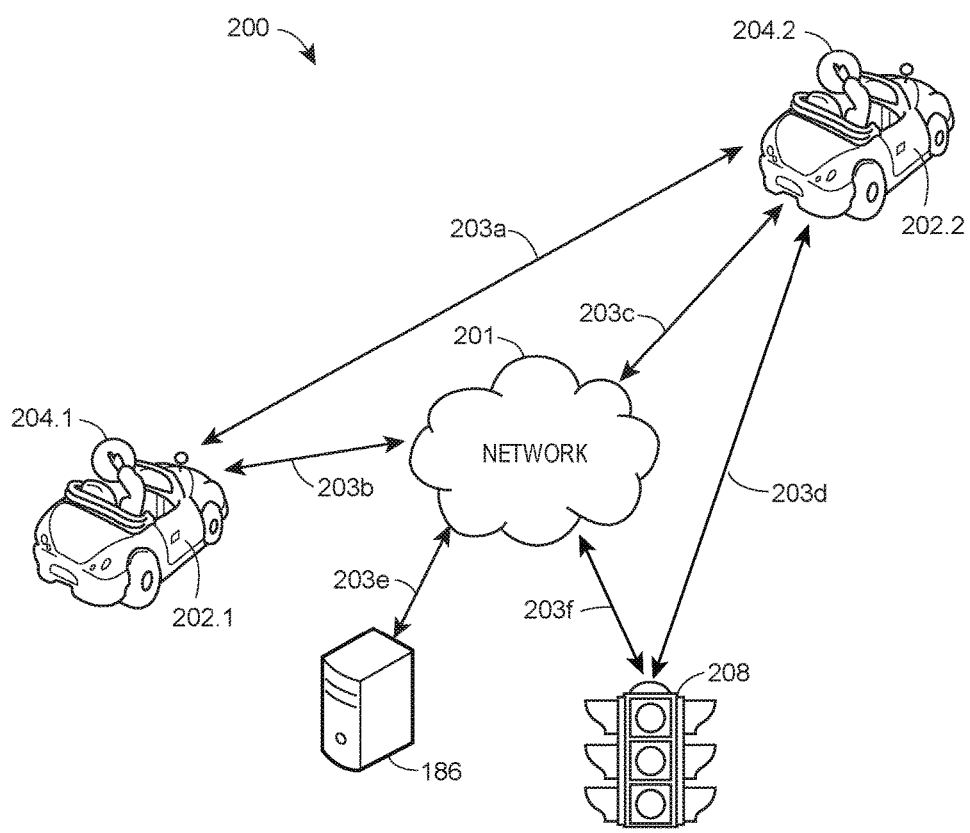
FIG. 2 illustrates a block diagram of an exemplary system that collects telematics and/or other data, and uses V2x wireless communication to broadcast the data collected to other vehicles, mobile devices, remote servers, and smart infrastructure in accordance with an exemplary aspect of the present disclosure.

FIG. 2 illustrates a block diagram of an exemplary alert notification system 200 in accordance with an exemplary aspect of the present disclosure. In one aspect, alert notification system 200 may include a network 201, N number of vehicles 202.1-202.N and respective mobile computing devices 204.1-204.N, an external computing device 206, and/or an infrastructure component 208. In one aspect, mobile computing devices 204 may be an implementation of mobile computing device 110, as shown in FIG. 1, while vehicles 202 may be an implementation of vehicle 108, also shown in FIG. 1. Each of vehicles 202.1 and 202.2 may have an associated on-board computer, which is not shown in FIG. 2 for purposes of brevity, but may be an implementation of on-board computer 114, as shown in FIG. 1. Each of vehicles 202.1 and 202.2 may be configured for wireless inter-vehicle communication, such as vehicle-to-vehicle (V2V) wireless communication and/or data transmission.

Although alert notification system 200 is shown in FIG. 2 as including one network 201, two mobile computing devices 204.1 and 204.2, two vehicles 202.1 and 202.2, one external computing device 206, and/or one infrastructure component 208, various aspects include alert notification system 200 implementing any suitable number of networks 201, mobile computing devices 204, vehicles 202, external computing devices 206, and/or infrastructure components 208. For example, alert notification system 200 may include a plurality of external computing devices 206 and more than two mobile computing devices 204, any suitable number of which being interconnected directly to one another and/or via network 201.

In one aspect, each of mobile computing devices 204.1 and 204.2 may be configured to communicate with one another directly via peer-to-peer (P2P) wireless communication and/or data transfer. In other aspects, each of mobile computing devices 204.1 and 204.2 may be configured to communicate indirectly with one another and/or any suitable device via communications over network 201, such as external computing device 206 and/or infrastructure component 208, for example. In still other aspects, each of mobile computing devices 204.1 and 204.2 may be configured to communicate directly and indirectly with one and/or any suitable device, which may be concurrent communications or communications occurring at separate times.

Each of mobile computing devices 204.1 and 204.2 may be configured to send data to and/or receive data from one another and/or via network 201 using one or more suitable communication protocols, which may be the same communication protocols or different communication protocols as one another. To provide an example, mobile computing devices 204.1 and 204.2 may be configured to communicate with one another via a direct radio link 203a, which may utilize, for example, a Wi-Fi direct protocol, an ad-hoc cellular communication protocol, etc. Furthermore, mobile computing devices 204.1 and 204.2 may be configured to communicate with the vehicle on-board computers located in vehicles 202.1 and 202.1, respectively, utilizing a BLUETOOTH communication protocol (radio link not shown).

To provide additional examples, mobile computing devices 204.1 and 204.2 may be configured to communicate with one another via radio links 203b and 203c by each communicating with network 201 utilizing a cellular communication protocol. As an additional example, mobile computing devices 204.1 and/or 204.2 may be configured to communicate with external computing device 206 via radio links 203b, 203c, and/or 203e. Still further, one or more of mobile computing devices 204.1 and/or 204.2 may also be configured to communicate with one or more smart infrastructure components 208 directly (e.g., via radio link 203d) and/or indirectly (e.g., via radio links 203c and 203f via network 201) using any suitable communication protocols.

Mobile computing devices 204.1 and 204.2 may be configured to execute one or more algorithms, programs, applications, etc., to determine a geographic location of each respective mobile computing device (and thus their associated vehicle) to generate, measure, monitor, and/or collect one or more sensor metrics as telematics data, to broadcast the geographic data and/or telematics data via their respective radio links, to receive the geographic data and/or telematics data via their respective radio links, to determine whether an alert should be generated based upon the telematics data and/or the geographic location data, to generate the one or more alerts, and/or to broadcast one or more alert notifications.

Network 201 may be implemented as any suitable network configured to facilitate communications between mobile computing devices 204.1 and/or 204.2 and one or more of external computing device 206 and/or smart infrastructure component 208. For example, network 201 may include one or more telecommunication networks, nodes, and/or links used to facilitate data exchanges between one or more devices, and may facilitate a connection to the Internet for devices configured to communicate with network 201. Network 201 may include any suitable number of interconnected network components that form an aggregate network system, such as dedicated access lines, plain ordinary telephone lines, satellite links, cellular base stations, a public switched telephone network (PSTN), etc., or any suitable combination thereof. Network 201 may include, for example, a proprietary network, a secure public internet, a mobile-based network, a virtual private network, etc.

In aspects in which network 201 facilitates a connection to the Internet, data communications may take place over the network 201 via one or more suitable Internet communication protocols. For example, network 201 may be implemented as a wireless telephony network (e.g., GSM, CDMA, LTE, etc.), a Wi-Fi network (e.g., via one or more IEEE 802.11 Standards), a WiMAX network, a Bluetooth network, etc. Thus, links 203a-203f may represent wired links, wireless links, or any suitable combination thereof.

In aspects in which mobile computing devices 204.1 and 204.2 communicate directly with one another in a peer-to-peer fashion, network 201 may be bypassed and thus communications between mobile computing devices 204.1 and 204.2 and external computing device 206 may be unnecessary. For example, in some aspects, mobile computing device 204.1 may broadcast geographic location data and/or telematics data directly to mobile computing device 204.2. In this case, mobile computing device 204.2 may operate independently of network 201 to determine whether an alert should be generated at mobile computing device 204.2 based upon the geographic location data and the telematics data. In accordance with such aspects, network 201 and external computing device 206 may be omitted.

However, in other aspects, one or more of mobile computing devices 204.1 and/or 204.2 may work in conjunction with external computing device 206 to generate alerts. For example, in some aspects, mobile computing device 204.1 may broadcast geographic location data and/or telematics data, which is received by external computing device 206. In this case, external computing device 206 may be configured to determine whether an alert should be sent to mobile computing device 204.2 based upon the geographic location data and the telematics data.

External computing device 206 may be configured to execute various software applications, algorithms, and/or other suitable programs. External computing device 206 may be implemented as any suitable type of device to facilitate the functionality as described herein. For example, external computing device 206 may be implemented as a network server, a web-server, a database server, one or more databases and/or storage devices, or any suitable combination thereof. Although illustrated as a single device in FIG. 2, one or more portions of external computing device 206 may be implemented as one or more storage devices that are physically co-located with external computing device 206, or as one or more storage devices utilizing different storage locations as a shared database structure (e.g. cloud storage).

In some embodiments, external computing device 206 may be configured to perform any suitable portion of the processing functions remotely that have been outsourced by one or more of mobile computing devices 204.1 and/or 204.2. For example, mobile computing device 204.1 and/or 204.2 may collect data (e.g., geographic location data and/or telematics data) as described herein, but may send the data to external computing device 206 for remote processing instead of processing the data locally. In such embodiments, external computing device 206 may receive and process the data to determine whether an anomalous condition exists and, if so, whether to send an alert notification to one or more mobile computing devices 204.1 and 204.2.

Smart infrastructure component 208 may be configured to communicate with one or more devices directly and/or indirectly. For example, smart infrastructure component 208 may be configured to communicate directly with mobile computing device 204.2 via link 203.d and/or with mobile computing device 204.1 via links 203b and 203f utilizing network 201. To provide another example, smart infrastructure component 208 may communicate with external computing device 206 via links 203e and 203f utilizing network 201.

Smart infrastructure component 208 may be implemented as any suitable type of traffic infrastructure component configured to receive communications from and/or to send communications to other devices, such as external computing devices 204.1, 204.2 and/or external computing device 206, for example. For example, smart infrastructure component 208 may be implemented as a traffic light, a railroad crossing light, a construction notification sign, a roadside display configured to display messages, a billboard display, etc.

In some aspects, smart infrastructure component 208 may be configured to receive geographic location data and/or telematics data from one or more other devices and to process this data to determine whether an anomalous condition has been detected and whether the detected anomalous condition satisfies a threshold distance condition with respect to smart infrastructure component 208. The threshold distance condition may include, for example, the geographic location of the anomalous condition being within a threshold radius of smart infrastructure component 208, on the same road serviced by smart infrastructure component 208, etc. If so, smart infrastructure component 208 may perform one or more relevant actions such as displaying one or more relevant messages to notify drivers in the vicinity, to modify traffic patterns, to change traffic light timing, to redirect traffic, etc.

In other aspects, smart infrastructure component 208 may receive data indicating that an alert is to be generated and/or the type of alert that is to be generated. In accordance with such aspects, one or more of mobile computing devices 204.1, 204.2 and/or external computing device 206 may make the determination of whether an anomalous condition exists and is within a threshold distance of smart infrastructure component 208. If so, the data received by smart infrastructure component 208 may be indicative of the type of anomalous condition, the location of the anomalous condition, commands to cause smart infrastructure component 208 to perform one or more acts, the type of acts to perform, etc.

To provide some illustrative examples, if smart infrastructure component 208 is implemented as a smart traffic light, smart infrastructure component 208 may change a traffic light from green to red (or vice-versa) or adjust a timing cycle to favor traffic in one direction over another. To provide another example, if smart infrastructure component 208 is implemented as a traffic sign display, smart infrastructure component 208 may display a warning message that the anomalous condition (e.g., a traffic accident) has been detected ahead and/or on a specific road corresponding to the geographic location data.

Exemplary End-User/Destination Devices

The following details regarding the determination of an anomalous condition are explained in this section with reference to computing device 300. In the present aspect, computing device 300 may be implemented as any suitable computing device, such as a mobile computing device (e.g., mobile computing device 100, as shown in FIG. 1). In another aspect, computing device 300 may be implemented as an on-board vehicle computer (e.g., on-board vehicle computer 114, as shown in FIG. 1). In still other aspects, computing device 300 may be implemented as a device external to a vehicle (e.g., remote computing device 206 or smart infrastructure component 208, as shown in FIG. 2).

Depending upon the implementation of computing device 300, the methods and processes utilized to determine the existence of anomalous conditions may be performed locally, remotely, or any suitable combination of local and remote processing techniques.

Figure 3:
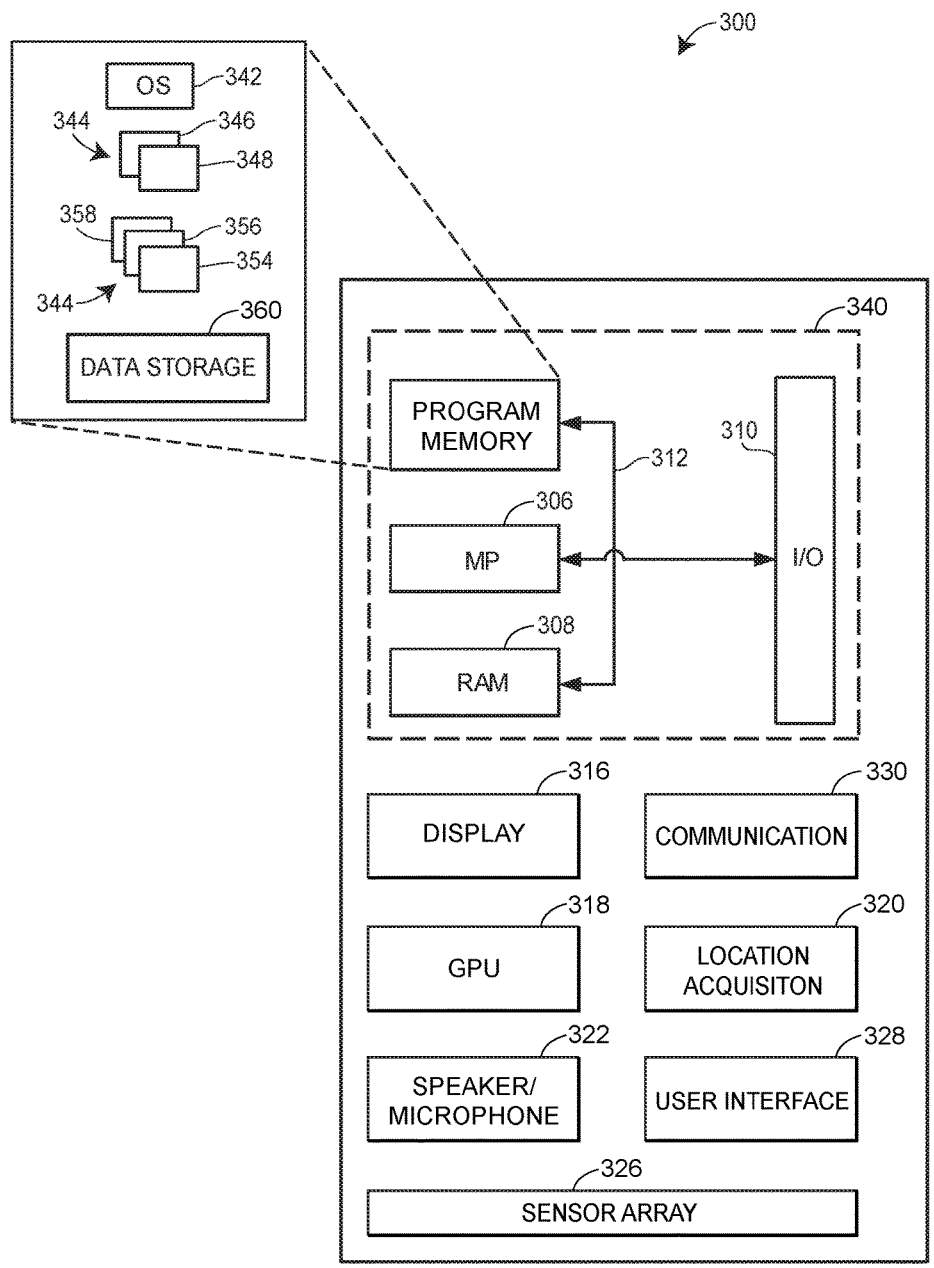
FIG. 3 illustrates a block diagram of an exemplary computing device in accordance with an exemplary aspect of the present disclosure.

FIG. 3 illustrates a block diagram of an exemplary computing device 300 in accordance with an exemplary aspect of the present disclosure. Computing device 300 may be implemented as any suitable computing device configured to (1) monitor, measure, generate, and/or or collect telematics and/or other data (including image, video, and/or audio data); (2) broadcast the geographic location, telematics, and/or other data to one or more external components, such as via wireless communication and/or data transmission; (3) receive geographic location, telematics, and/or other data broadcasted from another device, such as via wireless communication and/or data transmission; (4) determine whether an anomalous condition exists at the geographic location indicated by the geographic location data based upon the telematics and/or other data; (5) generate one or more alerts indicative of the anomalous condition; and/or (6) broadcast one or more alert notifications to other devices, such as via wireless communication and/or data transmission.

Computing device 300 may include a display 316, a graphics processing unit (GPU) 318, a location acquisition unit 320, a speaker/microphone 322, a sensor array 326, a user interface 328, a communication unit 330, and/or a controller 340.

In one aspect, controller 340 may include a program memory 302, a microprocessor (MP) 306, a random-access memory (RAM) 308, and/or an input/output (I/O) interface 310, each of which may be interconnected via an address/data bus 312. Controller 340 may be implemented as any suitable type and/or number of processors, such as a host processor for the relevant device in which computing device 300 is implemented, for example. In some aspects, controller 240 may be configured to communicate with additional data storage mechanisms that are not shown in FIG. 3 for purposes of brevity (e.g., one or more hard disk drives, optical storage drives, solid state storage devices, etc.) that reside within or are otherwise associated with mobile computing device 200.

Program memory 302 may store data used in conjunction with one or more functions performed by computing device 300 to facilitate the interaction between computing device 300 and one or more other devices. For example, if computing device 300 is implemented as a mobile computing device (e.g., mobile computing device 204.1, as shown in FIG. 2), then program memory 302 may store one or more programs, applications, algorithms, etc. that, when executed by controller 340, facilitate the interaction between mobile computing device 204.1 and (i) one or more networks (e.g., network 201), (ii) other mobile computing devices (e.g., mobile computing device 204.2), (iii) external computing devices (e.g., external computing device 206), (iv) vehicles (e.g., vehicle 108), (v) vehicle on-board computers (e.g., on-board computer 114), infrastructure components (e.g., smart infrastructure component 208), etc.

In various aspects, program memory 302 may be implemented as a non-transitory tangible computer readable media configured to store computer-readable instructions, that when executed by controller 340, cause controller 340 to perform various acts. Program memory 302 may include an operating system 342, one or more software applications 344, and one or more software routines 352. To provide another example, program memory 302 may include other portions to store data that may be read from and written to by MP 306, such as data storage 360, for example.

In one aspect, one or more MPs (micro-processors) 306 may be configured to execute one or more of software applications 344, software routines 352 residing in program memory 302, and/or other suitable software applications. For example, operating system 342 may be implemented as any suitable operating system platform depending upon the particular implementation of computing device 300. For example, if computing device 300 is implemented as a mobile computing device, operating system 342 may be implemented as a mobile OS platform such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively.

In one embodiment, data storage 360 may store data such as application data for the one or more software applications 344, routine data for the one or more software routines 352, geographic location data and/or telematics data, etc.

Display 316 may be implemented as any suitable type of display and may facilitate user interaction with computing device 300 in conjunction with user interface 328. For example, display 316 may be implemented as a capacitive touch screen display, a resistive touch screen display, etc. In various embodiments, display 316 may be configured to work in conjunction with controller 340 and/or GPU 318 to display alerts and/or notifications received from other devices indicative of detected anomalous conditions.

Communication unit 330 may be configured to facilitate communications between computing device 300 and one or more other devices, such as other vehicle computing devices, other mobile computing devices, networks, external computing devices, smart infrastructure components, etc. As previously discussed with reference to FIGS. 1 and 2, computing device 300 may be configured to communicate with these other devices in accordance with any suitable number and type of communication protocols. Thus, in various aspects, communication unit 330 may be configured to support any suitable number and type of communication protocols based upon a particular network and/or device in which computing device 300 is communicating to facilitate this functionality.

Communication unit 330 may be configured to support separate or concurrent communications, which may be the same type of communication protocol or different types of communication protocols. For example, communication unit 330 may be configured to facilitate communications between computing device 300 and an external computing device (e.g., external computing device 206) via cellular communications while facilitating communications between computing device 300 and the vehicle in which it is carried (e.g., vehicle 108) via BLUETOOTH communications.

Communication unit 330 may be configured to broadcast data and/or to receive data in accordance with any suitable communications schedule. For example, communication unit 330 may be configured to broadcast geographic location data and/or telematics data every 15 seconds, every 30 seconds, every minute, etc. As will be further discussed below, the geographic location data and/or telematics data may be sampled in accordance with any suitable sampling period. Thus, when broadcasted by communications unit 330 in accordance with a recurring schedule, the geographic location data and/or telematics data may include a log or collection of the geographic location data and/or telematics data that was sampled since the last data transmission. A suitable communication schedule may be selected as a tradeoff between a desired anomalous condition detection speed and battery usage of computing device 300, when applicable.

Additionally or alternatively, aspects include communication unit 330 being configured to conditionally send data, which may be particularly advantageous when computing device 300 is implemented as a mobile computing device, as such conditions may help reduce power usage and prolong battery life. For example, communication unit 330 may be configured to only broadcast when telematics data has been sampled since the last transmission, which will be further discussed below with regards to sensor array 326. Controller 340 may determine whether data has been sampled since the last transmission by, for example, analyzing a memory address range (e.g., in data storage 360, RAM 308, etc.) associated with the storage of the telematics data and comparing the contents of this buffer to a known range of valid values.

To provide another example, aspects include communication unit 330 being additionally or alternatively configured to only broadcast telematics data when computing device 300 is connected to a power source (e.g., an in-vehicle charger). To provide still another example, aspects include communication unit 330 being additionally or alternatively configured to only broadcast telematics data when communication unit 330 is connected to and/or communicating with a device identified as a vehicle. This may include, for example, identifying a BLUETOOTH connection as a valid vehicle connection to satisfy this condition upon installation and/or setup of the relevant application or program executed by computing device 300 to facilitate the functionality described herein.

Location acquisition unit 320 may be configured to generate geographic location data utilizing any suitable global positioning techniques. For example, location acquisition unit 320 may communicate with one or more satellites and/or wireless transmitters to determine a location of computing device 300. Location acquisition unit 320 may use "Assisted Global Positioning System" (A-GPS), satellite GPS, or any other suitable global positioning protocol (e.g., the GLONASS system operated by the Russian government, the Galileo system operated by the European Union, etc.) to determine a geographic location of computing device 300.

In one aspect, location acquisition unit 320 may periodically store one or more geographic locations of computing device 300 as geographic location data in any suitable portion of memory utilized by computing device 300 (e.g., program memory 302, RAM 308, etc.) and/or to another device (e.g., another mobile computing device, an external computing device, etc.). In this way, location acquisition unit 320 may sample the location of computing device 300 in accordance with any suitable sampling rate (e.g., every 5 seconds, 10 seconds, 30 seconds, etc.) and store this geographic location data representing the position of computing device 300, and thus the vehicle in which it is travelling, over time.

Speaker/microphone 322 may be configured as one or more separate devices. Speaker/microphone 322 may include a microphone configured to detect sounds and to convert sounds to data suitable for communications via communications unit 330. Speaker/microphone 322 may additionally or alternatively include a speaker configured to play sound in response to data received from one or more components of computing device 300 (e.g., controller 340). In one embodiment, speaker/microphone 322 may be configured to play audible alerts.

User-interface 328 may be implemented as any suitable device configured to collect user input, such as a "soft" keyboard displayed on display 316 of computing device 300, a keyboard attached to computing device 300, an external keyboard communicating via a wired or a wireless connection (e.g., a BLUETOOTH keyboard), an external mouse, etc.

Sensor array 326 may be configured to measure any suitable number and/or type of sensor metrics as part of the telematics data. In one aspect, sensor array 326 may be implemented as one or more sensors positioned to determine the speed, force, heading, and/or direction associated with movements of computing device 300 and, thus, a vehicle in which computing device 300 is positioned. Additionally or alternatively, sensor array 326 may be configured to communicate with one or more portions of computing device 300 to measure, collect, and/or generate one or more sensor metrics from one or more non-sensor sources, which will be further discussed below.

To generate one or more sensor metrics, sensor array 326 may include, for example, one or more cameras, accelerometers, gyroscopes, magnetometers, barometers, thermometers, proximity sensors, light sensors, Hall Effect sensors, audio or video recorders, etc. In aspects in which sensor array 326 includes one or more accelerometers, sensor array 326 may be configured to measure and/or collect accelerometer metric values utilizing an X-axis, Y-axis, and Z-axis accelerometer. In accordance with such aspects, sensor array 326 may measure sensor metric values as a three-dimensional accelerometer vector that represents the movement of computing device 300 in three dimensional space by combining the outputs of the X-axis, Y-axis, and Z-axis accelerometers using any suitable techniques.

In various aspects, sensor array 326 may be configured to sample the one or more sensor metrics in accordance with any suitable sampling rate and/or based upon one or more conditions being satisfied. For example, sensor array 326 may be configured to implement one or more accelerometers to sample sensor metrics indicative of a g-force associated with vehicle braking, acceleration, and cornering at a rate of 15 Hz, 30 Hz, 60 Hz, etc., which may be the same sampling rate as one another or different sampling rates. To provide another example, sensor array 326 may be configured to implement one or more gyroscopes to improve the accuracy of the measured one or more sensor metrics and to determine whether the phone is in use or stationary within a vehicle. To provide another example, sensor array 326 may implement a compass (magnetometer) to determine a direction or heading of a vehicle in which computing device 300 is located.

Again, sensor array 326 may additionally or alternatively communicate with other portions of computing device 300 to obtain one or more sensor metrics even though these sensor metrics may not be measured by one or more sensors that are part of sensor array 326. For example, sensor array 326 may communicate with one or more of location acquisition unit 320, communication unit 330, and/or controller 340 to obtain data such as timestamps synchronized to the sampling of one or more sensor metrics (which may be measured to within hundredths of a second or smaller resolutions), geographic location data (and correlated timestamps thereof), a velocity based upon changes in the geographic location data over time, a battery level of computing device 300, whether a battery of computing device 300 is charging, whether computing device 300 is being handled or otherwise in use, an operating status of computing device 300 (e.g., whether computing device 300 is unlocked and thus in use).

In one aspect, sensor array 326 may sample one or more sensor metrics based upon one or more conditions being satisfied. For example, sensor array 326 may determine, based upon gyroscope sensor metrics, communication with controller 340, etc., whether computing device 300 is in use. If computing device 300 is in use (e.g., when implemented as a mobile computing device) then the movement of computing device 300 within the vehicle may not truly represent the vehicle motion, thereby causing sensor metrics sampled during this time to be erroneous. Therefore, aspects include sensor array 326 sampling the one or more sensor metrics when computing device 300 is not in use, and otherwise not sampling the one or more sensor metrics.

In one aspect, sensory array 326 may include one or more cameras and/or image capture devices. When sensory array 326 is implemented with one or more cameras, these cameras may be configured as any suitable type of camera configured to capture and/or store images and/or video. For example, when mobile computing device 300 is mounted in a vehicle, the camera may be configured to store images and/or video data of the road in front of the vehicle in which it is mounted, and to store this data to any suitable portion of program memory 302 (e.g., data storage 360). Controller 340 and/or MP 306 may analyze this data to generate one or more local alerts, to transmit signals indicative of detected alters to one or more other devices, etc., which is further discussed below with reference to the execution of anomalous condition detection routine 358.

Again, the telematics data broadcasted by computing device 300 may include one or more sensor metrics. However, the telematics data may additionally or alternatively include other external data that may be relevant in determining the presence of an anomalous condition. For example, the telematics data may include external data such as speed limit data correlated to a road upon which computing device 300 is located (and thus the vehicle in which it is travelling), an indication of a type of road, a population density corresponding to the geographic location data, etc.

In some aspects, computing device 300 may obtain this external data by referencing the geographic location data to locally stored data (e.g., data stored in data storage 360) and broadcasting this data appended to or otherwise included with the sensor metrics data as part of the telematics data. In other aspects, the device receiving the telematics data (e.g., a mobile computing device, an external computing device, an infrastructure component) may generate the external data locally or via communications with yet another device. As will be further discussed below, this external data may further assist the determination of whether an anomalous condition is present.

In some aspects, software applications 344 and/or software routines 352 may reside in program memory 302 as default applications that may be bundled together with the OS of computing device 300. For example, web browser 348 may be part of software applications 344 that are included with OS 342 implemented by computing device 300.

In other aspects, software applications 344 and/or software routines 352 may be installed on computing device 300 as one or more downloads, such as an executable package installation file downloaded from a suitable application store via a connection to the Internet. For example, alert notification application 346, telematics collection routine 354, geographic location determination routine 356, and/or anomalous condition detection routine 358 may be stored to suitable portions of program memory 302 upon installation of a package file downloaded in such a manner. Examples of package download files may include downloads via the iTunes® store, the Google Play® store, the Windows Phone® store, downloading a package installation file from another computing device, etc. Once downloaded, alert notification application 346 may be installed on computing device 300 as part of an installation package such that, upon installation of alert notification application 346, telematics collection routine 354, geographic location determination routine 356, and/or anomalous condition detection routine 358 may also be installed.

In one embodiment, software applications 344 may include an alert notification application 346, which may be implemented as a series of machine-readable instructions for performing the various tasks associated with executing one or more embodiments described herein. In one aspect, alert notification application 346 may cooperate with one or more other hardware or software portions of computing device 300 to facilitate these functions.

To provide an illustrative example, alert notification application 344 may include instructions for performing tasks such as determining a geographic location of computing device 300 (e.g., via communications with location acquisition unit 330), monitoring, measuring, generating, and/or collecting telematics data, broadcasting the geographic location data and/or the telematics data to one or more external devices, receiving geographic location data and/or telematics data from another computing device, determining whether an anomalous condition exists based upon the geographic location data and/or the telematics data, generating one or more alerts indicative of the determined anomalous condition, receiving user input, facilitating communications between computing device 300 and one or more other devices in conjunction with communication unit 330, etc.

Software applications 344 may include a web browser 348. In some embodiments (e.g., when computing device 300 is implemented as a mobile computing device), web browser 348 may be a native web browser application, such as Apple's Safari®, Google Chrome™ mobile web browser, Microsoft Internet Explorer® for Mobile, Opera Mobile™, etc. In other embodiments, web browser 348 may be implemented as an embedded web browser.

Regardless of the implementation of web browser 348, various aspects include web browser 348 being implemented as a series of machine-readable instructions for interpreting and displaying web page information received from an external computing device (e.g., external computing device 204.2, as shown in FIG. 2). This web page information may be utilized in conjunction with alert notification application 346 to perform one or more function of the aspects as described herein.

In one embodiment, software routines 352 may include a telematics collection routine 354. Telematics collection routine 354 may include instructions, that when executed by controller 340, facilitate sampling, monitoring, measuring, collecting, quantifying, storing, encrypting, transmitting, and/or broadcasting of telematics data. In some aspects, telematics collection routine 354 may facilitate collection of telematics data locally via one or more components of computing device 300 (e.g., via sensor array 326, location acquisition unit 320, controller 340, etc.). In other aspects, telematics collection routine 354 may facilitate the storage of telematics data received from another device (e.g., via communication unit 330). Such other devices may include external computing devices 206 (e.g., remote servers), infrastructure components 208 (e.g., smart traffic signals, smart toll booths, embedded sensors within roadways or bridges, etc.), or additional sensors disposed within the vehicle 108 (e.g., an aftermarket dashboard camera, a built-in forward proximity sensor, etc.).

In one embodiment, software routines 352 may include a geographic location determination routine 356. Geographic location determination routine 356 may include instructions, that when executed by controller 340, facilitate sampling, measuring, collecting, quantifying, storing, transmitting, and/or broadcasting of geographic location data (e.g., latitude and longitude coordinates, and/or GPS data). In some aspects, geographic location determination routine 356 may facilitate generating and/or storing geographic location data locally via one or more components of computing device 300 (e.g., via location acquisition unit 320 and/or communication unit 330). In other aspects, geographic location determination routine 356 may facilitate the storage of geographic location data received from another device (e.g., via communication unit 330).

Additionally or alternatively, software routines 352 may include anomalous condition detection routine 358. Anomalous condition detection routine 358 may include instructions, that when executed by controller 340, facilitate the determination of whether an anomalous condition exists based upon the telematics data, the geographic location data, and/or image and/or video data captured by one or more cameras or other imaging devices. An anomalous condition may include any suitable condition that indicates a deviation from normal traffic patterns. For example, if an accident occurs, traffic may slow down due to a car pileup, a reduction in available lanes, and/or rerouting of traffic. Because the telematics data may include data indicative of the speed limit at the location corresponding to the geographic location where the telematics data was sampled, a comparison between the speed of computing device 300 and the posted or other speed limit data (such as a comparison between mobile device or vehicle speed with a map of, and/or known, posted speed limit information) may indicate an anomalous condition. Furthermore, because each vehicle may sample and/or broadcast geographic location data and/or telematics data in real time, the anomalous conditions may be detected with minimal delay as they occur.

Although the speed of the vehicle may indicate an anomalous condition, aspects include other types of anomalous conditions being detected based upon the telematics data. For example, an anomalous condition may be identified when the one or more sensor metrics indicate that an airbag has been deployed, and thus the vehicle associated with computing device 300 has been in an accident. This may be determined, for example, via an analysis of barometer readings matching a pressure versus time profile and/or via an indication from a dedicated airbag deployment sensor located in the vehicle.

To provide another example, an anomalous condition may be identified based upon weather fluctuations associated with a rapid formation of ice, a sudden change from a paved to a dirt road, the triggering of a crash detection system, a threshold number of wheel slips and/or skids being sampled within a threshold sampling period (indicating slippery conditions), sensor metrics indicative of a rollover condition, a sudden stop (indicating a collision), a departure from the road (indicating a pulled over vehicle), etc.

To provide an illustrative example based upon a traffic accident, if a first vehicle carrying a first computing device 300 is slowed down due to a traffic accident, then the one or more sensor metrics sampled by sensor array 326 will indicate the speed of the first vehicle over a period of time. If the one or more sensor metrics indicate that the first vehicle's speed is below the speed limit by some threshold amount or proportion thereof (e.g., 20 mph in a 55 mph zone, 50% of the posted speed limit, etc.) and this is maintained for a threshold duration of time (e.g., 30 seconds, one minute, two minutes, etc.) then controller 340 may, upon execution of anomalous condition detection routine 358, conclude that an anomalous condition has been detected. This anomalous condition may also be correlated to the geographic location associated with the geographic location data due to synchronization between the geographic location data and the sampled telematics data.

Further continuing this example, upon determination of the anomalous condition, alert notification application 346 may broadcast a notification indicating the detected anomalous condition, the telematics data, and/or the geographic location data associated with the detected anomalous condition. In one aspect, a second vehicle equipped with a second computing device 300 may receive this data and further determine whether the anomalous condition is relevant based upon the geographic relationship between the first and second devices, which is further discussed below. If the anomalous condition is relevant, then the second computing device 300 may generate an alert indicating the anomalous condition.

To provide another example by modifying the details of the previous one, aspects may include computing device 300 broadcasting telematics data and/or geographic location data but not notification data. In accordance with such aspects, upon being received by a second computing device 300 (e.g., a mobile computing device in a second vehicle, an external computing device, a smart infrastructure component, etc.) the second computing device 300 may determine the relevance of the anomalous condition based upon the geographic relationship between itself and the first computing device 300.

If the second computing device 300 determines that an anomalous condition, even if present, would be irrelevant or inapplicable based upon the distance between these devices or location relative to a direction of travel, the second computing device 300 may ignore the telematics data, thereby saving processing power and battery life. However, if the second computing device 300 determines that the geographic location data indicates a potentially relevant anomalous condition, the second computing device 300 may further process the telematics data and take the appropriate relevant action if an anomalous condition is found (e.g., issue an alert notification, generate an alert, display a warning message, etc.).

To provide yet another example by further modifying the details in the previous two, aspects may include computing device 300 broadcasting the telematics data and geographic location data to an external computing device (e.g., to external computing device 206 via network 201, as shown in FIG. 2). In addition, the second computing device 300 associated with the second vehicle may likewise broadcast telematics data and geographic location data to the external computing device. In accordance with such aspects, the external computing device may determine whether an anomalous condition exists and is relevant to each of the first and second devices 300 based upon a geographic relationship between the first and second devices 300. When relevant, external computing device may be configured to send alert notifications to the first and/or second devices 300, which may include any suitable type of communications such as push notifications, a short messaging service (SMS) message, an email, a notification that used in conjunction with the OS running on each receptive computing device 300, etc. Upon receiving the notification from the external computing device, the first and/or second computing device 300 may generate an alert indicating a description of the anomalous condition and/or its location.

The geographic relationship between two or more devices 300 may be utilized in several ways to determine the relevance of the anomalous condition. For instance, current speed, location, route, destination, and/or direction of travel of a first vehicle (collecting and/or associated with the telematics data) may be individually or collectively compared with current speed, location, route, destination, and/or direction of travel of a second vehicle traveling on the road. As one example of the geographic relationship, a first vehicle location (and associated with a travel or traffic event) may be compared with a second vehicle location, current route, and/or destination to determine whether the second vehicle should divert course or slow down to alleviate the risk of the second vehicle being involved in a collision or a traffic jam (as a result of the travel or traffic event that is identified by the telematics data).

As another example of the geographic relationship, a radius from one vehicle or a line-of-sight distance between vehicles may be utilized and compared to a threshold distance. For example, if computing device 300 is implemented as an external computing device and determines a line-of-sight distance between a first and second vehicle to be less than a threshold distance (e.g., a half mile, one mile, etc.), then the external computing device may issue an alert notification to both vehicles. In this way, an external computing device may act as an alert management device, processing data and sending notifications to those devices for which a detected anomalous condition is relevant.

In another example of the geographic relationship, the geographic location data may be correlated with a map database to associate the anomalous condition with a road and to determine the relevance of the anomalous condition based upon other vehicles sharing the road. The map database may be stored, for example, in a suitable portion of computing device 300 (e.g., data storage 360) or retrieved via communications with one or more external computing devices. To provide an illustrative example, a computing device 300 may be implemented as an external computing device. The external computing device may determine, from telematics data and geographic location data received from a first computing device 300, that a first vehicle is located on a highway at a certain geographic location. If the external computing device determines that a second computing device 300 in a vehicle travelling on the same highway is within a threshold distance approaching the first vehicle, then the external computing device may issue an alert notification to the second vehicle.

In yet other aspects, the geographic location data may be correlated with a geofence database to determine the relevance of the anomalous condition based upon whether other vehicles are located inside the geofence. The geofence database may be stored, for example, in a suitable portion of computing device 300 (e.g., data storage 360) or retrieved via communications with one or more external computing devices. To provide another illustrative example, a computing device 300 may be implemented as an external computing device. The external computing device may determine, from telematics data and geographic location data received from a first computing device 300, that a first vehicle is located on a highway at a certain geographic location. The external computing device may calculate a geofence having a shape substantially matching the road upon which the first vehicle is travelling.

The geofence may be calculated as having any suitable shape such that the appropriate vehicles are notified of the detected anomalous condition. For example, the geofence shape may follow the contours of the road and extend ahead of the first vehicle and behind the first vehicle some threshold distances, which may be the same or different than one another. To provide another example, the geofence shape may include other arterial roads that feed into the road upon which the first vehicle is travelling, roads that branch off of the road upon which the first vehicle is travelling, roads anticipated to be impacted by the anomalous condition, etc.

In some aspects, the geofence may be adjusted or modified based upon a change in the location of computing device 300. This change may be triggered using any suitable data indicative of potentially increasing road densities, such as changes in population density data associated with the geographic location of the computing device 300, changes in a type of road upon which computing device 300 is determined to be travelling, time of day, weather conditions, known risk levels of areas or road segments (e.g., high-risk intersections), etc. Similarly, the geofence may be determined based upon speed at which the computing device 300 is travelling, a time-to-distance threshold, or other such factors. Any distance or other thresholds described herein may also be similarly adjusted based upon such considerations.

For example, a first computing device 300 may be implemented as a mobile computing device and associated with a first vehicle, while a second computing device 300 may be implemented as an external computing device. The external computing device may calculate an initial geofence as a threshold distance radius centered about the first vehicle's location. The geographic location data corresponding to the first vehicle's location may have associated population density data that is correlated with locally stored data or data retrieved by the external computing device. When the population density data surpasses a threshold density value, the shape of the geofence may be adjusted from the radius centered about the first vehicle's location to include only the road upon which the first vehicle is travelling. In this way, computing device 300 may prevent false alert notifications from being sent to other vehicles travelling in close proximity to the first vehicle, but on nearby roads unaffected by the detected anomalous condition.

Although FIG. 3 depicts controller 340 as including one program memory 302, one MP 306, and one RAM 308, controller 340 may include any suitable number of program memory 302, MP 306, and RAM 308. Furthermore, although FIG. 3 depicts controller 340 as having a single I/O interface 310, controller 340 may include any suitable number and/or types of I/O interfaces 310. In various aspects, controller 340 may implement RAM(s) 308 and program memories 302 as any suitable type of memory, such as non-transitory computer readable memories, semiconductor memories, magnetically readable memories, and/or optically readable memories, for example.

Insurance Applications

As noted herein, the present embodiments may be used to adjust, update, and/or generate insurance policies. Insurance policies, such as auto, usage-based, home, and/or household insurance policies, may be adjusted, updated, and/or generated for insureds or potential customers that have mobile devices and/or vehicles that are equipped or configured with one or more of the functionalities discussed herein.

For instance, insureds or family members may have mobile devices and/or a connected vehicle that are configured to receive telematics data associated with other vehicles and/or abnormal road or travel conditions that other drivers are experiencing. The telematics may be received directly from other vehicles, or indirectly from smart infrastructure and/or insurance provider remote servers. As a result, the insureds and/or their family members may be timely notified of traffic or travel events and then may take alternate routes (or even not drive or delay driving) to lower their risk of getting in an accident due to the traffic or travel events. An insurance provider may promote or reward such risk averse behavior and/or safer driving with lower insurance premiums, rates, and/or increased discounts, such as for usage-based or other types of auto insurance.

Discounts & Risk Profile Based Upon Travel Environment

In one aspect, a computer-implemented method of providing auto insurance discounts may be provided. The method may include (1) receiving, via one or more processors (or associated transceivers), such as via wireless communication or data transmission, telematics and/or other data from a vehicle or a mobile device of an insured; (2) determining, via the one or more processors, an average travel environment that the vehicle travels in, the average travel environment accounting for heavy or light pedestrian traffic and/or heavy or light vehicle traffic that the vehicle typically travels in; (3) using, via the one or more processors, the average travel environment to build a risk averse profile for the insured; (4) generating or updating, via the one or more processors, an auto insurance discount for the insured based upon their risk averse profile; and/or (5) transmitting, via the one or more processors (or associated transceivers), the auto insurance discount to the insured's vehicle or mobile device for display for the insured's review and/or approval such that insurance discounts are provided based upon a risk associated with the travel environment that an insured vehicle or insured typically travels within. The method may include additional, less, or alternate actions, including those discussed elsewhere herein.

For instance, the telematics and/or other data may indicate or include information detailing (i) an amount of pedestrian traffic, and/or (ii) the types of streets that the vehicle travels through on a daily or weekly basis, and the risk averse profile may reflect the amount of pedestrian traffic and/or types of streets. The telematics and/or other data may indicate or include information detailing (i) an amount of vehicle traffic, and/or (ii) the types of roads that the vehicle travels through or in on a daily or weekly basis, and the risk averse profile may reflect the amount of vehicle traffic and/or types of roads. The telematics and/or other data may be collected over one or more vehicle trips or days.

In another aspect, a computer-implemented method of providing auto insurance discounts may be provided. The method may include (1) receiving, via one or more processors (or associated transceivers), such as via wireless communication or data transmission, telematics and/or other data from a vehicle or a mobile device of an insured, the telematics and/or other data indicative of a travel environment of the vehicle; (2) determining, via the one or more processors, a risk profile for the vehicle that reflects a travel environment that the vehicle travels in, the travel environment accounting for pedestrian traffic and/or vehicle traffic that the vehicle typically travels in; (3) generating or updating, via the one or more processors, an auto insurance discount for the insured or the vehicle based upon the risk profile; and/or (4) transmitting, via the one or more processors (or associated transceivers), the auto insurance discount to the insured's vehicle or mobile device for display for the insured's review and/or approval such that insurance discounts are provided based upon a risk associated with the travel environment that an insured vehicle or insured typically travels within. The method may include additional, less, or alternate actions, including those discussed elsewhere herein.

For instance, the telematics and/or other data may indicate or include information detailing (i) an amount of pedestrian traffic, and/or (ii) the types of streets/roads that the vehicle travels through on a daily or weekly basis, and the risk profile may reflect the amount of pedestrian traffic and/or types of streets. The telematics and/or other data may indicate or include information detailing (i) an amount of vehicle traffic, and/or (ii) the types of roads that the vehicle travels through or in on a daily or weekly basis, and the risk profile may reflect the amount of vehicle traffic and/or types of roads. The telematics and/or other data may be collected over one or more vehicle trips or days, and may be associated with multiple drivers of the vehicle, and/or the telematics and/or other data may be used to identify the driver driving the vehicle during each trip.

In another aspect, a computer-implemented method of providing auto insurance discounts may be provided. The method may include (1) receiving, via one or more processors (or associated transceivers), such as via wireless communication or data transmission, telematics and/or other data from a vehicle controller/processor or a mobile device of an insured; (2) generating or building, via the one or more processors, a travel environment for the vehicle using or based upon the telematics and/or other data, the travel environment accounting for pedestrian traffic and/or vehicle traffic that the vehicle typically travels in or with; (3) generating or updating, via the one or more processors, an auto insurance discount for the insured or the vehicle based upon the travel environment; and/or (4) transmitting, via the one or more processors (or associated transceivers), the auto insurance discount to the insured's vehicle or mobile device for display for the insured's review and/or approval such that insurance discounts are provided based upon a risk associated with the travel environment that an insured vehicle or insured typically travels within. The method may include additional, less, or alternate actions, including those discussed elsewhere herein.

For instance, the telematics and/or other data may indicate or include information detailing (i) an amount of pedestrian traffic, and/or (ii) the types of streets/roads that the vehicle travels through on a daily or weekly basis. The travel environment generated may reflect the amount of pedestrian traffic and/or types of streets/roads, and/or a level of risk associated with such.

The telematics and/or other data may indicate or include information detailing (i) an amount of vehicle traffic, and/or (ii) the types of roads that the vehicle travels through or in on a daily or weekly basis. The travel environment generated may reflect the amount of vehicle traffic and/or types of roads, and/or a risk associated with such.

The telematics and/or other data may be collected over one or more vehicle trips or days, and is associated with multiple drivers of the vehicle. The telematics and/or other data may be used to identify the driver driving the vehicle during each trip or day.

In one aspect, a computer system configured to provide auto insurance discounts may be provided. The computer system may include one or more processors and/or transceivers. The one or more processors may be configured to: (1) receive, via a transceivers, such as via wireless communication or data transmission, telematics and/or other data from a vehicle processor/transceiver or a mobile device of an insured; (2) determine an average travel environment that the vehicle travels in, the average travel environment accounting for heavy or light pedestrian traffic and/or heavy or light vehicle traffic that the vehicle typically travels in; (3) use the average travel environment to build a risk averse profile for the insured; (4) generate or update an auto insurance discount for the insured based upon their risk averse profile; and/or (5) transmit, via the transceiver, the auto insurance discount to the insured's vehicle processor or mobile device for display for the insured's review and/or approval such that insurance discounts are provided based upon a risk associated with the travel environment that an insured vehicle or insured typically travels within. The computer system may include additional, less, or alternate functionality, including that discussed elsewhere herein.

For instance, the telematics and/or other data may indicate or include information detailing (i) an amount of pedestrian traffic, and/or (ii) the types of streets that the vehicle travels through on a daily or weekly basis, and the risk averse profile may reflect the amount of pedestrian traffic and/or types of streets. Additionally or alternatively, the telematics and/or other data may indicate or include information detailing (i) an amount of vehicle traffic, and/or (ii) the types of roads that the vehicle travels through or in on a daily or weekly basis, and the risk averse profile may reflect the amount of vehicle traffic and/or types of roads.

The telematics and/or other data may be collected over one or more vehicle trips or days. Additionally or alternatively, the telematics and/or other data may be associated with multiple drivers of the vehicle, and the telematics and/or other data may be used to identify a member of household driving the vehicle during each trip or day.

In another aspect, a computer system configured to provide auto insurance discounts may be provided. The computer system may include one or more processors and transceivers. The one or more processors may be configured to: (1) receive, via a transceiver, such as via wireless communication or data transmission, telematics and/or other data from a vehicle processor/transceiver or a mobile device of an insured, the telematics and/or other data indicative of a travel environment of the vehicle; (2) determine a risk profile for the vehicle that reflects a travel environment that the vehicle travels in, the travel environment accounting for pedestrian traffic and/or vehicle traffic that the vehicle typically travels in; (3) generate or update an auto insurance discount for the insured or the vehicle based upon the risk profile; and/or (4) transmit, via the transceiver, the auto insurance discount to the insured's vehicle or mobile device for display for the insured's review and/or approval such that insurance discounts are provided based upon a risk associated with the travel environment that an insured vehicle or insured typically travels within. The computer system may include additional, less, or alternate functionality, including that discussed elsewhere herein.

In another aspect, a computer system configured to provide auto insurance discounts may be provided. The computer system may include one or more processors and transceivers. The one or more processors may include (1) receive, via a transceivers, such as via wireless communication or data transmission, telematics and/or other data from a vehicle controller or processor, or a mobile device of an insured; (2) generate or build a travel environment for the vehicle using or based upon the telematics and/or other data, the travel environment accounting for pedestrian traffic and/or vehicle traffic that the vehicle typically travels in or with; (3) generate or update an auto insurance discount for the insured or the vehicle based upon the travel environment; and/or (4) transmit, via the transceivers, the auto insurance discount to the insured's vehicle or mobile device for display for the insured's review and/or approval such that insurance discounts are provided based upon a risk associated with the travel environment that an insured vehicle or insured typically travels within. The computer system may include additional, less, or alternate functionality, including that discussed elsewhere herein.

Figure 4:
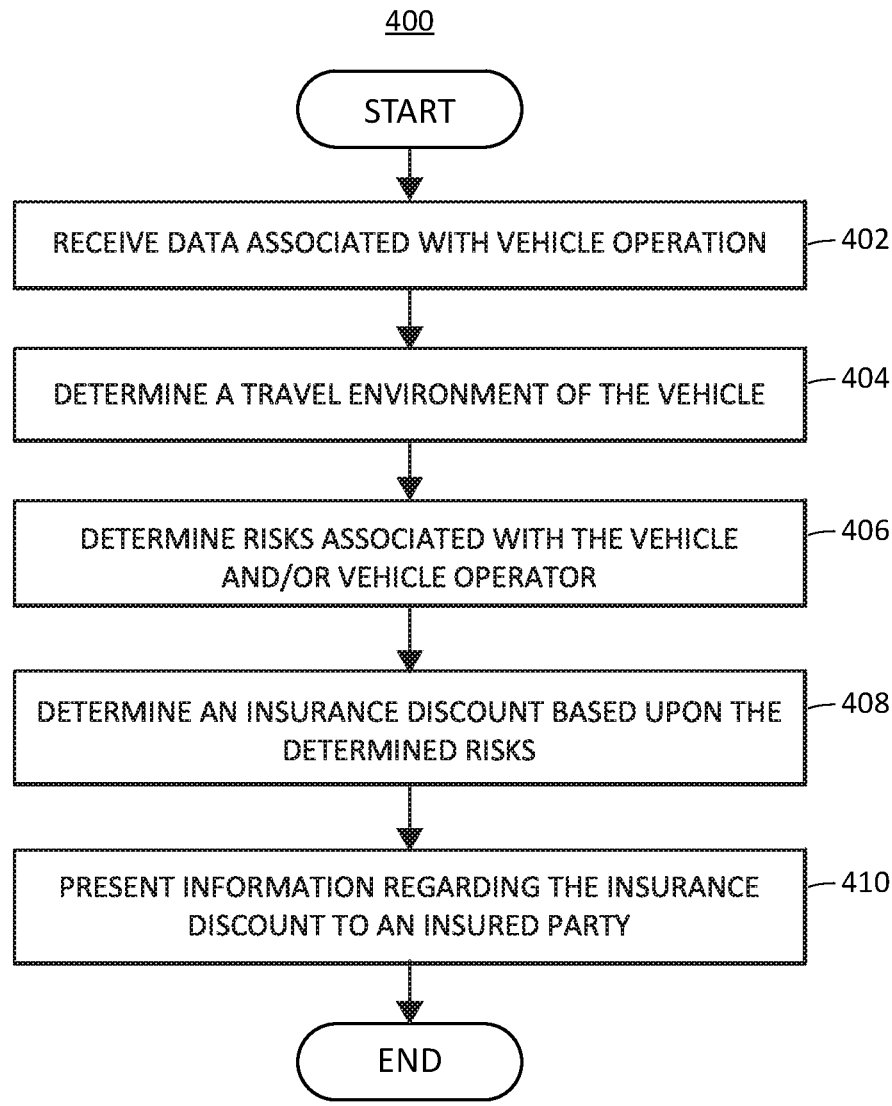
FIG. 4 illustrates a flow diagram of an exemplary risk assessment method.

FIG. 4 illustrates a flow diagram of an exemplary risk assessment method 400 for determining risks associated with operation of a vehicle 108. The method 400 may begin with receiving telematics data associated with vehicle operation over a period of time (block 402). Based upon this received telematics data, one or more typical travel environments may be determined (block 404). From such typical travel environments, one or more risk levels associated with the vehicle 108 or one or more vehicle operators of the vehicle 108 may be determined (block 406). The risk levels determined may be used to further determine a discount for an insurance policy (block 408). The determined discount may then be presented to the vehicle owner, vehicle operator, or insured party for review or approval (block 410).

At block 402, the external computing device 206 may receive data associated with vehicle operation of the vehicle 108. The data may include information regarding the operation of the vehicle (e.g., speed, acceleration, braking, etc.) as well as information regarding the vehicle operating environment in which the vehicle 108 operates. The data regarding the vehicle operating environment may include indications of the vehicle location and time of day associated with vehicle operation. In further embodiments, the operating environment data may also include data regarding traffic conditions, weather conditions, road conditions (e.g., construction, lane closures, etc.), or other risk-related conditions. Such other risk-related conditions may include level of pedestrian traffic, level of bicycle traffic, type of roadway, activity of wild animals on or near the roadway, or similar external conditions that may affect the risk associated with operation of the vehicle 108. The data may be received directly or indirectly from the vehicle 108 (i.e., from a mobile computing device 110 or on-board computer 114 disposed within or associated with the vehicle 108). Data may also be received from other vehicles 202 operating within the vicinity of the vehicle 108, from sensors of smart infrastructure components 208, or from databases or other sources based upon sensor data. For example, GPS location data obtained from a location acquisition unit 320 of a mobile computing device 110 within the vehicle 108 may be used to query weather data from the National Weather Service or other databases of weather data. In some embodiments, the external computing device 206 may be one or more servers operated by or on behalf of an insurer or third party risk assessor to process data regarding vehicle usage.

At block 404, the external computing device 206 may use the received data to determine one or more travel environments in which the vehicle 108 operates. This may include determining one or more typical, frequent, or average travel environments based upon the received data. Travel environments may include data regarding aspects of the operating environment through which the vehicle 108 travels that affect the probability of a vehicle accident or other loss event. Such aspects of the operating environment may include time of day, location (e.g., city, suburban, rural, etc.), type of road (e.g., residential streets, restricted access highway, etc.), traffic levels, pedestrian traffic levels, or other similar aspects. Even in embodiments in which the data is received by the external computing device 206 on a continuous basis (e.g., during vehicle operation or after each vehicle trip), a travel environment may be determined based upon data covering a period of operation (e.g., a week, a month, ten vehicle trips, etc.). The one or more travel environments may include the usual operating environment for the vehicle 108, such as an environment associated with daily commuting. Where more than one travel environment is determined for the vehicle 108, each travel environment may be associated with a proportion of total vehicle operation spent in the travel environment. In some embodiments, the external computing device 206 may determine a travel environment profile for the vehicle 108, indicating the one or more travel environments determined to be associated with the vehicle 108. Where multiple drivers use the same vehicle, travel environments may be determined for total vehicle usage or may be determined separately for each driver.

At block 406, the external computing device 206 may determine risks associated with the vehicle 108 and/or a vehicle operator associated with the vehicle 108 based upon the determined one or more travel environments. The risks may be associated with vehicle operation in each of multiple travel environments or may be associated with a total risk across all travel environments. The risks may be indicative of levels of risk associated with a particular vehicle operator of the vehicle 108, which may be expressed as scores, probabilities, categories, or other metrics. In some embodiments, the risks may be determined as a risk profile or a risk averse profile, as discussed above. A risk profile may include information regarding the risks associated with operation of the vehicle 108 in the determined one or more travel environments, which may include risks associated with traffic levels, types of roadways, pedestrian traffic levels, etc. A risk averse profile may be include information regarding the risks associated with a particular vehicle operator based upon the determined one or more travel environments, which may include risks associated with time of travel, traffic levels, types of roadways, location of vehicle operation, etc. In some embodiments, multiple risk profile or risk averse profiles may be determined for different combinations of vehicle and drivers.

At block 408, the external computing device 206 may determine a discount for an insurance policy associated with the vehicle 108 based upon the determined risks. The discount may be associated with the vehicle 108 or may be associated with a particular vehicle operator of the vehicle 108. The discount may be determined based upon a comparison of the risks for the vehicle 108 or vehicle operator with usual risk levels for similarly situated vehicles or vehicle operators. For example, a discount may be determined because the vehicle 108 is primarily driven in low-risk travel environments (e.g., daylight hour driving on low-traffic roads with little pedestrian traffic, etc.). A level of the discount may be determined based upon the difference between usual risk levels for similarly situated vehicles and the risk levels determined based upon the received data. Although this determination is described as a discount, it may similarly take the form of an incentive program, rewards points, a reduction in deductible, a change in premium, a change in coverage, or similar changes to an insurance policy.

At block 410, the external computing device 206 may cause the discount to be presented to the vehicle owner, vehicle operator, insured party, or other interested person or organization. The discount may be presented via a mobile computing device 110, on-board computer 114, or other external computing device 206 (e.g., a home computer, tablet, laptop, etc.). In some embodiments, the discount may be presented for review and/or approval prior to being implemented. In further embodiments, the discount may be implemented by applying the discount to the insurance policy. In appropriate cases, the external computing device 206 may facilitate appropriate funds transfers between an insurer and an insured related to the discount.

Accident Cause Determination/Accident Reconstruction

In one aspect, a computer-implemented method of accident cause determination and/or accident reconstruction may be provided. The method may include (1) receiving, via one or more processors (or associated transceivers), such as via wireless communication or data transmission, smart traffic light data from a smart traffic light transceiver, the smart traffic light data including time-stamped data associated with times when the traffic light was red, green, and yellow before, during, and/or after a vehicle accident; (2) receiving, via the one or more processors (or associated transceivers), such as via wireless communication or data transmission, vehicle or mobile device time-stamped GPS (Global Positioning System) and/or speed data (and/or other telematics data) from a vehicle or mobile device transceiver acquired before, during, and/or after the vehicle accident; (3) comparing, via the one or more processors, the time-stamped smart traffic light data with the time-stamped GPS and/or speed data (and/or other telematics data) to determine if the vehicle or another vehicle was a cause of the vehicle accident occurring at an intersection associated with the smart traffic light; and/or (4) updating, via the one or more processors, an insurance policy premium or discount based upon which vehicle caused the vehicle accident to facilitate not penalizing not-at-fault drivers and/or generating insurance premiums or discounts more reflective of actual risk, or lack thereof, associated with certain types of vehicles and/or risk averse drivers. The one or more processors may include processors of one or more external computing devices 206, such as servers associated with an insurer, investigator, or law enforcement agency. The method may include additional, less, or alternate actions, including those discussed herein.

For instance, the method may include generating, via the one or more processors, a virtual reconstruction of the vehicle accident which includes a graphical representation of the traffic light changing. One or more vehicles involved in the vehicle accident may be autonomous or semi-autonomous vehicles.

In another aspect, a computer-implemented method of accident cause determination and/or accident reconstruction may be provided. The method may include (1) receiving, via one or more processors (or associated transceivers), such as via wireless communication or data transmission, smart traffic light data from a smart traffic light transceiver, the smart traffic light data including time-stamped data associated with times when the traffic light was red, green, and yellow (before, during, and/or after a vehicle accident); (2) receiving, via the one or more processors (or associated transceivers), such as via wireless communication or data transmission, vehicle or mobile device time-stamped GPS (Global Positioning System) and speed data (and/or other telematics data) from a vehicle or mobile device transceiver (acquired before, during, and/or after a vehicle accident); (3) comparing, via the one or more processors, the time-stamped smart traffic light data with the time-stamped GPS and speed data to (i) determine if the vehicle was traveling in accordance with the color of the smart traffic light at a time that a vehicle accident occurred at an intersection associated with the smart traffic light, or (ii) otherwise determine that the vehicle or driver (insured) did not cause the vehicle accident; and/or (4) updating, via the one or more processors, an insurance policy premium or discount based upon the vehicle or driver not causing the vehicle accident to facilitate not penalizing not-at-fault drivers and/or generating insurance premiums or discounts more reflective of actual risk, or lack thereof, associated with certain types of vehicles and/or risk averse drivers. Again, the one or more processors may include processors of one or more external computing devices 206, such as servers associated with an insurer, investigator, or law enforcement agency. The method may include additional, less, or alternate actions, including those discussed elsewhere herein.

In one aspect, a computer system configured to perform accident reconstruction may be provided. The computer system may include one or more processors configured to: (1) receive, via a transceiver, such as via wireless communication or data transmission, smart traffic light data from a smart traffic light transceiver, the smart traffic light data including time-stamped data associated with times when the traffic light was red, green, and yellow before, during, and/or after a vehicle accident; (2) receive, via the transceiver, such as via wireless communication or data transmission, vehicle or mobile device time-stamped GPS (Global Positioning System), speed, braking, and/or acceleration data (acquired before, during, and/or after the vehicle accident) from a vehicle or mobile device transceiver; (3) compare the time-stamped smart traffic light data with the time-stamped GPS and speed data to determine if the vehicle or another vehicle was a cause of the vehicle accident occurring at an intersection associated with the smart traffic light; and/or (4) update an insurance policy premium or discount based upon which vehicle caused the vehicle accident to facilitate not penalizing not-at-fault drivers and/or generating insurance premiums or discounts more reflective of actual risk, or lack thereof, associated with certain types of vehicles and/or risk averse drivers. Again, the one or more processors may include processors of one or more external computing devices 206, such as servers associated with an insurer, investigator, or law enforcement agency. The computer system may include additional, less, or alternate functionality, including that discussed elsewhere herein.

For instance, the one or more processors may be further configured to generate a time-lapsed virtual reconstruction of the vehicle accident which includes a graphical representation of the traffic light changing, and the speed and location of the vehicle with respect to the intersection. The one or more processors may be configured to transmit, via the transceiver, the updated auto insurance discount to the insured for their review and/or approval. The one or more vehicles involved in the vehicle accident may be autonomous or semi-autonomous vehicles.

In another aspect, a computer system configured to perform accident reconstruction may be provided. The computer system may include one or more processors, which may include processors of one or more external computing devices 206, such as servers associated with an insurer, investigator, or law enforcement agency. The one or more processors may be configured to: (1) receive, via a transceiver, such as via wireless communication or data transmission, smart traffic light data from a smart traffic light transceiver, the smart traffic light data including time-stamped data associated with times when the traffic light was red, green, and yellow (and acquired or generated before, during, or after a vehicle accident); (2) receive, via the transceiver, such as via wireless communication or data transmission, vehicle or mobile device time-stamped GPS (Global Positioning System) and speed data (and/or other telematics data) from a vehicle or mobile device transceiver; (3) compare the time-stamped smart traffic light data with the time-stamped GPS and speed data (and/or other telematics data, such as acceleration or braking data) to (i) determine if the vehicle was traveling in accordance with the color of the smart traffic light at a time that the vehicle accident occurred at an intersection associated with the smart traffic light, or (ii) otherwise determine that the vehicle or driver (insured) did not cause the vehicle accident; and/or (4) update an insurance policy premium or discount based upon the vehicle or driver not causing the vehicle accident to facilitate not penalizing not-at-fault drivers and/or generating insurance premiums or discounts more reflective of actual risk, or lack thereof, associated with certain types of vehicles and/or risk averse drivers. The computer system may include additional, less, or alternate functionality, including that discussed elsewhere herein.

Figure 5:
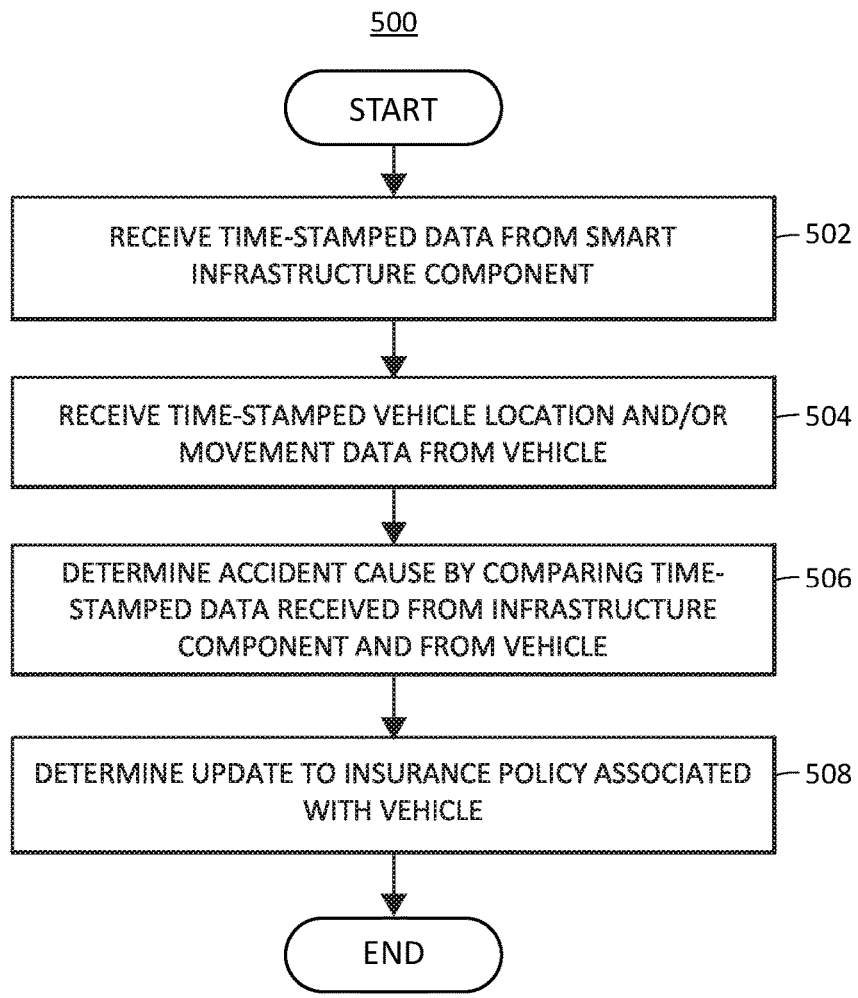
FIG. 5 illustrates a flow diagram of an exemplary accident analysis method.

FIG. 5 illustrates a flow diagram of an exemplary accident analysis method 500 for determining the cause of an accident or reconstructing an accident using data from a smart infrastructure component 206. The method 500 may begin by receiving time-stamped data from one or more smart infrastructure components (block 502) and time-stamped data regarding one or more vehicles (block 504). From this received data, an accident cause may be determined by comparison of the data from the infrastructure components and vehicles (block 506). In some embodiments, determining the cause of an accident may include reconstructing some aspects of the accident, such as the position of one or more vehicles or the state of an infrastructure component (e.g., a smart traffic signal). Based upon the determination of the cause of the accident, an update or adjustment to an insurance policy may be determined (such as a discount for a driver not a fault) (block 508). Although the method is described as separately receiving the infrastructure component data and the vehicle data, it should be understood that these may be received together or separately in any order in various embodiments. The data may be received by one or more external computing devices 206, such as servers associated with an insurer, investigator, or law enforcement agency.

At block 502, an external computing device 206 may receive time-stamped data from one or more infrastructure components 208 (or sensors attached to or disposed within infrastructure components 208). Such data may be received in response to a request for the data, such as during the insurance claims adjusting process following an accident. Such request may be made in near real-time as an anomalous event (or potential anomalous event) occurs, or may be made at a later time to a server storing recorded data associated with one or more infrastructure components 208. Alternatively, the infrastructure component 208 may determine that an anomalous event has occurred, such as an accident or near miss between vehicles, and transmit the time-stamped data to the external computing device 206. The time-stamped infrastructure component data may include sensor data collected by the infrastructure component 208 or data regarding the state of the infrastructure component 208. For example, the data may indicate times when a traffic signal changed between various states (e.g., when a traffic light changed between green, yellow, and red, when a railroad crossing signal sounded or lowered a gate, etc.). Sensor data may include sensed data regarding weather or traffic conditions, such as temperature, precipitation (falling or accumulated), road icing (e.g., accumulation of ice, presence of conditions conducive of icing, time since last salting or plowing, etc.), wind speed, construction work, lane closures, accidents, traffic flow (e.g., vehicles per minute, average vehicle speed, vehicle spacing, etc.), or similar data.

At block 504, the external computing device 206 may receive time-stamped data from one or more vehicles 108 (202.1-202.N). The vehicle data may include telematics data collected by, generated by, or received from sensors by a mobile computing device 110 and/or on-board computer 114 of each vehicle 108. Such vehicle data may include data regarding the operation, path, or movement of vehicles. For example, the vehicle data may indicate a series of locations of one or more vehicles 108 during a relevant time period (e.g., a time period including a vehicle accident). In some embodiments, such vehicle data may include location data (e.g., GPS location data, other geocoordinate data, or relative location data indicating position relative to other vehicles or infrastructure components), velocity data, acceleration data (e.g., increasing or decreasing speed), and/or operation data (e.g., use of signals, application of brakes, throttle position, use of driver assistance functionalities of the vehicle, etc.). The vehicle data may be received only from the vehicle or vehicles of interest (e.g., vehicles involved in an accident). Alternatively, or additionally, vehicle data may be received from other vehicles 202 in the vicinity of the vehicles of interest. Such other vehicle data may provide important information regarding traffic flow, road conditions, or movement of the vehicles of interest. The other vehicle data may be indicative of the other vehicles, environmental conditions, or vehicles of interest. In such manner, data regarding movement or operation of vehicles of interest may be obtained even for vehicles of interest that lack telematics data gathering capabilities (i.e., vehicles 108 without any mobile computing devices 110, on-board computers 114, or similar components to collect or record vehicle telematics data).

At block 506, the external computing device 206 may determine a cause of an accident, such as a collision. In some embodiments, such accidents may include a collision between vehicles, a collision between a vehicle and a pedestrian, a collision between a vehicle and infrastructure, a collision between a vehicle and animals, or a collision between a vehicle and another object (e.g., debris in a roadway, a mailbox, a tree, etc.). In further embodiments, such accidents may encompass near misses that do not result in collisions or other high-risk events (e.g., vehicle spin-outs, fishtailing, sliding off a roadway, etc.), regardless of whether any collision or damage occurred. Determination of the cause (or causes) of an accident may be performed by comparison of the time-stamped data from infrastructure components 208 and/or vehicles 108. As an example, time-stamped location and signal status data associated with a time period including a collision between two vehicles in an intersection may indicate that one of the two vehicles involved in the collision entered the intersection at an improper time (i.e., against a red light), thereby causing the accident. As another example, time-stamped data may indicate that a vehicle 108 lost traction on a roadway with conditions conducive to the formation of ice, but that the vehicle 108 engaged in hard braking at the time of loss of traction. In some embodiments, the external computing device 206 may generate a virtual reconstruction of relevant portions of the operating environment in which an accident occurred. For example, the external computing device 206 may generate a virtual reconstruction of the locations of one or more vehicles 202 or other objects within the vehicle operating environment at or around the time of an accident based upon data received from infrastructure components 208 and vehicles 202. In some embodiments, a static or dynamic graphical representation of the vehicle operating environment may be generated for presentation to a user of the external computing device 206 by comparison of the received data. Such graphical representation may be a 2-D, 3-D, or 4-D (moving 3-D) reconstruction of the accident, which may further include graphical indicators (e.g., color coding, icons, etc.) of key events or conditions (e.g., signal changes, vehicle braking/acceleration, vehicle right of way, etc.). Such reconstructions may be presented to a user for determination or verification of fault for accidents.

At block 508, the external computing device 206 may determine an update to an insurance policy associated with a vehicle 108 involved in the accident based upon the determination of the cause of the accident. The update may include a change to a premium, a coverage level, a coverage type, an exclusion, an insured driver, or other aspects of the policy. Some updates may include not changing any aspects of the insurance policy, such as where the accident is determined to be caused by another vehicle. For example, a discount associated with a safe driving record may be maintained (or reinstated) upon determination that the accident was caused by another vehicle. As another example, a discount may be applied to the insurance policy associated with a driver of a vehicle 108 determined not to be at fault for the accident, which discount may offset an effect on the insurance policy arising from the accident. In other instances, the update may include an indirect change to the insurance policy through a change to a risk assessment or risk profile associated with the vehicle 108 (or a driver of the vehicle 108). The update may be presented to a vehicle owner or an insured party for review and/or approval in some embodiments. In other embodiments, the update may be implemented to adjust or maintain the insurance policy terms, which may include facilitating a payment, money transfer, or billing event. The method 500 may then terminate.

In some aspects, data from one or more vehicles 202.1-202.N, infrastructure components 208, and/or other sources may be collected to determine the occurrence and causes of anomalous conditions. Such anomalous conditions may include accidents, near-misses, environmental conditions (e.g., traffic back-ups, potholes, flooding, etc.), or similar conditions that occur in a vehicle operation environment. Such data may be continuously monitored to determine the occurrence of anomalous conditions, or it may be stored to facilitate identification of anomalous conditions at a later time, if needed.

Figure 6:
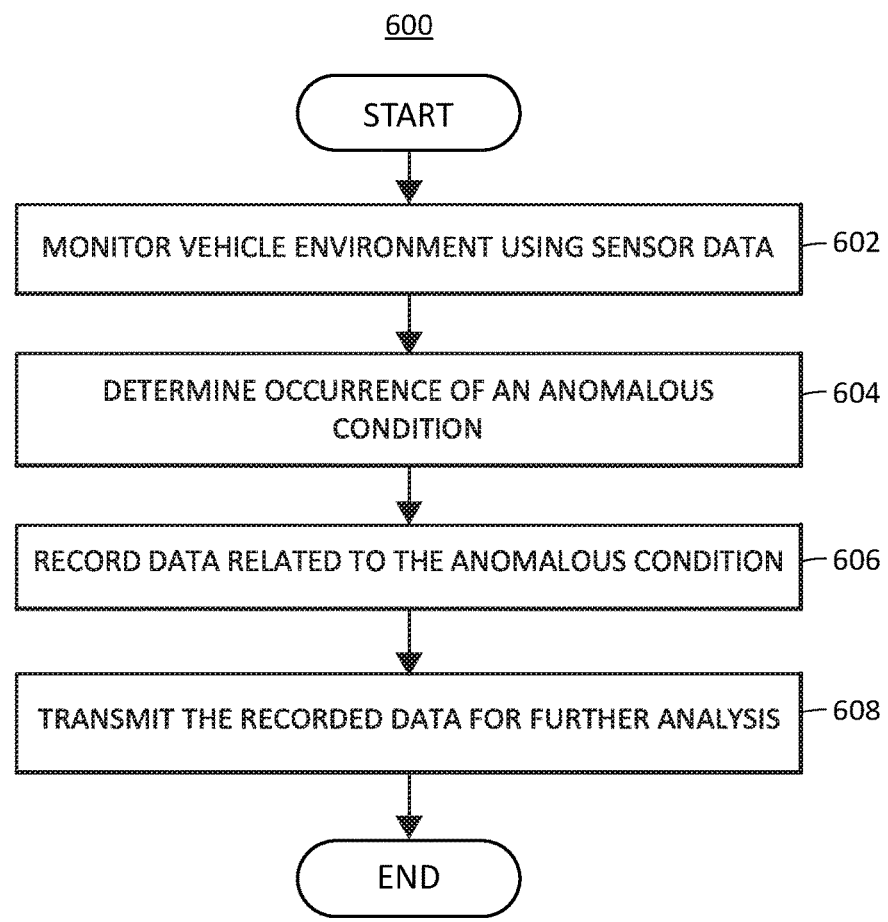
FIG. 6 illustrates a flow diagram of an exemplary anomalous condition monitoring method.

FIG. 6 illustrates a flow diagram of an exemplary anomalous condition monitoring method 600 for monitoring the environment in which a vehicle 108 is operating (or located) and determining the occurrence of an anomalous condition in the vehicle environment. The method 600 may begin with monitoring the vehicle environment using sensor data from one or more sensors within the vehicle or vehicle environment (block 602). Based upon the sensor data, the occurrence of an anomalous condition may be determined (block 604). Upon such determination, relevant sensor data may be recorded to facilitate analysis of the anomalous condition (block 606). In some embodiments, part or all of the recorded data may be transmitted to another computing device for further analysis (block 608). In some embodiments, the vehicle environment may be monitored for anomalous conditions only while the vehicle is in operation, while in other embodiments the vehicle environment may be monitored even when the vehicle is parked or otherwise at rest. Monitoring while the vehicle is parked may be of particular use in theft prevention and recovery.

At block 602, the vehicle environment associated with the vehicle 108 may be monitored by one or more sensors disposed within the vehicle 108. Sensor data from other vehicles 202 and/or infrastructure components 208 may also be monitored. The sensor data may be communicated to a mobile computing device 110 or on-board computer 114 within the vehicle 108 or to an external computing device 206 for analysis, via the network 201 or direct communication links. For example, transceivers of vehicles within the vehicle environment may communicate sensor data or other data directly between vehicles 202, which may include distance between vehicles. The sensor data may indicate vehicle information, such as the location, movement, or path of the vehicle 108 or other vehicles 202 within the vehicle environment. The sensor data may similarly include environmental information, such as the weather, traffic, construction, pedestrian, or similar conditions within the vehicle environment. Such sensor data may be stored in a memory associated with the vehicle 108 (such as a mobile computing device 110 or on-board computer 114) or associated with one or more external computing devices 206.

At block 604, the mobile computing device 110, on-board computer 114, or external computing device 206 may determine the occurrence of an anomalous condition based upon the received sensor data. Such anomalous conditions may include accidents, weather conditions, traffic conditions, construction or other roadway condition, and/or high-risk conditions. High-risk conditions may include transient conditions (e.g., reckless driving, a vehicle swerving between lanes, blinding sun at dawn or dusk, heavy pedestrian traffic, etc.) or non-transient conditions (e.g., confusing or otherwise high-risk intersections, blind corners, winding downslope road segments, etc.). When determined by the mobile computing device 110 or on-board computer 114, the anomalous condition may be related to the immediate vehicle environment (e.g., accidents, reckless driving, impaired driving, vehicle emergencies, vehicle breakdowns, potholes, lane closures, etc.) in some embodiments. In further embodiments, the external computing device 206 may also determine anomalous conditions affecting many drivers (e.g., traffic jams, heavy pedestrian traffic such as in the vicinity of a sporting event, etc.). Determining the occurrence of an anomalous condition may include comparing sensor data with previously recorded data for the local environment (e.g., based upon GPS data) or for similar environments (e.g., residential streets within a city, rural highways, etc.). Additionally, or alternatively, determining the occurrence of an anomalous condition may include determining the occurrence of an anomalous condition indicator based upon the sensor data (e.g., distance between vehicles falling below a threshold, misalignment between vehicle orientation and path, rapid acceleration or braking, speed less than a threshold amount above or below a posted speed limit, etc.).

At block 606, sensor data related to the anomalous condition may be recorded for further analysis. This may include recording sensor data for a period of time beginning before the determination of the occurrence of the anomalous condition at block 604 (such as by moving data from a buffer or volatile memory to a permanent storage or non-volatile memory) and extending for a period of time after determination of the anomalous condition. Sensor data may be stored locally within the vehicle 108, such as in data storage 360 associated with the mobile computing device 110 or on-board computer 114, or the sensor data may be stored in a memory or database associated with the external computing device 206. Alternatively, recording the sensor data may involve maintaining the sensor data only for a short period of time to transmit the data to an external computing device 206. In some embodiments, recording sensor data related to the anomalous condition may involve activating one or more additional sensors, as discussed below.

At block 608, the recorded sensor data may be transmitted to another computing device for further analysis. This may include transmitting the recorded sensor data from the vehicle 108 to the external computing device 206 via the network 201. Such transmission may begin immediately upon determination of the occurrence of the anomalous condition, or transmission may be delayed until some later time. For example, the transmission may be delayed until the vehicle 108 is garaged or the mobile computing device 110 or on-board computer 114 is communicatively connected to a WiFi network. Alternatively, the recorded data may be directly collected from a local storage device disposed within the vehicle 108, such as a crash-resistant storage (e.g., a "black box" storage device).

In particularly advantageous embodiments, the sensor data may be used to monitor the operation of other vehicles 202 in the vicinity of the vehicle 108. In such embodiments, the mobile computing device 110 or on-board computer 114 may process the data in real-time as it is received to determine whether an anomalous condition has occurred based upon the movement of other vehicles 202. For example, the sensor data may indicate that a vehicle 202.1 is engaged in hard braking (indicated by a rapid decrease in speed), which may have been caused by a sudden lane change of a vehicle 202.2 ahead of vehicle 202.1. The hard braking may trigger the vehicle 108 to record data associated with the incident, which may be transmitted to an external computing device 206 for further analysis. Such further analysis may indicate that the vehicle 202.2 caused the anomalous condition by reckless vehicle operation. This information may be further used to appropriately adjust risk levels or insurance policies (e.g., premiums, discounts, coverage levels, etc.) associated with the vehicles 202. For example, the sensor data recorded by vehicle 108 may include still or video images indicating the lane change of vehicle 202.2 caused an accident involving vehicle 202.1 and another vehicle 202.3, without involving vehicle 202.1. Such sensor data may be used for legal proceedings, claims adjustment, and/or rate adjustment to ensure a proper assignment of fault, as discussed below.

Figure 7:
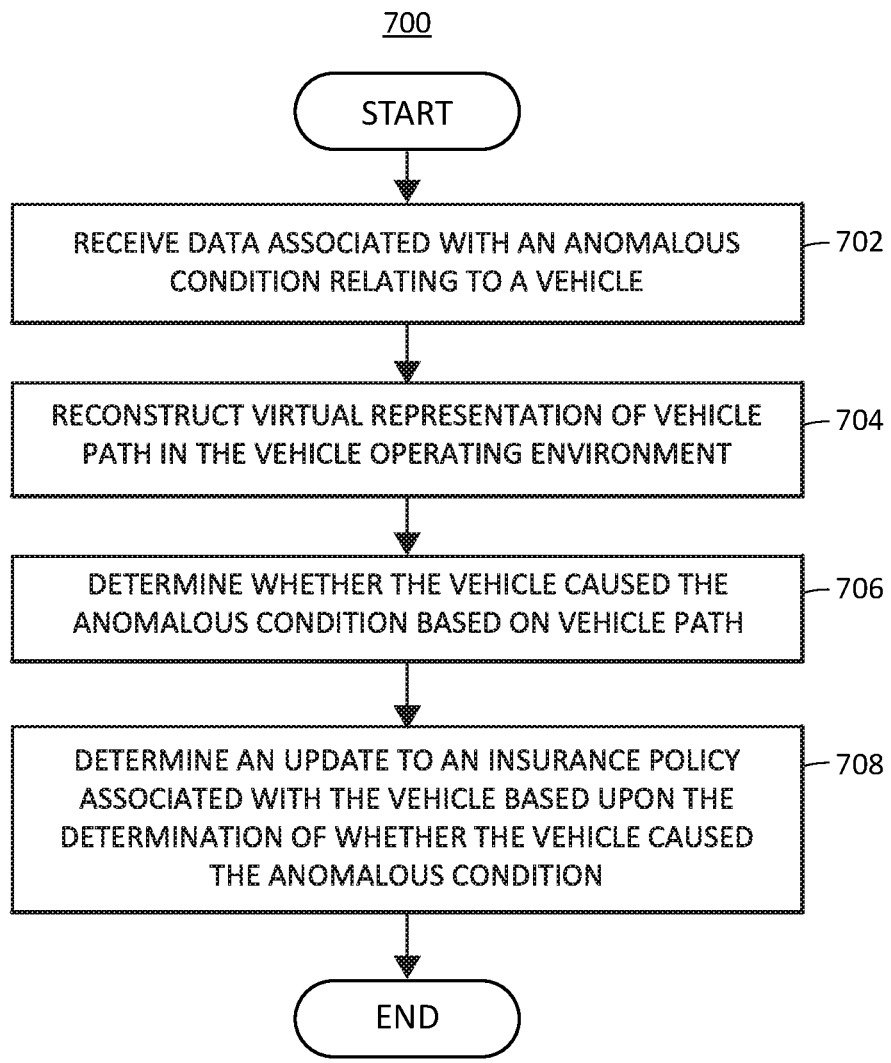
FIG. 7 illustrates a flow diagram of an exemplary anomalous condition analysis method.

FIG. 7 illustrates a flow diagram of an exemplary anomalous condition analysis method 700 for analyzing the types and causes of anomalous conditions. The method 700 may begin by receiving data associated with an anomalous condition recorded in accordance with method 600 above or otherwise (block 702). The received data may then be used to reconstruct the path of a vehicle within the vehicle operating environment (block 704), from which it may be determined whether the vehicle analyzed caused the anomalous condition (block 706). An update to an insurance policy associated with the analyzed vehicle may then be determined and/or implemented based upon the determination of whether the vehicle analyzed caused the anomalous condition (block 708). The method 700 may be repeated for any number of vehicles within a vehicle operating environment based upon the received data. In some embodiments, multiple vehicles may be determined to be partially at fault for causing an anomalous condition, in which case fault may be apportioned between the vehicles.

At block 702, the external computing device 206 may receive data associated with an anomalous condition relating to a vehicle 108. The data may be received from sensors within the vehicle 108 and/or within other vehicles 202 in proximity to the vehicle 108. Data may also be received from sensors of smart infrastructure components 206. The data may indicate the environmental conditions in which the vehicle 108 was operating, the location and movement of the vehicle 108, and/or the locations and movements of other vehicles 202. Such data may include GPS coordinates, as well as operating data from the vehicle 108 such as indications of speed and acceleration. Although the data may relate to the vehicle 108, it may also be associated with other vehicles 202 within the operating environment of the vehicle 108, such as data indicating the positions of the other vehicles 202. Such data may be relevant to vehicle 108 by indicating the relative positions and movements of the vehicle 108 with respect to the other vehicles 202.

At block 704, the external computing device 206 may reconstruct the movements or path of the vehicle 108 based upon the received sensor data. This may include interpolation of the sensor data for times between sensor data points. The may also include estimation of the location or properties of the vehicle 108 at one or more points of time based upon sensor data from a plurality of other vehicles 202 (such as by triangulation). In some embodiments, properties of the vehicle 108 (e.g., whether the vehicle 108 signaled a turn, whether the vehicle 108 had illuminated its headlights, etc.) may be determined by analysis of the sensor data from the vehicle 108 and/or other vehicles 202 (such as by object detection in images of the vehicle 108). The reconstructed movements or path of the vehicle 108 may be associated with one or more reference times (e.g., time-stamps) to facilitate determination of the cause of the anomalous condition. Also to facilitate such analysis, in some embodiments, the movements or paths of other vehicles 202 and/or other aspects of the vehicle operating environment may be reconstructed for a period including the anomalous condition.

At block 706, the external computing device 206 may determine whether the vehicle 108 caused the anomalous condition based upon the received sensor data. This may involve comparing the reconstructed path of the vehicle 108 with the paths of the other vehicle 202 in the vehicle operating environment and/or other environmental conditions (e.g., the state of a traffic light at relevant times, the presence and location of a wild animal on the roadway, the movement of other vehicles 202, etc.). In some embodiments, the vehicle 108 may be determined to have caused the anomalous condition, even where the vehicle 108 is not directly affected by the anomalous condition. For example, one or more other vehicles 202 within the vehicle operating environment may collide in a vehicle accident, but the vehicle 108 may not collide with any other vehicle 202 or other object within the vehicle operating environment. The movements of the vehicle 108 (e.g., changing lanes without using a signal, swerving between lanes, cutting off one of the vehicle 202, etc.), however, may nonetheless be determined to be the cause of the vehicle accident. If the vehicle 108 is determined to be the cause of the anomalous condition, a proportion of the fault for the anomalous condition may be further determined for the vehicle 108.

At block 708, the external computing device 206 may determine an update to an insurance policy associated with a vehicle 108. If the vehicle 108 is determined to have caused the anomalous condition, the adjustment may include a change to a premium, a coverage level, a coverage type, an exclusion, an insured driver, or other aspects of the policy to reflect the risk associated with the operation of the vehicle 108. This may include a determination of a risk level or severity of the anomalous condition. For example, a multi-vehicle accident caused by the vehicle 108 may lead to the determination of a greater increase in a premium than would be determined for a near miss caused by the vehicle 108 stopping abruptly. Some updates may include not changing any aspects of the insurance policy, such as where the vehicle 108 has been determined not to have caused the anomalous condition. In some embodiments, the update may be presented and/or implemented, as discussed elsewhere herein.

Electric Vehicle Battery Conservation

In one aspect, a computer-implemented method of accident cause determination and/or accident reconstruction for an electric or battery-powered vehicle may be provided. The method may include (1) receiving, via one or more processors (such as via a smart vehicle controller), an indication of a trigger event; (2) turning on, via the one or more processors, a front facing camera or video camera mounted on the vehicle, the front facing camera or video camera configured to acquire or take images in front of, or to the side of, a moving vehicle; and/or (3) transmitting, via the one or more processors (or an associated transceiver), the image data associated with the images acquired after the trigger event is detected to a remote server for computer analysis of the image data to facilitate not only accident reconstruction, but to also facilitate conserving a battery powering an electric vehicle and only turning on a video camera immediately prior to an anticipated or actual vehicle collision. The method may include additional, less, or alternate actions, including those discussed elsewhere herein.

For instance, the trigger event may be any one or more of the following: the one or more processors detecting vehicle speed unexpectedly or rapidly decreasing; the one or more processors detecting the vehicle following distance unexpectedly or rapidly decreasing; the one or more processors detecting a brake pedal being engaged or otherwise triggered by brake system pressure; and/or the one or more processors detecting an animal in the vicinity of the vehicle, such as via an infrared camera detecting a deer after sunset. Other trigger events may be used.

In another aspect, a computer system configured to perform accident reconstruction for an electric or battery-powered vehicle may be provided. The computer system may include one or more processors. The one or more processors may be configured to: (1) receive or determine an indication of a trigger event, such as via computer analysis of telematics and/or other data gathered by one or more sensors; (2) turn on a front facing camera or video camera (or other type of data recording system) mounted on the vehicle, the front facing camera or video camera configured to acquire or take images in front of, or to the side of, a moving vehicle; and/or (2) transmit, via a transceiver, the image data associated with the images acquired after the trigger event is detected to a remote server for computer analysis of the image data to facilitate not only accident reconstruction, but to also facilitate conserving a battery powering an electric vehicle and only turning on a video camera immediately prior to an anticipated or actual vehicle collision. The computer system may include additional, less, or alternate functionality, including that discussed elsewhere herein, and the trigger events may be those discussed above.

Although the methods described herein may be of particular value when used with electric vehicles due to the direct battery drain, the methods may also be implemented to save fuel or power consumed by other vehicles (e.g., gasoline- or diesel-powered vehicles, hybrid vehicles, natural gas-powered vehicles, etc.). Similarly, sensors other than front facing cameras or video cameras may be activated when triggered, which may likewise reduce power consumption while recording particularly important data during vehicle operation. Such other sensors may be used in addition to, or as alternatives to, front facing cameras or video cameras.

In some embodiments, one or more sensors may continually monitor vehicle operation. Such continuously monitoring sensors may be supplemented by additional sensors (such as front facing cameras or video cameras) upon the occurrence of a trigger event. In some embodiments, such sensors may store data locally within a program memory or storage medium within the vehicle 108 until the occurrence of a trigger event, at which point some or all of the recorded data may be transmitted via the network 201 to an external computing device 206 for further storage and/or analysis. For example, speedometer data may be continuously recorded, but a recent period (e.g., ten seconds, thirty seconds, five minutes, etc.) may be transmitted upon an indication of hard braking. Such data may be analyzed to determine whether the vehicle 108 was operated in an aggressive manner preceding the hard braking event (which may be associated with a heightened risk of a vehicle accident). In some embodiments, such determination may be used to assign fault for the accident and/or adjust an insurance policy.

Figure 8:
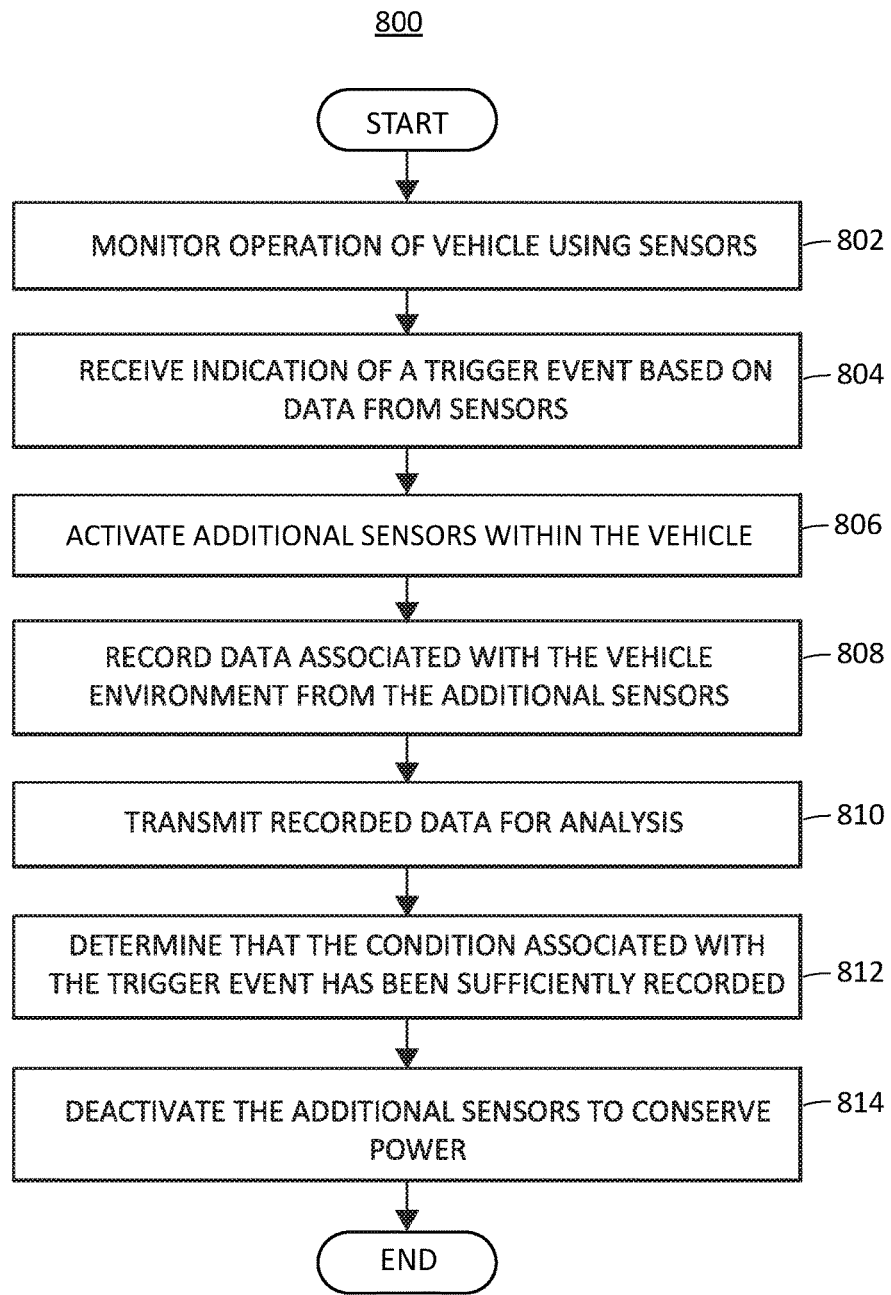
FIG. 8 illustrates a flow diagram of an exemplary battery conservation method.

FIG. 8 illustrates a flow diagram of an exemplary battery conservation method 800 for reducing drain on a power source while recording data relevant to accident reconstruction. The battery conservation method 800 may begin by monitoring the operation of a vehicle 108 by one or more sensors (block 802) until an indication of a trigger event is received (block 804). Upon receiving the indication of the trigger event, one or more additional sensors within the vehicle 108 may be activated (block 806) to record additional data associated with the vehicle operating environment (block 808). In some embodiments, the additional data recorded by the one or more additional sensors may be transmitted to an external computing device 206 for further analysis (block 810). When it is determined that the condition associated with the trigger event has been sufficiently recorded (block 812), the one or more additional sensors within the vehicle 108 are deactivated to conserver power (block 814).

At block 802, the method 800 may begin with monitoring the operation of the vehicle 108 or the environment in which the vehicle 108 is operating (such as other vehicles 202.1-202.N). This may include monitoring the speed, acceleration, braking, trajectory, or location of the vehicle 108 using a mobile computing device 110 or on-board computer 114. This may also include receiving data from sensors disposed within other vehicles 202 or infrastructure components 208. The data may include telematics data collected or received by a Telematics App, as discussed elsewhere herein. In some embodiments, the operation of the vehicle 108 may be monitored using only those sensors that are also used for vehicle control, navigation, or driver alerts (e.g., adaptive cruise control, autonomous piloting, GPS location, or lane deviation warnings). In further embodiments, an external computing device 106 may monitor the vehicle 108 and is operating environment using data from sensors within the vehicle or environment. Because of the delay caused by such communications, however, a mobile computing device 110 or on-board computer 114 may be used for such monitoring.

At block 804, the mobile computing device 110 or on-board computer 114 receives an indication of a trigger event. The trigger event may be based upon the data from one or more sensors used to monitor the vehicle and its environment, as described above. The indication of the trigger event may be generated by the mobile computing device 110 or on-board computer 114 based upon the sensor data or may be received from another device within the system 200. For example, another vehicle 202 may generate and transmit the indication of the trigger event to the vehicle 108 directly or via the network 201. As another example, the external computing device 206 may generate and transmit the indication to the vehicle 108 via the network 201 based upon sensor data (e.g., GPS location data indicating the vehicle 108 is approaching a dangerous intersection or traffic backup). As noted above, trigger events may include sudden changes in vehicle speed (either the vehicle 108 or another nearby vehicle 202), which may be caused by sharp turning, swerving, hard braking, or hard acceleration. Distances between the vehicle 108 and other objects (e.g., other vehicles 202, infrastructure components 208, pedestrians, animals on a roadway, etc.) may also be used as trigger event, either directly (e.g., a threshold distance to another object, such as one meter, three meters, etc.) or indirectly (e.g., a rate of change in distance to another object, such as a decrease in distance of more than one meter per second, etc.). The presence of specified conditions may further be used as a trigger event, such as road construction, an animal identified in the roadway (such as by infrared sensors), or rush hour driving (e.g., 4-6 p.m. on non-holiday weekdays). Some embodiments may use more or less inclusive metrics or thresholds to generate an indication of a trigger event. For example, each depression of a brake pedal may be a trigger event, including ordinary braking in the ordinary course of vehicle operation.

At block 806, one or more additional sensors within the vehicle 108 are activated based upon the received indication of the trigger event. Such additional sensors may use particularly high levels of power or may have limited storage capacity. For example, high-quality digital cameras or high-speed video cameras may be activated, which may use significant power and produce large amounts of data. Alternatively, the additional sensors may be similar in type or power consumption to other sensors used within the vehicle 108, but the one or more additional sensors may provide additional data to allow reconstruction of an accident that may occur. In some embodiments, the additional sensors may be disposed to record images, sounds, or other information from the interior of the vehicle.

At block 808, the one or more additional sensors may record data regarding the movement or operation of the vehicle 108 or regarding the vehicle operating environment in which the vehicle 108 is operating. Such data may be stored locally in a memory of a mobile computing device 110 or on-board computer 114. In some embodiments, the recorded data may be transmitted via the network 201 to the external computing device 206 for storage or analysis. In yet further embodiments, recorded data may be stored locally within the mobile computing device 110 or on-board computer 114 until such device is communicatively connected to a high-bandwidth network connection or a power source.

At block 812, the mobile computing device 110 or on-board computer 114 may determine that the conditions related to the trigger event have been sufficiently recorded. This may be based upon the occurrence of another condition (e.g., the vehicle 108 coming to a rest, reduction in acceleration below a threshold, leaving an area having road construction or high population density, etc.) or based upon passage of time (e.g., a preset period of thirty seconds after activation, etc.). The amount of recording determined to be sufficient may depend upon the type of data recorded, as well as the type of event triggering the recording. Once it has been determined that the condition has been sufficiently recorded, the one or more additional sensors may be deactivated or returned to a standby mode to conserver power within a battery or other power source of the vehicle 108 at block 814.

The method 800 may then terminate or restart at block 802. In some embodiments, the method 800 may operate continuously while the vehicle 108 is running or in operation. In alternatively embodiments, the method 800 may operate to monitor the vehicle's environment when the vehicle is not operating. In such embodiments, power conservation may be important to ensure sufficient power remains to start the vehicle.

Generating Vehicle-Usage Profile to Provide Discounts

In one aspect, a computer-implemented method of generating auto insurance discounts may be provided. The method may include (1) detecting or determining, via one or more processors, which individual within a household is driving a vehicle, such as by analyzing data from one or more sensors; (2) collecting, via the one or more processors, telematics data for that individual indicating their driving behavior for the vehicle for a single trip; (3) using the telematics data collected to update or build, via the one or more processors, a vehicle-usage profile for the vehicle, the vehicle-usage profile indicating how much and what time of day each member of a household typically drives or uses the vehicle, and their driving behavior while driving the vehicle; and/or (4) updating, via the one or more processors, an auto insurance premium or discount for the household or the vehicle based upon the vehicle-usage profile to provide insurance cost savings to lower risk households and/or risk averse drivers. The method may include transmitting, via the one or more processors (and/or associated transceiver), the updated auto insurance discount to the insured for their review and/or approval. The method may include additional, less, or alternate actions, including those discussed elsewhere herein.

In one aspect, a computer system configured to generate auto insurance discounts may be provided. The computer system including one or more processors and/or transceivers. The one or more processors may be configured to: (1) detect or determine which individual within a household is driving a vehicle from analyzing data received or generated from one or more sensors; (2) collect telematics data for that individual indicating their driving behavior for the vehicle for a single trip; (3) use the telematics data collected to update or build a vehicle-usage profile for the vehicle, the vehicle-usage profile indicating how much and what time of day each member of a household typically drives or uses the vehicle, and their driving behavior while driving the vehicle; and/or (4) update an auto insurance premium or discount for the household or the vehicle based upon the vehicle-usage profile to provide insurance cost savings to lower risk households and/or risk averse drivers. The one or more processors may be configured to transmit, via a transceiver, the updated auto insurance discount to the insured or their mobile device for their review and/or approval. The computer system may include additional, less, or alternate functionality, including that discussed elsewhere herein.

In another aspect, a computer system configured to generate auto insurance discounts may be provided. The computer system may include one or more processors configured to: (1) receive, via a transceiver, such as via wireless communication or data transmission, telematics data for a vehicle for one or more trips; (2) determine, for each trip, which individual within a household was driving the vehicle, and/or determine their driving behavior for each trip based upon the telematics data; (3) use the telematics data received (and/or the individual driver and driving behavior determinations) to update or build a vehicle-usage profile for the vehicle, the vehicle-usage profile indicating how much and what time of day each member of a household typically drives or uses the vehicle, and their driving behavior while driving the vehicle; and/or (4) update an auto insurance premium or discount for the household or the vehicle based upon the vehicle-usage profile to provide insurance cost savings to lower risk households. The one or more processors may be configured to transmit, via a transceiver, the updated auto insurance discount to the insured for their review and/or approval. The computer system may include additional, less, or alternate functionality, including that discussed elsewhere herein.

In one aspect, a computer-implemented method of generating auto insurance discounts may be provided. The method may include (1) receiving, via one or more processors (and/or an associated transceiver), such as via wireless communication or data transmission, telematics data for a vehicle for one or more trips; (2) determining, via the one or more processors, for each trip, which individual within a household was driving the vehicle, and/or determining their driving behavior for each trip based upon the telematics data; (3) using, via the one or more processors, the telematics data received (and/or the individual driver and driving behavior determinations) to update or build a vehicle-usage profile for the vehicle, the vehicle-usage profile indicating how much and what time of day each member of a household typically drives or uses the vehicle, and their driving behavior while driving the vehicle; and/or (4) updating or generating, via the one or more processors, an auto insurance premium or discount for the household or the vehicle based upon the vehicle-usage profile to provide insurance cost savings to lower risk households. The one or more processors may be configured to transmit, via a transceiver, the updated auto insurance discount to the insured for their review and/or approval. The method may include additional, less, or alternate actions, including those discussed elsewhere herein.

In another aspect, a computer-implemented method of generating auto insurance discounts may be provided. The method may include (1) detecting or determining, via one or more processors, which individual within a household is driving a vehicle or sitting in the driver's seat at the outset of a vehicle trip, such as by analyzing data from one or more sensors; (2) collecting, via the one or more processors, telematics data for that vehicle trip; (3) assigning (and storing) or associating, via the one or more processors, the telematics data for that vehicle trip to the individual within the household that was identified as the driver during the vehicle trip; (4) determining a driving score for the individual and/or vehicle trip based upon the one or more processors analyzing the telematics data for the vehicle trip; (5) updating or building, via the one or more processors, a vehicle-usage profile for the vehicle based upon the telematics data for the vehicle trip and/or the driving score, the vehicle-usage profile indicating how much and what time of day each member of a household typically drives or uses the vehicle, and their driving behavior while driving the vehicle; and/or (6) updating, via the one or more processors, an auto insurance premium or discount for the household or the vehicle based upon the vehicle-usage profile to provide insurance cost savings to lower risk households and/or risk averse drivers. The one or more processors may be configured to transmit, via a transceiver, the updated auto insurance discount to the insured for their review and/or approval. The one or more processors may be local to vehicle, such as mounted within a mobile device and/or mounted on or within the vehicle or a vehicle controller. Additionally or alternatively, the one or more processors may be remote to the vehicle, such as a remote located server associated with an insurance provider. The method may include additional, less, or alternate actions, including those discussed elsewhere herein.

In another aspect, a computer system configured to generate auto insurance discounts may be provided. The computer system may include one or more processors or transceivers. The one or more processors may be configured to: (1) detect or determine which individual within a household is driving a vehicle or sitting in the driver's seat at the outset of a vehicle trip, such as by analyzing data from one or more sensors, such as vehicle mounted sensors; (2) collect telematics data for that vehicle trip; (3) assign (and store) or associate the telematics data for that vehicle trip to the individual within the household that was identified as the driver during the vehicle trip; (4) determine a driving score for the individual and/or vehicle trip based upon the one or more processors analyzing the telematics data for the vehicle trip; (5) update or build a vehicle-usage profile for the vehicle based upon the telematics data for the vehicle trip and/or the driving score, the vehicle-usage profile indicating how much and what time of day each member of a household typically drives or uses the vehicle, and their driving behavior while driving the vehicle (and/or otherwise accounting for driving behavior of each driver within a household); and/or (6) update an auto insurance premium or discount for the household or the vehicle based upon the vehicle-usage profile to provide insurance cost savings to lower risk households and/or risk averse drivers. The computer system may include additional, less, or alternate functionality, including that discussed elsewhere herein.

For instance, the one or more processors may be configured to transmit, via a transceiver, the updated auto insurance discount to the insured for their review and/or approval. The one or more processors may be local to vehicle, such as mounted within a mobile device and/or mounted on or within the vehicle or a vehicle controller. The one or more processors may be remote to the vehicle, such as a remote located server associated with an insurance provider.

Figure 9:
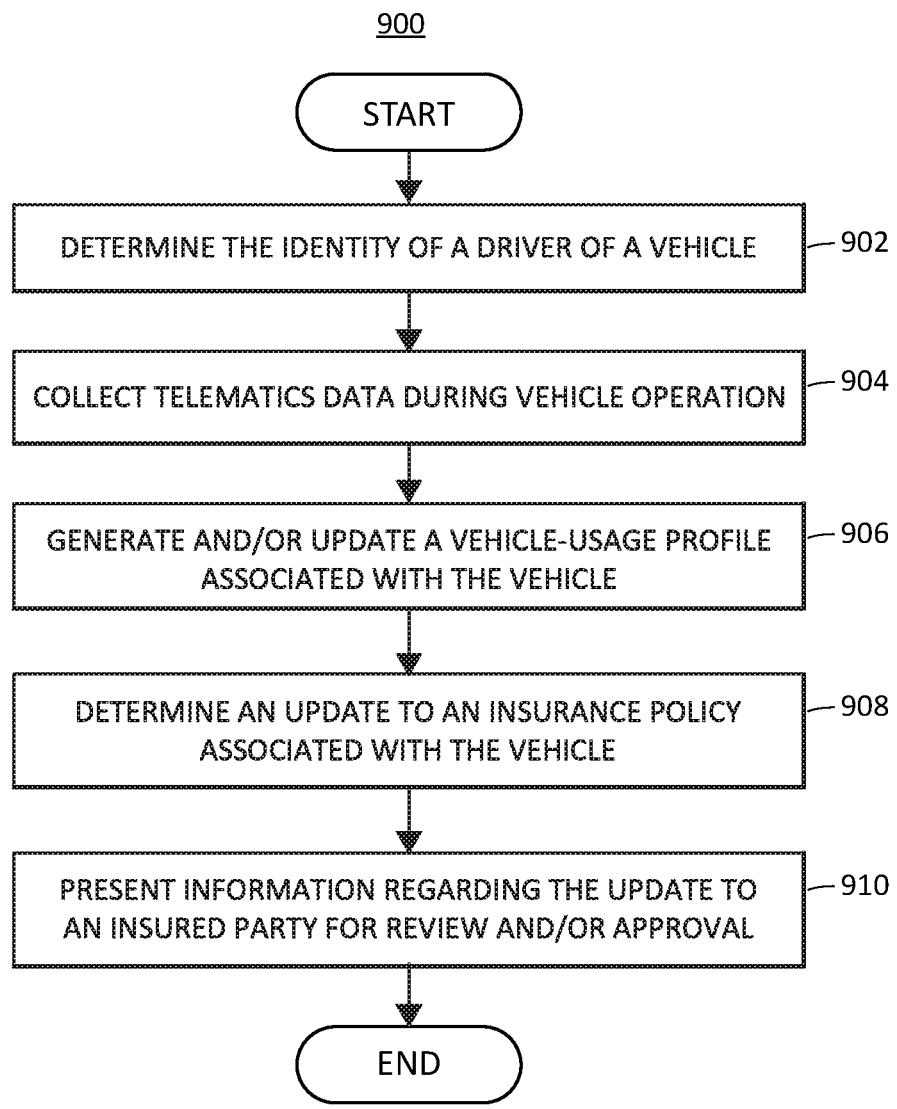
FIG. 9 illustrates a flow diagram of an exemplary vehicle-usage profile generation method.

FIG. 9 illustrates a flow diagram of an exemplary vehicle-usage profile generation method 900 for generating and/or updating a profile of vehicle usage associated with a driver of a vehicle 108. The method 900 may begin with determining the identity of the driver of the vehicle 108 using sensor data or other means (block 902). Telematics data regarding the operation of the vehicle 108 by the driver may then be collected during a vehicle trip (block 904). The collected data may be used to generate or update a vehicle-usage profile associated with the vehicle 108 and/or the driver (block 906). Based upon the vehicle-usage profile, an update or change to an insurance policy associated with the vehicle 108 may be determined (block 908) and presented to the vehicle owner, driver, or insured party for review or approval (block 910). The method 900 may be implemented by one or more external computing devices 206, such as one or more servers associated with an insurer.

At block 902, the external computing device 206 may determine the identity of the driver of the vehicle 108. In some embodiments, the identity may be first determined by a mobile computing device 110 or on-board computer 114 and transmitted to the external computing device 206, which may then determine the identity based upon communications received from the mobile computing device 110 or on-board computer 114. The mobile computing device 110 or on-board computer 114 may determine the driver of the vehicle 108 by comparison of sensor data from one or more sensors, including microphones, digital optical cameras, infrared cameras, or similar sensors. The mobile computing device 110, on-board computer 114, or external computing device 206 may instead determine the identity of the driver by reference to an electronic signal generated by a device associated with the driver (e.g., a wearable computing device, a smartphone, a fitness tracker, etc.). In some embodiments, the location of one or more people within the vehicle 108 may be determined to identify the driver by sensor data, electronic signal, or otherwise. In further embodiments, the driver may be identified by receiving a manual entry of an indication of the driver's identity (such as by logging in or selecting a user within a Telematics App).

At block 904, the external computing device 206 may collect telematics data regarding vehicle operation while the vehicle 108 is being driven by the identified driver. This may include one or more vehicle trips over a period of time. The telematics data may include data regarding the vehicle operating environment (e.g., information about a travel environment) or driving behavior (e.g., how the driver operates the vehicle with respect to speed, acceleration, braking, etc.). In some embodiments, the telematics data may be collected by the mobile computing device 110 or on-board computer 114 and transmitted to the external computing device 206 via the network 201. In further embodiments, the external computing device 206 may collect the telematics data from one or more databases (or other data storage devices) holding telematics data previously recorded by the mobile computing device 110 or on-board computer 114 (or by sensors communicatively connected thereto). In such manner, the external computing device 206 may obtain telematics data regarding operation of the vehicle 108 by the driver. Such telematics data may be collected from a plurality of vehicle trips occurring over a span of time (e.g., one week, one month, etc.) to generate or update a vehicle-usage profile.

At block 906, the external computing device 206 may generate or update a vehicle-usage profile associated with the vehicle 108. In some embodiments, the vehicle-usage profile may indicate the amount each driver uses the vehicle (e.g., total or proportional time driving, vehicle trips, miles driven, etc.). This usage information may include information regarding the type of vehicle operating environment or travel environment in which the driver typically operates the vehicle 108. The vehicle-usage profile may further include information indicating the driving behavior of each driver of the vehicle 108. Such driving behavior information may include a driver score, a driver rating, or a driver profile indicating one or more risk levels associated with the manner in which the driver usually operates the vehicle 108 (e.g., whether or the degree to which the driver is risk averse, aggressive, or inattentive while driving). This usage and behavior information may be useful in accurately assessing risk for insurance or other purposes when the vehicle 108 is regularly used by a plurality of drivers (e.g., a family car, a shared vehicle, etc.). For example, a vehicle-usage profile may indicate that a first driver operates the vehicle 108 for a first amount of use (e.g., 25% of the total miles driven each month, 50 miles per week, 25 hours per month, etc.) in a first In one embodiment, this information may be aggregated among a plurality of drivers of a plurality of vehicles in a vehicle-sharing group or network, such that profiles may be generated for each driver or each vehicle using information regarding the vehicle usage and driving behavior of drivers from multiple trips using multiple vehicles. When a vehicle-usage profile already exists, the external computing device 206 may update the existing profile based upon new telematics data, which updates may occur periodically or upon occurrence of an event (e.g., new telematics data from a vehicle trip becoming available).

At block 908, the external computing device 206 may determine an update or change to an insurance policy based upon the current vehicle-usage profile. The update may include a change to a premium, a coverage level, a coverage type, an exclusion, an insured driver, or other aspects of the policy, as discussed elsewhere herein. Determining an update to an insurance policy may include determining a change in one or more risk levels associated with operation of the vehicle 108 (or vehicle operation by one or more drivers). This may include comparing current vehicle-usage profiles with older vehicle-usage profiles containing data prior to the update. For example, if an update to the vehicle-usage profile reveals that a higher-risk driver now drives the vehicle 108 fewer miles, a discount in proportion to the decreased risk may be determined. Some updates may include not changing any aspects of the insurance policy, such as when a change in risk levels associated with vehicle operation are below a threshold for updating the insurance policy. Such thresholds may be used to avoid frequent changes of de minimis value.

At block 910, the update may be presented for review and/or approval. The external computing device 206 may cause the update to be presented to the vehicle owner, vehicle operator, insured party, or other interested person or organization. The update may be presented via a mobile computing device 110, on-board computer 114, or other external computing device 206 (e.g., a home computer, tablet, laptop, etc.). In some embodiments, the update may be presented for review and/or approval prior to being implemented. In further embodiments, the update may be implemented by applying the update to the insurance policy. In appropriate cases, the external computing device 206 may facilitate appropriate payments or funds transfers between an insurer and an insured related to the update.

Figure 10:
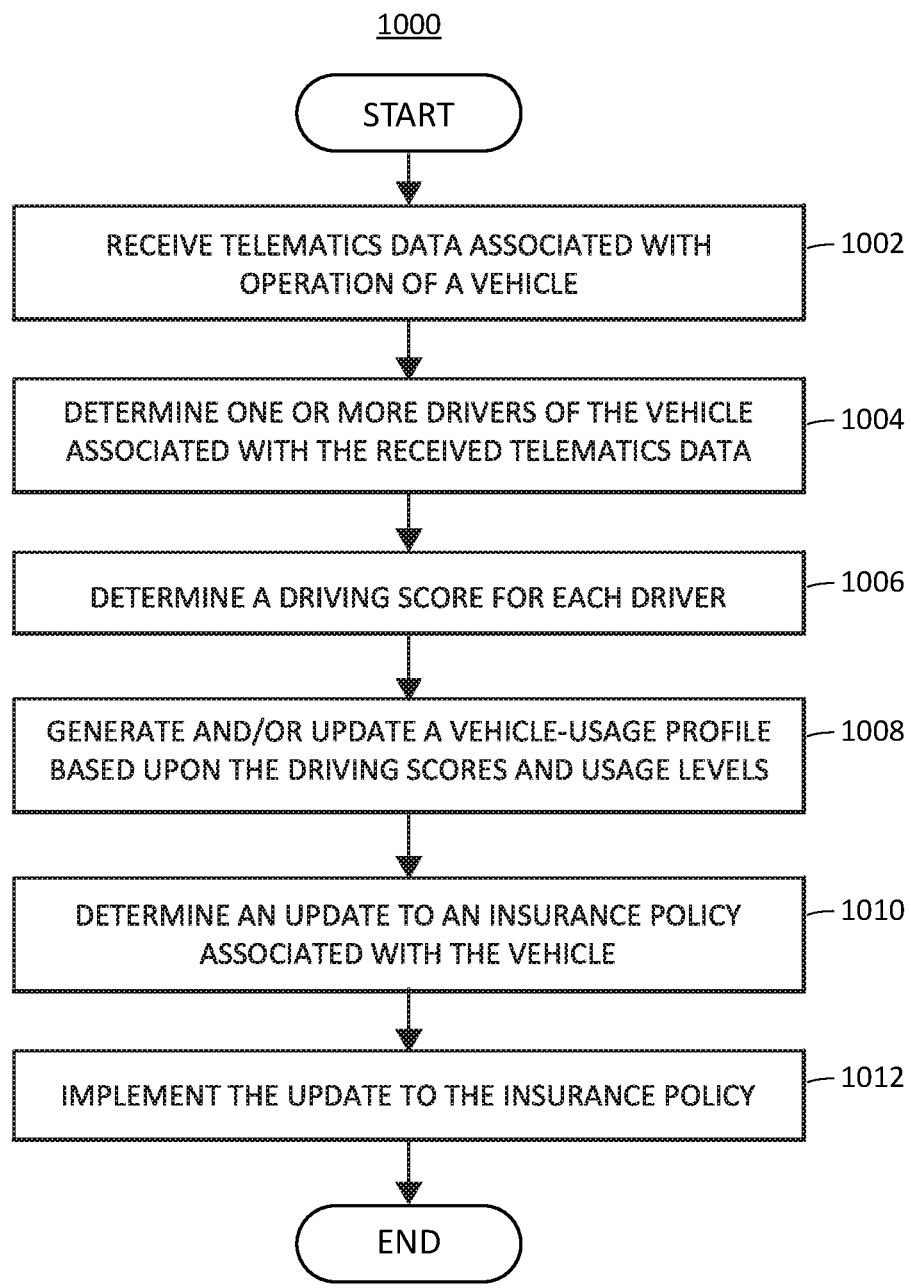
FIG. 10 illustrates a flow diagram of an exemplary vehicle-usage profile generation method.

FIG. 10 illustrates a flow diagram of another exemplary vehicle-usage profile generation method 1000 for generating and/or updating a profile of vehicle usage associated with a driver of a vehicle 108. The method 1000 may begin by receiving telematics data associated with the operation of the vehicle 108 (block 1002). From this data, one or more drivers may be identified (block 1004), and a driving score may be determined for each identified driver (block 1006). The vehicle-usage profile may then be generated or updated based upon the determined driving scores and usage levels for the one or more drivers (block 1008). Based upon the vehicle-usage profile, an update or change to an insurance policy associated with the vehicle 108 may be determined (block 1010) and presented to the vehicle owner, driver, or insured party for review or approval (block 1012). The method 1000 may be implemented by one or more external computing devices 206, such as one or more servers associated with an insurer.

At block 1002, the external computing device 206 may receive telematics data associated with operation of the vehicle 108. Telematics data relating to a single vehicle trip may be received from the mobile computing device 110 or on-board computer 114 via the network 201. For example, the mobile computing device 110 or on-board computer 114 may automatically upload the telematics data to the external computing device 206 (or a data storage associated therewith) upon completion of a vehicle trip (or at points during the trip). Alternatively, the external computing device 206 may receive telematics data for a plurality of vehicle trips, which may or may not include multiple drivers. In some embodiments, the external computing device 206 may request and receive data from a database or other data storage mechanism. For example, the external computing device 206 may request only new data since a previous update of the vehicle-usage profile from a database.

At block 1004, the external computing device 206 may determine the driver or drivers associated with the received telematics data. This may include determining one or more vehicle trips included in the received telematics data, which may be achieved by reference to vehicle movements, timestamps, indications of engine start-up or shut-down, etc. As noted elsewhere herein, the driver for each trip or portion of a trip may be determined by sensor data, electronic signals, or other means. The external computing device 206 may, therefore, associate a driver with each vehicle trip or portion thereof that is included in the received data.

At block 1006, the external computing device 206 may determine a driving score for each of the identified drivers based upon the received telematics data. The driving score may indicate a level of driving skill or a risk level associated with the driving behavior of the driver. For example, the driving score may be adjusted from a baseline for positive or negative driving behaviors identified from the telematics data. For example, a driver may have a baseline of 80 points, from which 5 points may be subtracted for driving in heavy traffic conditions, 2 points may be subtracted for following too closely behind other vehicles, one point may be added for consistent use of turn signals, etc. The baseline may be a general baseline or may be the driver's previous cumulative score prior to the update. Alternatively, the driving score may indicate a risk level associated with operation of the vehicle 108 by the driver, which may be based upon risks of both the driving behavior of the driver and the vehicle operating environment. In some embodiments, the driving score may include a plurality of sub-scores indicating aspects of driving behavior or an assessment of driving behavior in different travel environments.

At block 1008, the external computing device 206 may generate or update a vehicle-usage profile based upon the driving scores determined for the one or more drivers and the level of vehicle usage of each driver. As above, the vehicle-usage profile may indicate the amount each driver uses the vehicle, the typical vehicle operating environment for each driver, and an indication of each driver's driving score. In some embodiments, indications of risk levels associated with each driver may be included in the vehicle-usage profile. When a vehicle-usage profile already exists, the external computing device 206 may simply update the existing profile based upon new telematics data.

At block 1010, the external computing device 206 may determine an update or change to an insurance policy based upon the current vehicle-usage profile. The update may include a change to a premium, a coverage level, a coverage type, an exclusion, an insured driver, or other aspects of the policy, as discussed elsewhere herein. Determining an update to an insurance policy may include determining a change in one or more risk levels associated with operation of the vehicle 108 (or vehicle operation by one or more drivers). The driving scores may be used to directly or indirectly determine risks associated with each driver for purposes of determining updates or changes to the insurance policy.

At block 1012, the external computing device 206 may further implement the update to the insurance policy. This may include causing information associated with the update or change to be presented to the vehicle owner, driver, insured party, or other interested person or organization for review and/or approval. The external computing device 206 may further effect the implementation of the update by generating or adjusting records relating to the policy terms. In appropriate cases, the external computing device 206 may facilitate appropriate payments or funds transfers between an insurer and an insured related to the update.

Traffic Condition Broadcast

In one aspect, a computer-implemented method of generating traffic alerts and abnormal traffic condition avoidance may be provided. The method may include (1) detecting, via one or more processors (such as vehicle-mounted sensors or processors), that an abnormal traffic condition exists in front of the vehicle or in the vicinity of the vehicle; (2) generating, via the one or more processors, an electronic message detailing the abnormal traffic condition; and/or (3) transmitting, via the one or more processors (or an associated vehicle-mounted transceiver), the electronic message to nearby vehicles (and/or their associated vehicle controller/processors, such as with autonomous or self-driving vehicles) traveling behind the vehicle via wireless communication or data transmission to alert other drivers of the abnormal traffic condition and to allow them to avoid the abnormal traffic condition to facilitate safer vehicle travel. The method may include additional, less, or alternate actions, including those discussed elsewhere herein.

For instance, the abnormal traffic condition may be (1) an erratic vehicle or driver; (2) road construction; (3) closed highway exit; (4) slowed or slowing traffic or congestion; and/or (5) vehicles braking ahead. The abnormal traffic condition may be bad weather (rain, sleet, snow, ice, freezing rain, etc.), and the message may indicate a GPS location of the bad weather. The method may include generating, via the one or more processors or a remote processor (e.g., smart infrastructure or remote server), an alternate route for nearby vehicles to take to avoid the abnormal traffic condition. The method may include generating, via the one or more processors or a remote processor, an auto insurance discount for the vehicle having the abnormal traffic condition detection functionality and broadcasting the electronic message indicating the abnormal traffic condition.

In another aspect, a computer-implemented method of generating traffic alerts and providing for abnormal traffic condition avoidance may be provided. The method may include (1) detecting, via one or more processors (such as vehicle-mounted sensors or processors), that an abnormal traffic condition exists, such as via analysis of vehicle telematics data (e.g., determining vehicle traveling through road construction or congestion); (2) generating, via the one or more processors, an electronic message detailing the abnormal traffic condition; and/or (3) transmitting (such as transmitting only when the abnormal traffic condition exists to conserve energy), via the one or more processors (or an associated vehicle-mounted transceiver), the electronic message to nearby vehicles (and/or their associated vehicle controller/processors, such as with autonomous or self-driving vehicles) traveling behind the vehicle via wireless communication or data transmission to alert other drivers of the abnormal traffic condition and to allow them to avoid the abnormal traffic condition to facilitate safer vehicle travel. The method may include additional, less, or alternate actions, including those discussed elsewhere herein.

In one aspect, a computer system configured to generate traffic alerts and provide for abnormal traffic condition avoidance may be provided. The computer system comprising one or more processors and/or transceivers (such as vehicle-mounted processors or sensors), the one or more processors configured to: (1) detect that an abnormal traffic condition exists in front of the vehicle; (2) generate an electronic message detailing the abnormal traffic condition; and/or (3) transmit, via an associated vehicle-mounted transceiver, the electronic message to nearby vehicles (and/or their associated vehicle controller/processors, such as with autonomous or self-driving vehicles) traveling behind the vehicle via wireless communication or data transmission to alert other drivers of the abnormal traffic condition and to allow them to avoid the abnormal traffic condition to facilitate safer vehicle travel. The computer system may include additional, less, or alternate functionality, including that discussed elsewhere herein.

For instance, the abnormal traffic condition may be (1) an erratic vehicle or driver; (2) road construction; (3) closed highway exit; (4) slowed or slowing traffic or congestion; and/or (5) vehicles braking ahead. The abnormal traffic condition may be bad weather (rain, sleet, snow, ice, freezing rain, etc.), and the message indicates a GPS location of the bad weather.

The system may be configured to generate, via the one or more processors or a remote processor (e.g., smart infrastructure or remote server), an alternate route for nearby vehicles to take to avoid the abnormal traffic condition. The system may be configured to generate, via the one or more processors or a remote processor, an auto insurance discount for the vehicle having the abnormal traffic condition detection functionality.

In another aspect, a computer system configured to generate traffic alerts and provide for abnormal traffic condition avoidance may be provided. The computer system may include one or more vehicle-mounted processors and/or sensors configured to: (1) detect that an abnormal traffic condition exists, such as via analysis of vehicle telematics data (e.g., determining vehicle traveling through road construction or congestion); (2) generate an electronic message detailing the abnormal traffic condition; and/or (3) transmit (such as transmitting only when the abnormal traffic condition exists to conserve energy), via an associated vehicle-mounted transceiver, the electronic message to nearby vehicles (and/or their associated vehicle controller/processors, such as with autonomous or self-driving vehicles) traveling behind the vehicle via wireless communication or data transmission to alert other drivers of the abnormal traffic condition and to allow them to avoid the abnormal traffic condition to facilitate safer vehicle travel.

Figure 11:
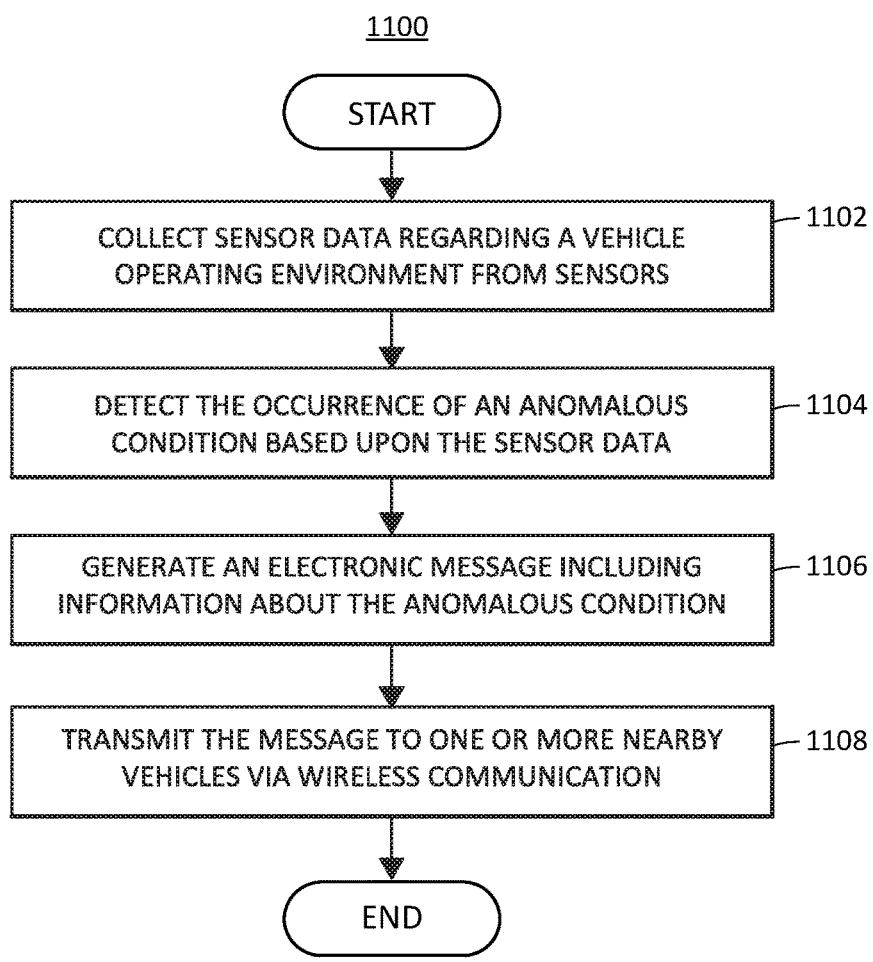
FIG. 11 illustrates a flow diagram of an exemplary traffic condition broadcast method.
Figure 12:
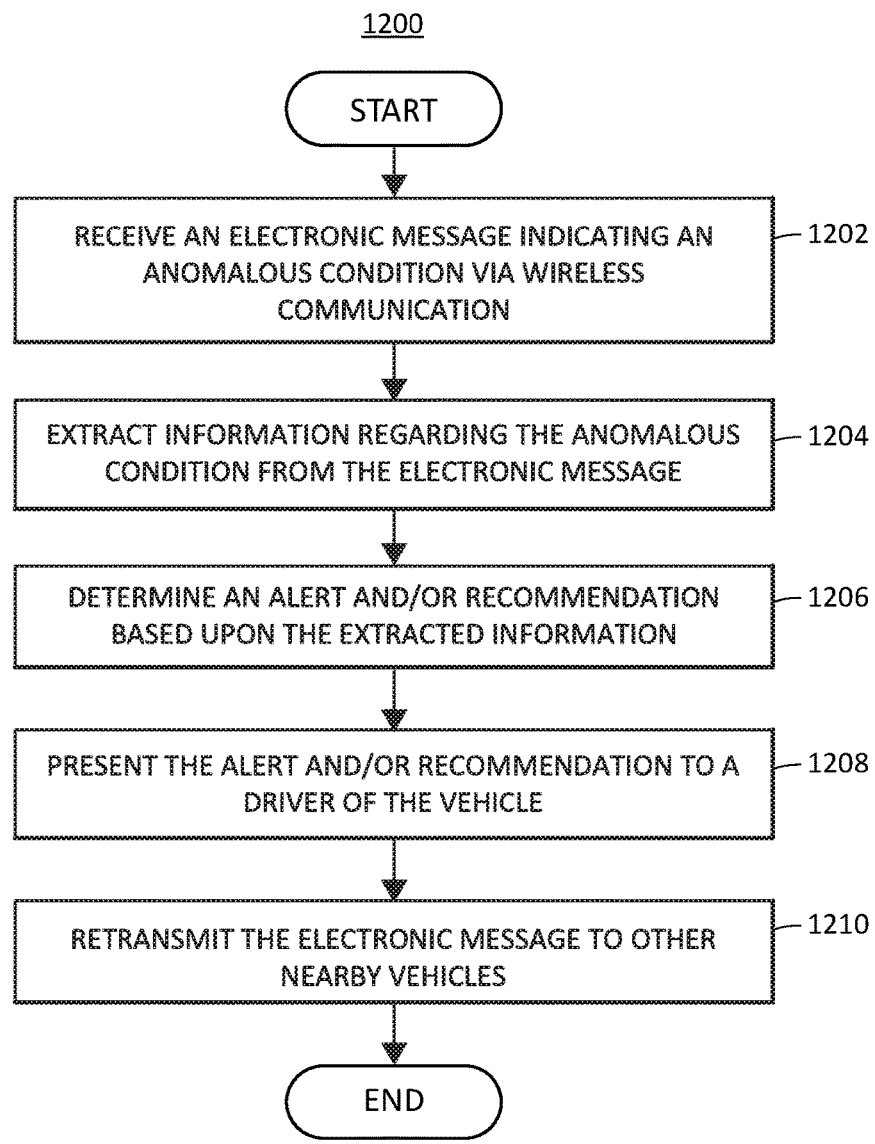
FIG. 12 illustrates a flow diagram of an exemplary alert generation and presentation method.

FIGS. 11 and 12 illustrate methods of determining, generating, transmitting, receiving, and presenting alerts or notifications related to anomalous or abnormal conditions. The exemplary method illustrated in FIG. 11 may be used to detect such anomalous conditions and to generate and transmit messages to inform other vehicles. The exemplary method illustrated in FIG. 12 may be used to receive, parse, and present alerts based upon such messages. Although the methods are described as being performed by mobile computing devices 110 and/or on-board computers 114 associated with vehicles, some embodiments may instead perform some or all actions using one or more external computing devices 206, such as servers communicatively connected to the vehicles via the network 201.

FIG. 11 illustrates a flow diagram of an exemplary traffic condition broadcast method 1100 for detecting anomalous conditions in a vehicle operating environment and generating electronic messages to warn other vehicles. The method 1100 may begin by collecting sensor data from one or more sensors within the vehicle operating environment of a vehicle 108 (block 1102). The sensor data may be processed to detect whether any anomalous conditions exist (block 1104). When an anomalous condition is detected, an appropriate electronic message may then be generated regarding the anomalous condition (block 1106). The electronic message may then be transmitted to nearby vehicles 202 via wireless communication to warn such other vehicles 202 of the anomalous condition (block 1108).

At block 1102, the vehicle 108 may collect sensor data regarding the operating environment through which the vehicle 108 is traveling. The sensor data may be collected by a mobile computing device 110 or on-board computer 114 associated with the vehicle 108. The sensor data may be collected from one or more sensors disposed within the vehicle 108 (including sensors disposed within the mobile computing device 110 located within the vehicle 108). The sensors may be built into the vehicle 108, the mobile computing device 110, or the on-board computer 114, or the sensors may be communicatively connected to the mobile computing device 110 or on-board computer 114 via wired or wireless connections. The sensors may monitor events within the vehicle 108 (e.g., acceleration, speed, sounds, etc.) or outside the vehicle 108 (e.g., number and location of other vehicles, movement of other vehicles, number of pedestrians near the vehicle 108, weather conditions, road integrity, construction, lane closures, etc.). In some embodiments, sensor data may be collected from or by smart infrastructure components 208. Such infrastructure components 208 may include sensors to generate sensor data regarding vehicle traffic passing a position (e.g., vehicles passing through a toll booth, vehicle passing an embedded sensor in a roadway, state of a railroad crossing gate, etc.), pedestrian traffic (e.g., number of pedestrians on a sidewalk, state of a pedestrian-activation button on a cross-walk signals, etc.), atmospheric conditions (e.g., temperature, precipitation, wind, etc.), or other data regarding a local environment. Sensor data from infrastructure components 208 may be transmitted wirelessly to a mobile computing device 110 or on-board computer 114 of a nearby vehicle, may be transmitted via the network 201 to an external computing device 206, or may be processed by the infrastructure component 208 to generate an alert concerning an anomalous condition. In further embodiments, sensor data may be transmitted between vehicles to improve safety (e.g., vehicles may transmit indications of sudden braking to warn nearby vehicles).

At block 1104, the mobile computing device 110 or on-board computer 114 may determine whether an anomalous condition exists based upon the received sensor data. Such anomalous conditions may include anomalous traffic conditions (e.g., traffic jams, accidents, heavy traffic congestion, lane closures, ramp closures, potholes, slowing traffic, sudden braking, erratic vehicle operation, swerving, etc.), anomalous weather conditions (e.g., high winds, road ice, heavy precipitation, flooding, etc.), anomalous environmental conditions (e.g., heavy pedestrian traffic, pedestrians on the roadway, heavy bicycle traffic, wild animals on or near the roadway, etc.), or other similar anomalous conditions relating to the vehicle operating environment through which the vehicle 108 is traveling. For example, an accident may result in a congestion and slowing of traffic in the area of the accident. This may be detected based upon sensor data regarding vehicle braking, vehicle speed, number of vehicles on a segment of the roadway, and/or distance between vehicles. Based upon the sensor data, the occurrence of a traffic jam and/or accident may be detected by the mobile computing device 110 or on-board computer 114. As another example, heavy pedestrian traffic at the end of a sporting event or concert may lead to slow vehicle traffic flow and increased risk of a collision in an area. Sensor data may indicate an unusually high number of pedestrians in the area, as well as slow vehicle movement. This sensor data may be assessed by the mobile computing device 110 or on-board computer 114 to determine that an anomalous condition exists as a result of heavy pedestrian traffic. Alternatively, an external computing device 206 may detect heavy pedestrian traffic based upon GPS data from mobile devices of numerous pedestrians in the area. As yet another example, the vehicle 108 may detect ice on the roadway based upon sensor data indicating a momentary or partial loss of traction by the vehicle 108. In some embodiments, a plurality of anomalous conditions may be detected based upon the same sensor data.

At block 1106, the mobile computing device 110 or on-board computer 114 may generate an electronic message based upon the detected anomalous condition. The message may include information regarding the type and location of the anomalous condition. For example, the message may indicate an accident has occurred and a location of the vehicle 108. The message may include an indication of severity or urgency of the anomalous condition or an indication of the duration of the condition. For example, a flooded roadway or closed bridge may be flagged as high importance or extremely urgent conditions, whereas a lane closure or slow-moving traffic may be left unlabeled or labeled as low-priority anomalous conditions. In some embodiments, the electronic message may be encoded for security or may use a standardized format for data transmission. In further embodiments, the message may include information regarding the anomalous condition (or other anomalous conditions in the vicinity of the vehicle 108) received by the vehicle 108 in one or more electronic messages from other vehicle 202. In such manner, the information regarding the anomalous condition may be automatically generated and updated in real time as a plurality of vehicles reach the location or communicate additional information.

At block 1108, the mobile computing device 110 or on-board computer 114 of the vehicle 108 may transmit the electronic message to other nearby vehicles 202. In some embodiments, the vehicle 108 may transmit the electronic message on a dedicated frequency using one-way communications to any other vehicles that may be in the vicinity. In other embodiments, the vehicle 108 may transmit the electronic message (directly or indirectly) to identified vehicles 202 near the vehicle 108. The vehicle 108 may similarly transmit the electronic message to an external computing device 206 via the network 201, which external computing device 206 may redirect the electronic message to appropriate vehicles 202 via the network 201. Where other vehicles 202 are specifically targeted to receive the electronic message from the vehicle 108, the vehicles 202 may be selected based upon proximity (e.g., as determined by comparison of GPS coordinates) or based upon an anticipated path of the vehicles 202. For example, the vehicle 108 may not transmit the electronic message to other vehicles 202 that are near the anomalous condition but are also moving away from the anomalous condition, such as vehicles 202 that have already passed the site of an accident. Instead, the vehicle 108 may transmit the electronic message (directly or indirectly) to other vehicles 202 that are further from the accident site but are traveling toward it. In other embodiments, the vehicle 108 may not distinguish between vehicles 202 based upon their path, with such determination of relevance being left to the vehicle 202 receiving the message.

FIG. 12 illustrates a flow diagram of an exemplary alert generation and presentation method 1200 for receiving electronic messages concerning anomalous conditions in the vehicle operating environment and taking actions based upon the contents such messages. The method 1200 may begin by receiving at a vehicle 202 an electronic message indicating the occurrence of an anomalous condition via wireless communication (block 1202). The electronic message may then be processed to extract information regarding the anomalous condition from the message data (block 1204). This information regarding the anomalous condition may be used to determine a response, which may include generating an alert and/or recommendation based upon the information (block 1206). The alert and/or recommendation may be presented to the driver of the vehicle 202 and/or implemented by a vehicle control or navigation system (block 1208). In some instances, the electronic message may be retransmitted (with or without modification) to other nearby vehicles to disseminate the information regarding the anomalous condition (block 1210).

At block 1202, the vehicle 202 may receive the electronic message regarding the one or more detected anomalous conditions via wireless communication, such as electronic messages generated and transmitted as described above. The electronic message may be received directly or indirectly from a vehicle 108 generating the message, as discussed above, or the electronic message may be received from an external computing device 206 (such as a server associated with an insurer, navigation service, or travel alert service). The electronic message may be received by an antenna of the vehicle 202 or via a network communication connection of the mobile computing device 110 or on-board computer 114. As noted above, the vehicle 202 may also receive electronic messages from smart infrastructure components 208 in some embodiments. In some embodiments, the message may be received from transmitters associated with locations or vehicles of particular significance. For example, slow-moving vehicles (e.g., farm machinery, construction equipment, oversized load vehicles, etc.) or emergency vehicles (e.g., ambulances, fire trucks, police vehicles, etc.) may be equipped to transmit electronic messages indicating their presence to nearby vehicles 202. Similarly, portable communication devices may be used by pedestrians, cyclists, or others to notify vehicles of their presence by transmitting electronic messages.

At block 1204, the mobile computing device 110 or on-board computer 114 may process the received electronic message to extract information regarding the anomalous condition. This may include determining types of anomalous conditions, locations associated with the anomalous conditions, indications of urgency or importance of the message, and/or a time associated with the message. In some embodiments, this may also include determining multiple messages from vehicles 108 include information regarding the same anomalous condition (or aspects thereof). For example, a first message may be received regarding a traffic back-up beginning at a first point along the roadway, and a second message may be received indicating a lane closure or accident at a second point further along the roadway.

At block 1206, the mobile computing device 110 or on-board computer 114 may determine an alert or recommendation regarding the anomalous condition. Determining alerts may include determining the level of detail to present to the driver of the vehicle 202 regarding the anomalous condition. For example, an icon may be presented on a map presented by a navigation system to indicate the location of an anomalous condition, which may include an indication of the general type of condition. In other embodiments, a warning may be presented to the driver, which may include information regarding the type and location of the anomalous condition. When messages regarding multiple anomalous conditions are received, the mobile computing device 110 or on-board computer 114 may determine which and how many alerts to present. In further embodiments, the mobile computing device 110 or on-board computer 114 may determine one or more recommendations regarding vehicle operation in view of the information received regarding one or more anomalous conditions. For example, an alternative route may be suggested to the driver to avoid a traffic jam or construction. As another example, an alert may include a recommendation to seek shelter when a severe storm is approaching.

In some embodiments, determining the alert or recommendation may include determining whether the anomalous condition is relevant to the vehicle 202. This may include comparing the location of the anomalous condition with a projected path of the vehicle 202. The projected path may be determined by simply following the road on which the vehicle 202 is traveling in the direction of travel, or it may be determined from a navigation system providing directions to a destination. In some embodiments, past vehicle travel may be used to project one or more probable paths for the vehicle 202. Anomalous conditions not falling within the vehicle path may be deemed irrelevant and suppressed in some embodiments. For example, an accident located on the same road but behind the vehicle 202 may be of little importance and may be ignored by the mobile computing device 110 or on-board computer 114.

At block 1208, the mobile computing device 110 or on-board computer 114 may cause the determined alert or recommendation to be presented to the driver of the vehicle 202. This may include causing a visual warning to be presented on a screen associated with the mobile computing device 110 or on-board computer 114, an audible warning to be presented by a speaker, or other types of warnings to alter the driver of the anomalous condition. Recommendations may similarly be presented to the driver, such as by presentation of text on a screen or as spoken recommendations. In some embodiments, a recommendation may be automatically implemented, with or without notice to the driver. For example, a navigation system may automatically update directions to follow a recommended alternate route. As another example, an autonomous vehicle may automatically follow an alternate route based upon the recommendation determined by the mobile computing device 110 or on-board computer 114.

At block 1210, the mobile computing device 110 or on-board computer 114 may determine to retransmit the received electronic message to other nearby vehicles 202. In some embodiments, this may include adding additional information regarding the anomalous condition available to the vehicle 202 to the original electronic message. In other embodiments, the vehicle 202 may determine not to retransmit the electronic message. For example, the range of the original transmission may be deemed sufficient to alert all vehicles in the vicinity of the anomalous condition, or an external computing device 206 may direct the electronic message to other relevant vehicles. In some embodiments, the vehicle 202 may determine to retransmit the electronic message only after a delay period, which may facilitate distribution of the message to additional vehicles just entering the transmission range. For example, an electronic message regarding the beginning of a traffic jam may be delayed by fifteen seconds, such that faster moving vehicles approaching from behind may enter the transmission range in the interval between the original message transmission and the message retransmission.

Using Personal Telematics Data for Rental/Insurance Discounts

In one aspect, a computer-implemented method of using telematics data during e-commerce may be provided. The method may include (1) collecting, via one or more processors associated with a customer, telematics data detailing the customer's typical driving behavior; (2) transmitting, via a transceiver under the direction or control of the one or more processors, the telematics data directly or indirectly to a rental car company remote server, such as via wireless communication or data transmission; and/or (3) receiving, via the transceiver under the direction or control of the one or more processors, a computer generated discount off the rental price associated with renting a rental vehicle from the rental car company to facilitate (i) rewarding safe driving with lower cost rental vehicles for risk averse drivers, and/or (ii) allow consumers to collect their own telematics data and enjoy cost savings if they decide to share their telematics data with various merchants.

In another aspect, a computer-implemented method of using telematics data during e-commerce may be provided. The method may include (1) receiving, via one or more processors, telematics data detailing the customer's typical driving behavior; (2) determining, via the one or more processors, a discount for a rental car from computer analysis of the customer's telematics data; and/or (3) transmitting, via a transceiver under the direction or control of the one or more processors, the rental car discount to a customer's mobile device, such as via wireless communication or data transmission, for the customer review and/or approval to facilitate (i) rewarding safe driving with lower cost rental vehicles for risk averse drivers, and/or (ii) allow consumers to collect their own telematics data and enjoy cost savings if they decide to share their telematics data with various merchants. The foregoing methods may include additional, less, or alternate functionality, including that discussed elsewhere herein and/or may be implemented via one or more local or remote processors.

Figure 13:
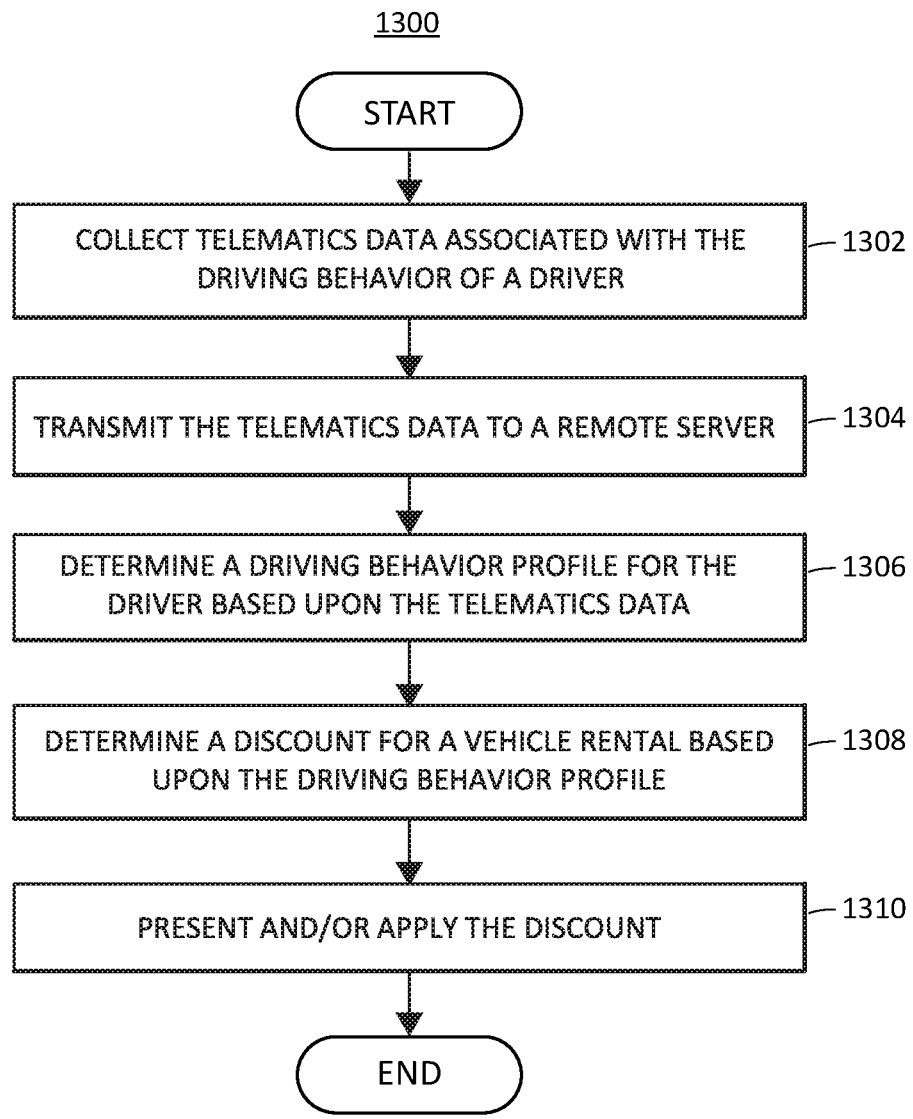
FIG. 13 illustrates a flow diagram of an exemplary personal telematics data profile generation method.

FIG. 13 illustrates a flow diagram of an exemplary personal telematics data profile generation method 1300 for generating a driving behavior profile used for rental discounts. The method 1300 may be used by a driver to record, store, and share telematics data to obtain a discount for safe driving when renting a vehicle, such as a rental car or moving truck. The method 1300 may begin with the collection of telematics data regarding vehicle operation by a driver (block 1302). The telematics data may be transmitted to a remote server for analysis (block 1304). Based upon the transmitted telematics data, the server may determine or generate a driving behavior profile associated with the driver (block 1306). A discount on a vehicle rental may further be determined based upon the driving behavior profile (block 1308). The discount may then be presented to the user and/or applied to the rental fee (block 1310).

At block 1302, telematics data may be collected using sensors disposed within or communicatively connected to the mobile computing device 110 or on-board computer 114. In some embodiments, the telematics data may be collected by a Telematics App. The telematics data may be any data relating to the usage, operating environment, or operation of the vehicle associated with the driver (e.g., time, location, weather, traffic, type of road, pedestrian traffic, geographic area, speed, braking, acceleration, swerving, lane centering, distance from other vehicles, etc.). The telematics data may be stored within the mobile computing device 110 or on-board computer 114, or the telematics data may be stored in a remote data storage device (e.g., in a database associated with a server or in a cloud computing data storage). The telematics data may be stored as a collection of data points, or it may be preprocessed into a summary form. For example, the data may be summarized into a set of scores related to aspects of the driver's behavior when operating the vehicle 108 (e.g., acceleration, braking, steering, traffic level, type of road, etc.). As another example, summary data regarding locations, times, and durations of vehicle operation may be recorded. As yet another example, summary data regarding only anomalous conditions or high-risk driving behavior may be recorded to reduce the amount of data stored. In some such situations, a summary of driving without anomalous or high-risk conditions may also be stored (e.g., total miles driven, total time driven, etc.). Such telematics data may be associated with all vehicle operation by the driver or may be limited to previous rental vehicle operation by the driver.

At block 1304, the collected telematics data may be transmitted to a remote server (such as an external computing device 206) via the network 201. In some embodiments, the remote server may be associated with, operated by, or operated on behalf of an insurer, a vehicle rental company, or a third-party rating agency. A driver may operate a Telematics App installed on the mobile computing device 110 or on-board computer 114 to transmit the telematics data to the remote server. The Telematics App may cause the telematics data (or a summary thereof) to be transmitted from the mobile computing device 110 or on-board computer 114 to the remote server in some embodiments. In other embodiments in which the telematics data is stored in a cloud storage or other remote storage device, the Telematics App may cause the transmission of the telematics data from such storage device to the remote server. Alternatively, the Telematics App may retrieve the telematics data from the storage device and retransmit the telematics data to the remote server. In further embodiments, the telematics data may be transmitted in response to a request from the remote server. In yet further embodiments, the telematics data may be automatically transmitted to the remote server by the Telematics App Such automatic transmission may occur either periodically or upon occurrence of an event, such as when new data is available and the mobile computing device 110 or on-board computer 114 has a sufficient network connection or when a vehicle is returned to a vehicle rental facility.

At block 1306, the remote server may determine a driving behavior profile for the driver based upon the telematics data. The driving behavior profile may include indications of risk levels associated with vehicle operation by the driver in one or more sets of operating conditions (e.g., vehicle operating environments, travel environments, geographic locations, weather conditions, etc.). Such indications of risk levels may include risk scores or risk categories associated with the driver. In some embodiments, the driving behavior profile may include only summary information regarding vehicle operation by the driver, while other embodiments may include detailed information regarding such vehicle operation. The remote server may determine the risk levels by comparing the received telematics data against known loss rate associated with other drivers having similar driving habits or patterns (based upon the received telematics data). This may include analyzing the telematics data using machine learning algorithms or applying pre-determined statistical models to the telematics data received. Although the foregoing discussion describes the driving behavior profile as being determined by an external computing device 206 beyond the control of the driver, some embodiments may include using the driver's mobile computing device 110 (such as a smartphone) or on-board computer 114 to determine the driving behavior profile. In such embodiments, a Telematics App or other program installed on the mobile computing device 110 or on-board computer 114 may determine the driving behavior profile. Such driving behavior profile may then be transmitted to an external computing device 206 associated with the vehicle rental facility or may present a summary report that may be displayed when renting a vehicle.

At block 1308, the external computing device 206 may determine a discount for the vehicle rental based upon the driving behavior profile. The discount may be determined based upon risk levels or categories indicated by the driving behavior profile to reflect the loss associated with the driver's operation of the rented vehicle. The appropriate discount based upon the indicated risk may be determined by appropriate actuarial methods based upon loss data from a plurality of drivers for whom telematics data or driving behavior profiles are available. In some embodiments, this may be supplemented with telematics or loss data specific to rental vehicles similar to that being rented by the driver. Such supplemental data may reflect differences in risk levels for rental vehicles, which may be of different design or have different operating characteristics from vehicle ordinarily operated by the driver. In some embodiments, the discount may include a reduction in rental price, a reduction in a premium on an insurance policy covering the rental vehicle, a lower deductible on such an insurance policy, an expanded coverage on such an insurance policy, or an additional coverage type available to the driver. In further embodiments, increases in rental price, premiums, or deductibles may be determined based upon the driving behavior profile, or the vehicle rental facility may require a minimum level of insurance based upon the driving behavior profile. In other embodiments, a guaranteed minimum discount level may be offered to the driver in exchange for providing telematics data or a driving behavior profile to the vehicle rental facility.

At block 1310, the discount may be presented for review and/or applied to a vehicle rental. The discount may be presented to the driver as part of a quoted price or as part of a plurality of options presented for selection when arranging to rent a vehicle. For example, each of a plurality of options indicating a price without a discount, a discount based upon the determined driving behavior profile, and a discounted price may be presented to the driver (e.g., a plurality of vehicles, days, or insurance options). Alternatively, the discount may be automatically applied to the rental price when the vehicle is rented. In still further embodiments, the discount may be applied when the rented vehicle is returned, and such discount may be based upon a driving behavior profile specific to operation of the rented vehicle by the driver.

Shared Vehicle Usage Monitoring and Feedback

In one aspect, methods and systems for monitoring and providing feedback regarding vehicle operation may be provided. Such feedback may be useful for monitoring usage of shared vehicles or fleet management. The methods and systems may be used to monitor operation of a vehicle by a driver other than the vehicle owner, such as drivers of family vehicles, rental vehicles, car-share vehicles, or company vehicles (e.g., delivery vans, company car pool vehicles, etc.). In some embodiments, the methods and systems may operate in real-time or near real-time to provide notifications or metrics during vehicle operation. As an example, a parent may receive real-time notifications of aggressive driving of a family vehicle by a child, which notifications may be pushed to a mobile phone of the parent by SMS text messages or application-specific notifications.

Figure 14:
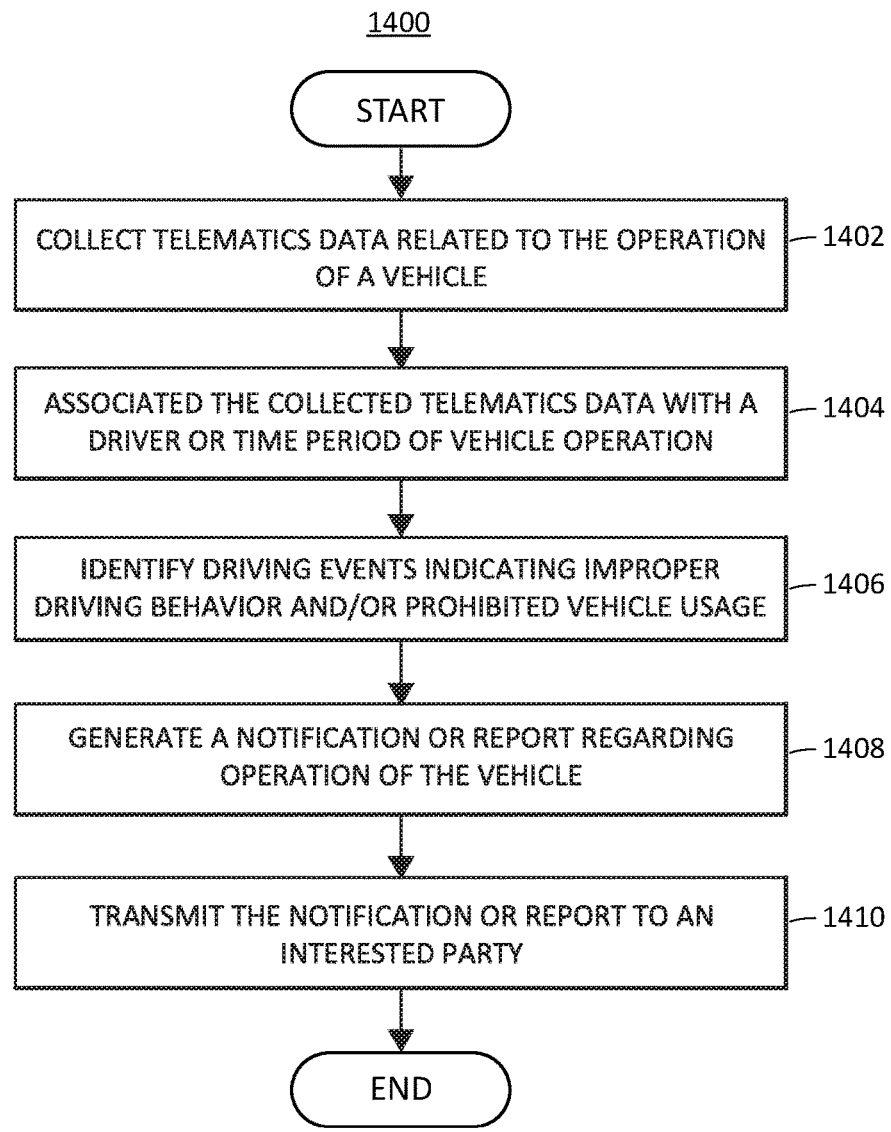
FIG. 14 illustrates a flow diagram of an exemplary shared vehicle usage monitoring method.

FIG. 14 illustrates a flow diagram of an exemplary shared vehicle usage monitoring method 1400 for reporting vehicle usage information to a vehicle owner or other interested party. The method 1400 may collect telematics data related to vehicle operation of a vehicle 108 (block 1402), which data may be associated with a driver or period of vehicle usage (block 1404). From such collected telematics data, one or more driving events may be identified (block 1406). Such driving events may be events indicative of improper driving behavior and/or prohibited vehicle usage. Based upon the identified driving events, a notification or report may be generated regarding operation of the vehicle 108 (block 1408). The notification or report may then be transmitted to an interested party, such as a vehicle owner (block 1410).

At block 1402, telematics data regarding vehicle operation of the vehicle 108 may be collected using one or more sensors. Such sensors may include accelerometers, speedometers, tachometers, geopositioning devices, cameras, or other sensors disposed within the vehicle 108 (including sensors within a mobile computing device 110 within the vehicle), within other nearby vehicles 202 in proximity to the vehicle 108, and/or within the vehicle operating environment of the vehicle 108 (e.g., sensors disposed within smart infrastructure components 208). The telematics data may be collected locally by a mobile computing device 110 or on-board computer 114 within the vehicle 108, or the telematics data may be collected by an external computing device 110 (such as a remote server associated with an insurer, the vehicle owner, or a third-party monitoring service). The telematics data may be collected, recorded, and/or transmitted using a Telematics App of the mobile computing device 110 or on-board computer 114. In some embodiments, the Telematics App may receive sensor data and transmit the sensor data (or a summary thereof) to a remote server for further analysis. Regardless of the site of collection, the telematics data may include information regarding the times, locations, and manners of vehicle operation. For example, information regarding speed, braking, acceleration, mobile phone usage, turn signal usage, or similar indication of driving behavior may be included in the telematics data. The telematics data may further include data indicating one or more drivers operating the vehicle 108.

At block 1404, the mobile computing device 110, on-board computer 114, or external computing device 206 may determine a driver and/or time period of vehicle operation based upon the received data and may further associate the determined driver and/or time period with the telematics data. This may include determining the identity of the driver based upon sensor data (e.g., an image from a camera), electronic signals (e.g., an identifying signal from a smartphone), or other means (e.g., driver selection of a user identity in a Telematics App when beginning operation). The time period may be determined by reference to an internal clock of the mobile computing device 110, on-board computer 114, or external computing device 206 or comparison of a date and time of the telematics data (e.g., a timestamp) with a schedule of dates or times to determine a relative time period (e.g., daylight hours, twilight, night, weekdays, holidays, etc.). The driver and/or time period of vehicle operation may be associated with the telematics data regarding the operation of the vehicle 108.

At block 1406, the mobile computing device 110, on-board computer 114, or external computing device 206 may identify one or more driving events indicative of improper or prohibited driving behavior based upon the received telematics data. This may include comparing vehicle usage with information regarding allowed or prohibited uses for the identified driver and/or time period. For example, a child driving a family vehicle may be prohibited from driving outside a predetermined geographic area or during certain nighttime hours (which may differ on weekends or holidays), but another child driving the same family vehicle may have different restrictions. As another example, an employee driving a fleet vehicle may be prohibited from driving on highways or deviating by more than a predetermined distance from a set route. As yet another example, use of a car-sharing vehicle for extended trips (e.g., multi-day trips, trips beyond 100 miles, etc.) may violate restrictions on use of the shared vehicle. Operation of the vehicle 108 beyond the allowed operating environment (or in violation of prohibitions on operation) may be identified by the mobile computing device 110, on-board computer 114, or external computing device 206 as a driving event indicating prohibited vehicle operation.

Similarly, the mobile computing device 110, on-board computer 114, or external computing device 206 may identify improper vehicle operation based upon the telematics data regarding the driving behavior of the driver. Such improper driving behavior may include actions by the driver while operating the vehicle 108 that increase the risk of an accident or violate legal rules governing vehicle operation, such as one or more of the following: excessive acceleration, excessive speed, hard braking, sharp turning, rolling stops, tailgating, lane departure, swerving, or approaching too near another vehicle 202 during operation of the vehicle 108. For example, driving more than a threshold level above a speed limit, sharp braking, excessive acceleration, rolling stops, or lateral swerving may be identified as indicative of improper driving behavior. Use of a mobile phone during vehicle operation, hands-free operation in a construction zone or heavy traffic conditions, or similar distractions may also be identified as improper driving behavior. Excessive vehicle operation within a period of time (e.g., driving more than fourteen hours in a day, driving more than eleven consecutive hours without a substantial break, etc.) may also be identified as a driving event indicative of improper vehicle operation. Driving events may be assigned a level of urgency, such that driving events associated with particularly high-risk driving behavior may be indicated as being more urgent than driving events associated with lower-risk driving behavior.

At block 1408, the mobile computing device 110, on-board computer 114, or external computing device 206 may generate one or more notifications, alerts, or reports based upon the determined driving events. Alerts or notifications may be generated in real-time (i.e., while vehicle operation is ongoing) or when a vehicle trip has been completed. Some driving events may trigger alerts or notifications based upon associated urgency levels or types of driving events, while other types or lower-urgency driving events may not trigger alerts or notifications. In some embodiments, a cumulative score may be maintained during vehicle operation, in which case an alert or notification may be triggered when the score exceeds or drops below threshold levels. Such score may include a driver rating, and the threshold levels may vary according to the driver, time, location, or other factors involved. In some embodiments, a report may be generated periodically, upon completion of a vehicle trip, or upon request by a user (such as a vehicle owner). The report may include information regarding vehicle operation, including driving events. In this way, driving events that may not trigger an alert or notification may nonetheless be included in a report regarding vehicle operation by the driver.

At block 1410, the mobile computing device 110, on-board computer 114, or external computing device 206 may transmit the alert, notification, or report to an interested party. The interested party may be a vehicle owner, a fleet manager, an insurer, other shared-vehicle owners/stakeholders, a vehicle rental facility, or other parties with an interest in the vehicle 108. Alerts or notifications may be sent in real-time for some driving events or when cumulative driving behavior becomes unacceptable, as described above. This may include sending SMS text messages, automated phone calls, e-mail messages, or push alerts via an application or program installed upon a mobile device or computing device of the interested party. Similarly, reports may be automatically transmitted to the interested party periodically (e.g., daily, weekly, etc.) or upon occurrence of an event (e.g., at the conclusion of a vehicle trip, upon return of the vehicle 108 to one or more predetermined parking or garaging locations, etc.).

In some embodiments, the interested party may be presented with an option to present immediate feedback to the driver. This may include sending messages or images to be presented to the driver via the mobile computing device 110 or on-board computer. Such messages may be predefined (e.g., "slow down") or may be entered by the interested party. This may also include an option to establish a voice communication connection (such as a mobile telephony connection) with the driver. In some embodiments, the interested party may similarly have an option to provide more general feedback or ratings for drivers based upon a driver report. Such feedback or ratings may be particularly useful in vehicle-sharing or vehicle rental contexts, where future rentals may be accepted or rejected based upon the feedback.

Driver Evaluation and Warnings

In one aspect, systems and methods for facilitating driver evaluations and warnings based upon such driver evaluations may be provided. Such driver evaluations may be solicited or otherwise obtained from other drivers, thereby providing a more complete assessment of the evaluated driver's driving behavior. The systems and methods disclosed herein may further provide for feedback to the evaluated driver to help improve driving behavior. The driver evaluations may be combined with other data relating to a driver or vehicle, from which a driving score or profile may be generated. Driving scores or profiles may then be used to alert other drivers nearby the evaluated driver when the driver poses a significant risk of causing a vehicle accident. In addition to other benefits relating to risk assessment and warnings, the systems and methods disclosed herein may reduce risk by reducing road rage by providing a means of reporting negative driving behavior.

Figure 15:
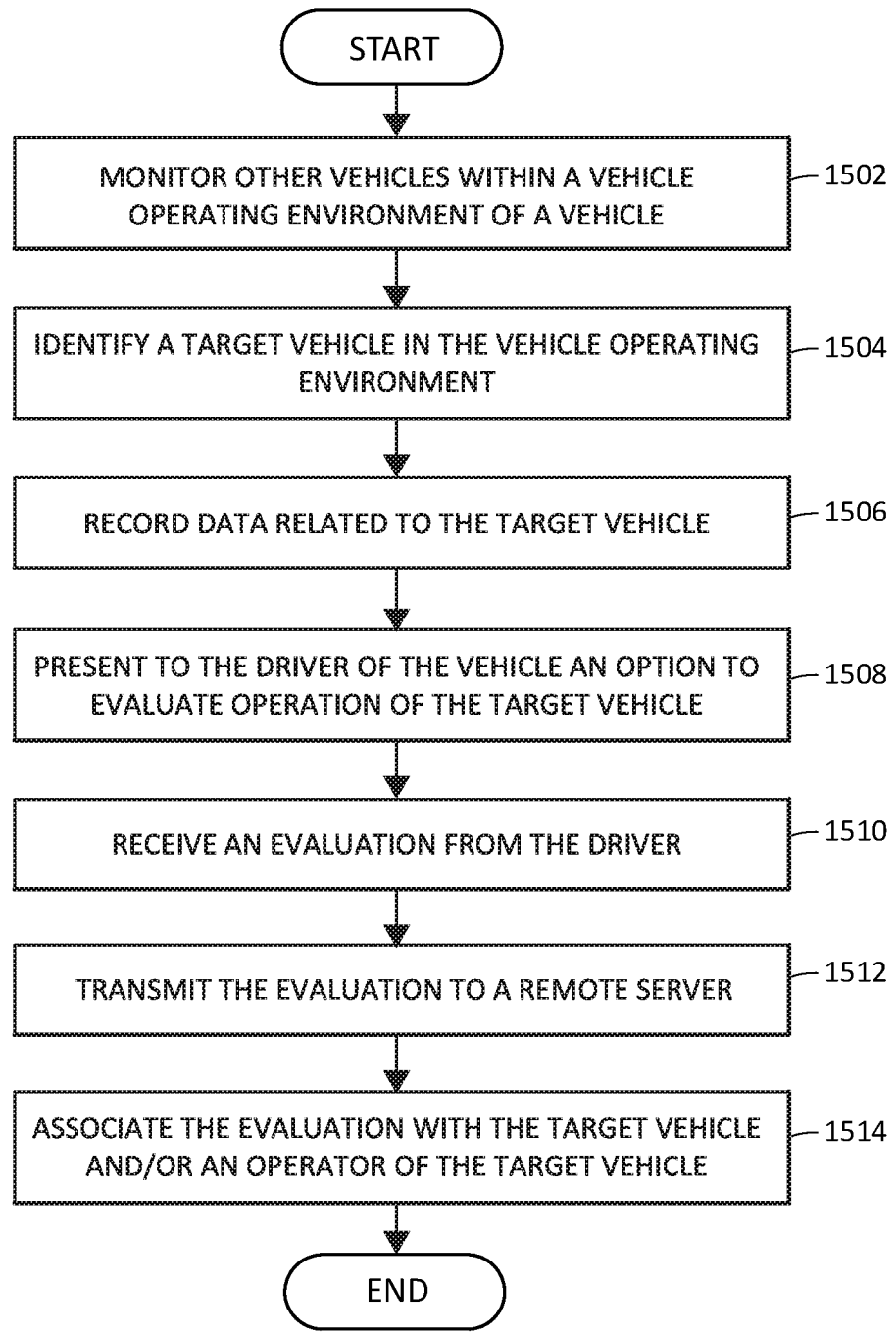
FIG. 15 illustrates a flow diagram of an exemplary driver evaluation method in accordance.

FIG. 15 illustrates a flow diagram of an exemplary driver evaluation method 1500 for facilitating driver evaluation of the operation of other vehicles 202 in the vicinity of the driver of a vehicle 108. The method 1500 may begin with monitoring other vehicles 202 within the vehicle operating environment of the vehicle 108 (block 1502) and identifying a target vehicle 202.1 to evaluate (block 1504). Data related to the operation of the target vehicle 202.1 may be recorded for use in identifying and/or evaluating the target vehicle 202.1 (block 1506). An option to evaluate the target vehicle 202.1 may be presented to the driver of the vehicle 108 (block 1508), and an evaluation may be received from the driver (block 1510). The received evaluation (and, in some embodiments, telematics data regarding operation of the target vehicle 202.1) may be transmitted to a remote server (block 1512), where the evaluation may be associated with the target vehicle 202.1 and/or a vehicle operator of the target vehicle 202.1 (block 1514). The method 1500 may be implemented continuously or at appropriate intervals throughout the duration of vehicle operation to facilitate evaluation of a plurality of target vehicles 202.1, in some embodiments.

At block 1502, the mobile computing device 110 or on-board computer 114 may monitor the operating environment of the vehicle 108 using sensor data from one or more sensors. This may include monitoring the absolute or relative positions and/or movement of a plurality of other vehicles 202 within the operating environment of the vehicle 108. The sensors and sensor data may include any sensors described herein or similar sensors configured to generate or collect telematics data and/or other data regarding an operating environment of a vehicle. In some embodiments, power-saving methods of monitoring the vehicle operating environment may be implemented to limit the power used in environmental monitoring, as described elsewhere herein. In further embodiments, the monitoring may include (or may be limited to using only) sensor data collected for other purposes, such as sensor data collected for vehicle navigation, collision avoidance, autonomous or semi-autonomous operation of the vehicle 108, etc. Thus, the data collected to monitor the vehicle operating environment may be collected from sensors or systems operating to provide warnings to the driver or control some aspects of operation of the vehicle 108 (e.g., collision avoidance systems, adaptive cruise control systems, automatic lane centering systems, etc.). In other embodiments, the mobile computing device 110 or on-board computer 114 may include sensor data collected particularly for use in evaluating other vehicles 202 in the vehicle environment.

At block 1504, the mobile computing device 110 or on-board computer 114 may identify a target vehicle 202.1 from among one or more vehicles 202 within the operating environment of the vehicle 108. The target vehicle 202.1 may be identified based upon a characteristic, condition, action, or movement of the target vehicle 202.1. For example, the target vehicle 202.1 may be identified based upon a proximity to the vehicle 108, such as a near collision within a collision threshold distance. As another example, the target vehicle 202.1 may be identified by another negative driving event, such as swerving between lanes, drifting onto a roadway shoulder, hard braking, or excessive acceleration. As yet another example, the target vehicle 202.1 may be identified based upon an insurance policy associated with the target vehicle 202.1, such as by identifying the vehicle 202.1 (e.g., using an image of a license plate or data received by V2V wireless communication) and matching the target vehicle 202.1 with an insurance policy (e.g., by submitting a query to a database associated with an insurer providing insurance for the vehicle 108 via the network 201 and external computing device 206). In some embodiments, the driver of the vehicle 108 may choose to identify the target vehicle 202.1 by providing an indication of the target vehicle 202.1 via the mobile computing device 110 or on-board computer 114. For example, the driver (or a passenger) of the vehicle 108 may input a command to identify and/or evaluate a nearby vehicle 202 via the mobile computing device 110 or on-board computer 114. One or more nearby vehicles 202 may be presented to the driver for further selection of the target vehicle 202.1, or the mobile computing device 110 or on-board computer 114 may separately identify each nearby vehicle 202.1-N as a target vehicle for evaluation. In some embodiments, a plurality of target vehicles 202.1 may be identified, either sequentially or simultaneously.

At block 1506, the mobile computing device 110 or on-board computer 114 may record sensor data regarding the identified target vehicle 202.1 from one or more sensors. The sensor data may include telematics or other data regarding the operation of the target vehicle 202.1, such as location, movement, path, proximity to other objects (e.g., the vehicle 108, other vehicles 202, or infrastructure components 208), wirelessly transmitted V2V communication data, or similar data regarding the operation of the target vehicle 202.1 within the operating environment of the vehicle 108. The data may be recorded as received from the sensors (e.g., full video from a camera, distance from the target vehicle 202.1, etc.), in a processed form (e.g., determined speed or momentum of the target vehicle 202.1), or in a summary form (e.g., images or times associated with changes in direction or speed of the vehicle 202.1). In some embodiments, the recorded data may be stored locally in a storage medium of the mobile computing device 110 or on-board computer 114, or some or all of the recorded data may be transmitted to an external computing device 206 via the network 201 in other embodiments. In further embodiments, the recorded sensor data may be obtained from one or more sensors disposed within the target vehicle 202.1, such as GPS units or accelerometer arrays.

At block 1508, the mobile computing device 110 or on-board computer 114 may present an option to evaluate the operation of the target vehicle 202.1 to the driver of the vehicle 108 or to a passenger of the vehicle 108. The option to evaluate the operation of the target vehicle 202.1 may be presented immediately upon identification of the target vehicle 202.1, at a later point during operation of the vehicle 108, or after operation of the vehicle 108 (i.e., after completion of the current vehicle trip). The option to perform an evaluation may be delayed until the conditions exist for safe evaluation by the driver, such as when the vehicle 108 has been parked and shut down. In some embodiments, the option may be presented to the driver via an e-mail, text message, or push notification from a Telematics App presented via the mobile computing device 110 or another computing device associated with the driver. In further embodiments, the option may be presented in a Telematics App when activated by the driver. The option to evaluate the operation of the target vehicle 202.1 may include one or more evaluation options indicating the driver's evaluation of the operation of the target vehicle 202.1. For example, the driver may be presented a set of evaluation options numbered one through five, indicating a scale of quality of operation. As another example, the driver may be presented a set of two evaluation options, one indicating proper vehicle operation and one indicating improper or unsafe vehicle operation. The option to evaluate the operation of the target vehicle 202.1 may further include one or more evaluation options associated with actions of the target vehicle 202.1 determined from the recorded data. For example, the recorded data may include a lane change of the target vehicle 202.1, which may be identified and presented to the driver of the vehicle 108 for evaluation.

At block 1510, the driver or other user of the mobile computing device 110, on-board computer 114, or other computing device may enter an evaluation of the operation of the target vehicle 202.1. The evaluation received by the mobile computing device 110, on-board computer 114, or other computing device may include one or more indications of aspects of operation of the target vehicle 202.1. Additionally, some embodiments may permit the vehicle operator to enter or record a free-form description of the operation (e.g., "he cut me off," "they nearly ran us off the road," "they let me merge onto the highway," etc.). Some embodiments may permit the driver to record a spoken description of the evaluation, such as when the evaluation occurs during ongoing operation of the vehicle 108. In some embodiments, an incentive may be offered to the driver of the vehicle 108 to encourage entering an evaluation of the target vehicle 202.1, such as a credit or discount on an insurance policy associated with the vehicle 108 or the driver of the vehicle 108.

At block 1512, the received evaluation may be transmitted to an external computing device 206 (such as a remote server) via the network 201. The external computing device 206 may be associated with an insurer or third-party driving evaluation system. The evaluation may be transmitted immediately or transmitted at a later time, such as when the vehicle trip is complete. In some embodiments, the recorded sensor data (or a summary thereof) may also be transmitted together with the evaluation or may be separately transmitted. In further embodiments, the evaluation or an indication of the general assessment contained in the evaluation (e.g., positive evaluation, negative evaluation, etc.) may be transmitted directly or via a remote server to the target vehicle 202.1 to provide feedback regarding vehicle operation. For example, an alert may be sent to a transceiver of the vehicle 202.1 indicating a negative evaluation has been received, which may include an indication of a cause of the negative evaluation (e.g., failure to signal a lane change, excessive lane changing, etc.). Such evaluations may be transmitted anonymously or may be associated with the evaluating vehicle 108, driver of the vehicle 108, or other person performing the evaluation. In some embodiments, the evaluation or a warning based upon the evaluation may be transmitted to other vehicles 202 within the operating environment of the vehicle 108 to alert other drivers to poor driving behavior by the driver of the target vehicle 202.1.

At block 1514, the evaluation may be associated with the target vehicle 202.1 and/or with a driver of the target vehicle 202.1. This may include determining the current operator of the target vehicle 202.1 or determining an owner, insured driver, or other person associated with the target vehicle 202.1. The evaluation may be associated with the target vehicle 202.1 and/or a driver thereof by adding the vehicle operation evaluation to a database with an indication of such association. Alternatively, the evaluation may be used to update a profile or score associated with the target vehicle 202.1 and/or a driver thereof, such as by adjusting a weighted score or adjusting a level included within the profile. In further embodiments, the evaluation or profile may be used to warn other drivers and/or to determine or adjust an insurance policy. For example, an insurance policy associated with the target vehicle 202.1 or the evaluated driver thereof may be revised based upon evaluations by other drivers (e.g., a discount may be received for numerous positive evaluations or a discount may be rescinded for numerous negative evaluations by other drivers). Such revisions may include changes to risk ratings, coverage amounts, coverage options, deductibles, premiums, discounts, surcharges, or other aspects of the insurance policy. Such changes may be implemented immediately or upon renewal of the insurance policy.

Figure 16:
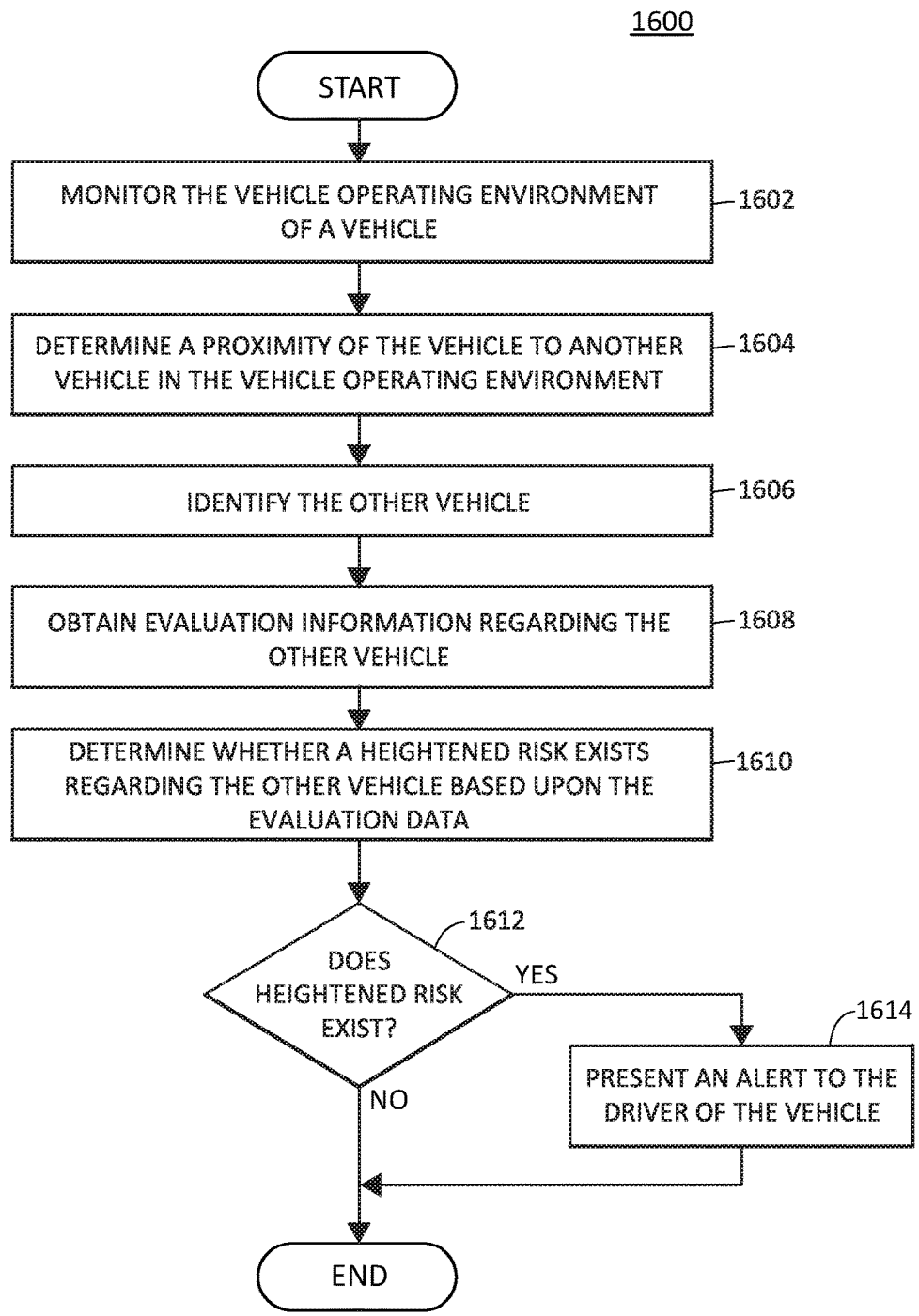
FIG. 16 illustrates a flow diagram of an exemplary vehicle alert method.

FIG. 16 illustrates a flow diagram of an exemplary vehicle alert method 1600 for warning drivers of proximity to other vehicles 202 associated with negative evaluations. The method 1600 may begin by monitoring the vehicle operating environment of a vehicle 108 (block 1602). When the vehicle 108 is determined to be in proximity to another vehicle 202 (block 1604), the other vehicle 202 may be identified (block 1606), and evaluation data associated with the other vehicle 202 may be obtained (block 1608). The evaluation data may be used to determine whether the other vehicle 202 is associated with a heightened risk due to negative evaluations (block 1610). When the other vehicle 202 is determined to pose a heightened risk (block 1612), an alert may be presented to the driver of the vehicle 108 to warn the driver to use caution when driving near the other vehicle 202 (block 1614). In some embodiments, the vehicle 108 may further transmit a warning or the evaluation information to other nearby vehicles. The method 1600 may be implemented continuously or at appropriate intervals throughout the duration of vehicle operation to provide warnings regarding other vehicles 202 through a vehicle trip of the vehicle 108.

At block 1602, the mobile computing device 110 or on-board computer 114 may monitor the operating environment of the vehicle 108 using data from one or more sensors. The sensors may include transceivers configured to receive wireless V2V communication from other vehicles 202 or from smart infrastructure 208 in the vehicle operating environment. For example, V2V data may be wirelessly received by the vehicle 108 indicating the presence and/or identity of nearby vehicles 202. Other sensors may include still image or video cameras, GPS units, or other sensors discussed elsewhere herein. As discussed above with respect to block 1502, monitoring the vehicle operating environment may include the power-saving methods described elsewhere herein, may include (or may be limited to using only) sensor data collected for other purposes, or may include sensor data collected primarily (or solely) for use in providing warnings regarding other vehicles 202.

At block 1604, the mobile computing device 110 or on-board computer 114 may determine another vehicle 202 is within proximity of the vehicle 108. Determining another vehicle 202 is proximal to the vehicle 108 may include determining that another vehicle 202 is operating within a monitoring distance threshold of the vehicle 108, which monitoring distance threshold may depend upon the operating conditions (e.g., limited access highway, residential street, heavy traffic, low traffic, clear weather, icy road conditions, etc.). In some embodiments, the proximity determination may include determining whether the vehicles 108 and 202 are approaching or separating, or it may include determining whether the vehicles 108 and 202 are on the same or intersecting roadways. For example, a nearby vehicle 202 on a surface street that does not intersect with a limited access highway on which the vehicle 108 is traveling may be disregarded regardless of straight-line distance between the vehicles. In further embodiments, projected vehicle paths may be used to determine whether a vehicle 202 is operating within proximity to the vehicle 108.

At block 1606, the mobile computing device 110 or on-board computer 114 may identify the vehicle 202 operating in proximity to the vehicle 108. This may be accomplished using the sensor data received from the one or more sensors at block 1602 or may be accomplished using additional data. For example, V2V data including a vehicle identifier may be received from a transceiver of the vehicle 202. As an alternative example, a vehicle tag or license plate may be captured via a camera communicatively connected to the mobile computing device 110 or on-board computer 114, which may be processed to identify the vehicle 202. Other methods of vehicle identification as described elsewhere herein may also be used.

At block 1608, the mobile computing device 110 or on-board computer 114 obtains evaluation data regarding the identified vehicle 202. The evaluation data may be received from an external computing device 206 via the network 201 in response to a request from the mobile computing device 110 or on-board computer 114. The external computing device 206 may be a remote server associated with an insurer of the vehicle 108 or the vehicle 202, or it may be a remote server associated with a third-party driver evaluation or rating agency. The evaluation data may instead be received directly from the vehicle 202, such as via wireless V2V communication. As yet another alternative, the evaluation data may be stored in a local database stored in a memory device associated with the mobile computing device 110 or on-board computer 114, which may be updated periodically to include evaluation data regarding a plurality of vehicles operating in the geographic area in which the vehicle 108 is usually or currently operating. The evaluation data may be associated with the identified vehicle 202 or a driver of the identified vehicle 202, as described above. The evaluation data may include scores, profiles, or other indications of risk associated with operation of the vehicle 202, such as those types of evaluation data described above. In some embodiments, the evaluation data may include a risk level associated with the operation of the identified vehicle 202 (generally, or by a particular driver), which may be specific to the operating conditions of the vehicle environment (e.g., weather, traffic, road type, time of day, etc.). In some embodiments, the evaluation data may be received from a third vehicle operating within the same environment as the vehicle 108 and the identified vehicle 202, such as from another vehicle that has identified the vehicle 202 and obtained associated evaluation data.

At block 1610, the mobile computing device 110 or on-board computer 114 may determine whether the vehicle 202 is associated with heightened risk levels based upon the received evaluation data. In some embodiments, this may include determining a risk level or score within a received profile that corresponds to the current conditions within the operating environment (e.g., weather, traffic, road integrity, etc.). Determining whether there is a heightened risk level associated with the vehicle 202 may further include determining whether the evaluation data indicate that operation of the vehicle 202 in the current conditions (or by the current driver, if identified) is associated with a risk level that is above an alert threshold. Such alert threshold may be dependent upon conditions in the operating environment, or it may be determined relative to other vehicles in the operating environment (e.g., a risk level one standard deviation above the norm for vehicles operating in the geographic area of the vehicle 108). In some embodiments, the vehicle 202 may be determined to be associated with a heightened risk when the received evaluation data indicates that the vehicle 202 (or driver thereof) has received more than a threshold number of negative evaluations or has an evaluation score below a lower threshold. Such metrics may indicate that the vehicle 202 is typically operated in an improper manner or in a manner that results in increased risk to nearby vehicles.

In some embodiments, an external computing device 206 may monitor the locations of the vehicle 108 and other vehicles 202 using GPS or similar data. For example, a remote server associated with an insurer or third-party warning system may monitor a plurality of vehicles in a geographic area. The external computing device 206 may identify each vehicle and associate a driving evaluation score or profile with each vehicle. Based upon such scores or profiles, the external computing device 206 may determine that one or more vehicles 202 are associated with increased risks to other nearby vehicles 108, so the external computing device 206 may transmit indications of such risk to the vehicles 108 to cause alerts to be presented to the drivers of those vehicles.

At block 1612, the mobile computing device 110 or on-board computer 114 may determine whether it has been determined that the identified vehicle 202 is associated with a heightened risk based upon evaluation data. When the identified vehicle 202 has been determined to be associated with a heightened risk, the mobile computing device 110 or on-board computer 114 may generate and present a warning to the driver of the vehicle 108 (block 1614). This may include a visual, audible, or haptic alert, which may include information identifying the particular vehicle 202. The alert presented to the driver of the vehicle 108 may include information identifying the identified vehicle 202 in a manner easily understandable by the driver, such as by relative position (e.g., ahead fifty feet in the right lane), description of the vehicle 202 (e.g., blue sedan, red truck, etc.). In some embodiments, additional information regarding the identified vehicle 202 may be presented, such as a warning level (e.g., low, moderate, or high) or type of behavior typically associated with such vehicle 202 (e.g., aggressive driving, lane departures, distracted driving, etc.). Such information may then be used by the driver of vehicle 108 (or an autonomous operation feature controlling part or all of the operation of the vehicle 108) to adjust operation to limit exposure to the increased risk. Such actions may include rerouting the path of the vehicle 108 around one or more vehicles 202 associated with heightened risk. For example, a navigation system may generate an alternative route if the previously determined route for the vehicle 108 will intersect with a sufficient number of high-risk vehicles, similar to the way such navigation system may route around anticipated heavy traffic areas (as described elsewhere herein). When the warning has been presented or other action has been taken, the method 1600 may terminate. When the identified vehicle 202 has been determined not to be associated with a sufficiently heightened risk, the method 1600 may also terminate. In either case, the method 1600 may restart at block 1602 until the vehicle 108 has completed a vehicle trip.

Pedestrian and Cyclist Warnings

In one aspect, systems and methods for warning drivers or passengers of nearby pedestrians and/or cyclists may be provided. Such systems and methods may monitor the environment near a vehicle to identify pedestrians or cyclists that may be approaching the vehicle or that the vehicle may be approaching. This may be particularly advantageous in warning drivers or passengers not to open doors when bicyclists are approaching at high speed from behind a parked vehicle.

Figure 17:
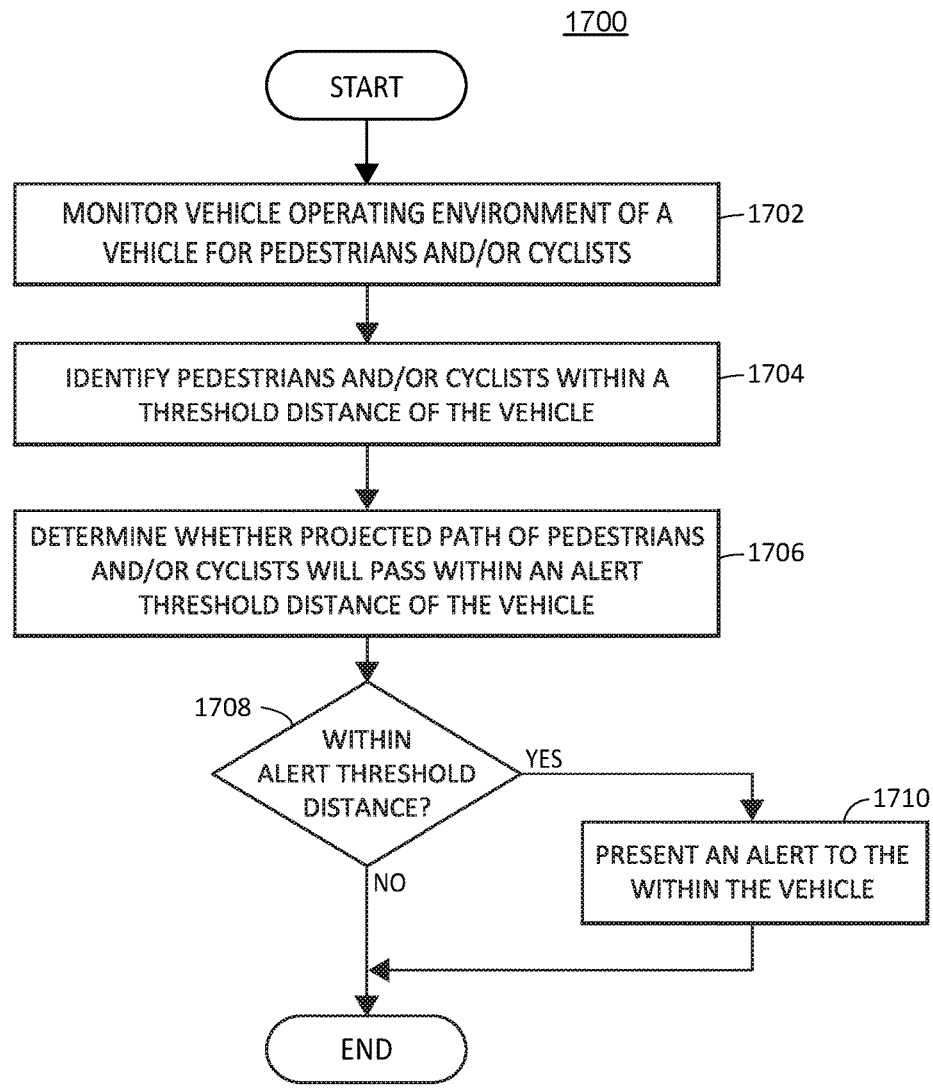
FIG. 17 illustrates a flow diagram of an exemplary pedestrian warning method.

FIG. 17 illustrates a flow diagram of an exemplary pedestrian warning method 1700 for alerting drivers to the presence of pedestrians or cyclists near a vehicle 108. The method 1700 may begin by monitoring the vehicle operating environment of the vehicle 108 for indications of the presence of pedestrians and/or cyclists (block 1702). Sensor data or other data may be used to identify one or more pedestrians and/or cyclists within a threshold distance of the vehicle 108 (block 1704). Additionally, paths of the pedestrians and/or cyclists may be projected to determine whether any of the pedestrians or cyclists will pass within an alert threshold distance of the vehicle 108 (block 1706). When it is determined that at least one pedestrian or cyclist will pass within the alert threshold distance of the vehicle 108 (block 1708), an alert may be presented to the driver of the vehicle 108 to warn the driver of the presence of pedestrians and/or cyclists (block 1710).

At block 1702, a mobile computing device 110 or on-board computer 114 may monitor the environment around the vehicle 108 for indications of pedestrians, cyclists, or other objects moving within the vehicle operating environment (e.g., wild or domestic animals). The mobile computing device 110 or on-board computer 114 may monitor the environment using sensor data received from one or more sensors communicatively connected thereto, including any of the sensor or types of sensor data described elsewhere herein. In some embodiments, the mobile computing device 110 or on-board computer 114 may monitor the vehicle environment based upon electronic signals received from devices carried on or about the pedestrians or cyclists (e.g., mobile phones, wearable devices, fitness trackers, signal generators, etc.). Such signals may be directly or indirectly received by the mobile computing device 110 or on-board computer 114. For example, a smartphone carried by a pedestrian may transmit a GPS location to a remote server (i.e., external computing device 206) via network 201, and the mobile computing device 110 within the vehicle 108 may receive the GPS location of the pedestrian from the remote server via the network 201. As an alternative example, a smartphone carried by another pedestrian may transmit a Bluetooth signal that may be directly detected by the mobile computing device 110.

At block 1704, the mobile computing device 110 or on-board computer 114 may identify one or more pedestrians, cyclists, or other objects moving within the vehicle environment based upon the data collected. This may include identifying the pedestrians, cyclists, or other objects are within a threshold distance of the vehicle 108, which threshold distance may depend upon the speed at which the vehicle 108 is traveling. In some embodiments, only pedestrians or cyclists within the threshold distance in front of the vehicle 108 (i.e., within the threshold distance in the direction of vehicle travel) may be identified. In other embodiments, pedestrians or cyclists behind the vehicle 108 may be identified if they are moving faster than the speed of the vehicle. In instances in which the vehicle 108 is stopped, all pedestrians or cyclists within the threshold distance may be identified. In alternative instances in which the vehicle 108 is stopped, only cyclists or pedestrians approaching the vehicle 108 faster than a minimum speed threshold may be identified. For example, slowly walking pedestrians may not be identified because they do not present a significant risk, but a fast-moving bicyclist may be identified because a significant risk of an accident may exist.

At block 1706, the mobile computing device 110 or on-board computer 114 may determine whether the path of any of the identified pedestrians, cyclists, or other objects moving within the vehicle environment will pass within an alert threshold distance of the vehicle 108. This may include determining an expected path of the vehicle 108, as well as projected paths of one or more identified pedestrians or cyclists. The alert threshold distance may depend upon the speed of the vehicle 108 and/or the speed of the pedestrian or cyclist. In some embodiments, the alert threshold distance may approximate a distance a door of the vehicle 108 typically opens. For example, a stopped vehicle 108 may have an alert threshold distance of one meter to approximate the distance a door of the vehicle 108 may open (thereby creating a risk of a collision with a pedestrian or cyclist passing near the vehicle 108). In some embodiments, the direction in which the pedestrian, cyclist, or other object may pass the vehicle 108 may be used to determine whether an alert should be generated. In further embodiments, the mobile computing device 110 or on-board computer 114 may determine only those identified pedestrians, cyclists, or other objects that are expected to pass within the alert threshold distance of the vehicle 108 while within a roadway. Thus, pedestrians walking on a sidewalk may not be determined to be within the alert threshold distance for purposes of warning the driver, but pedestrians within a crosswalk may be determined to be within the alert threshold distance.

At block 1708, the mobile computing device 110 or on-board computer 114 may determine whether at least one pedestrian, cyclist, or other object has been determined to be expected to pass within the alert threshold distance of the vehicle 108 (and meet any further criteria applied). When at least one such pedestrian, cyclist, or other object has been determined to be present, at block 1710 the mobile computing device 110 or on-board computer 114 may generate and present an alert to the driver and/or passengers of the vehicle 108. The alert may be audible, visual, haptic, or a combination of such alert types. In some embodiments, the alert may indicate a direction of the pedestrian, cyclist, or other object about which the driver and/or passengers are being warned. This may include an indication of a direction and/or distance. If no such pedestrians, cyclists, or other objects have been determined to be present in the vehicle operating environment, the method 1700 may terminate or may continue to monitor the vehicle operating environment at block 1702. In some embodiments, the method 1700 may continuously operate until the vehicle 108 has been parked and all passengers therein have left the vehicle 108.

Discounts & Risk Profile Based Upon Travel Environment

In one aspect, a computer system configured to generate a vehicle or driver risk profile may be provided. The computer system including one or more processors, sensors, and transceivers configured to: (1) receive, via wireless communication or data transmission over one or more radio links, telematics and sensor data from a vehicle or a mobile device of an insured; (2) determine an average travel environment that the vehicle travels in from processor analysis of the telematics and sensor data, the average travel environment accounting for an average amount of pedestrian traffic and an average amount of vehicle traffic that the vehicle typically travels in; (3) use the average travel environment to build or model a risk profile for the insured or vehicle; (4) generate or update an auto insurance discount or a usage-based auto insurance premium based upon their risk profile; and/or (5) transmit, via wireless communication or data transmission over one or more radio links, the auto insurance discount or the usage-based auto insurance premium to the insured's vehicle or mobile device for display to facilitate the insured's review and approval such that insurance discounts are provided based upon a risk associated with the average travel environment that an insured vehicle or insured typically travels within. The system may include additional, less, or alternate functionality, including that discussed elsewhere herein.

For instance, determining an average travel environment that the vehicle travels in from processor analysis of the telematics and sensor data may include inputting the telematics and sensor data into a trained machine learning program that determines an average travel environment, the average travel environment including or identifying (i) a level of pedestrian traffic, and (ii) a level of vehicle traffic that the vehicle typically travels in. The sensor data may be collected or generated by one or more vehicle-mounted and front facing sensors, including one or more of: a camera, video recording, infrared device, radar unit, or other sensors mentioned herein. The telematics and sensor data indicates or includes information detailing (i) an amount of pedestrian traffic, and/or (ii) the types of streets that the vehicle travels through on a daily or weekly basis, and the risk averse profile reflects the amount of pedestrian traffic and/or types of streets. Each specific street (such as by name), or each type of street may include a risk or safety rating, or a risk or safety rating for a given time of day or year—such as different rating from daylight or nighttime, or rush hour, or for winter (snow buildup) vs. summer.

The telematics or other data may indicate or include information detailing (i) an amount of vehicle traffic, and/or (ii) the types of roads that the vehicle travels through or in on a daily or weekly basis, and the risk averse profile reflects the amount of vehicle traffic and/or types of roads. The telematics or other data may be collected over one or more vehicle trips or days, and may indicate or include vehicle speed or average speed. The telematics and sensor data may indicate a number of intersection or smart street lights or infrastructure components that the vehicle travels through during a daily commute. The telematics and sensor data may include data originally generated or collected by smart infrastructure or other vehicles. The usage-based insurance may be priced per miles traveled or by period of time.

In some embodiments, the telematics and/or sensor data may be input into a machine learning program that has been trained to determine an average travel environment that the vehicle travels in from processor analysis of the telematics and sensor data. The machine learning program may account for (i) an average amount of pedestrian traffic, and (ii) an average amount of vehicle traffic that the vehicle typically travels in when generating, building, or modeling the average travel environment for the vehicle. Additionally or alternatively, the telematics and/or sensor data, and/or the average travel environment determined may be input into another machine learning program to build or model a risk profile for (a) the insured, and/or (b) the vehicle.

In another aspect, a computer-implemented method of generating risk profiles for vehicles may be provided. The method may include (1) receiving, by one or more processors or associated transceivers via wireless communication or data transmission over one or more radio links, telematics and sensor data from a vehicle or a mobile device of an insured; (2) determining, via the one or more processors, an average travel environment that the vehicle travels in from processor analysis of the telematics and sensor data, the average travel environment accounting for an average amount of pedestrian traffic and an average amount of vehicle traffic that the vehicle typically travels in; (3) using, via the one or more processors, the average travel environment to build a risk profile for the insured or vehicle; (4) generating or updating, via the one or more processors, an auto insurance discount or a usage-based auto insurance premium based upon their risk profile; and/or (5) transmitting, via the one or more processors or associated transceivers via wireless communication or data transmission over one or more radio links, the auto insurance discount or the usage-based auto insurance premium to the insured's vehicle or mobile device for display to facilitate the insured's review and approval such that insurance discounts are provided based upon a risk associated with the average travel environment that an insured vehicle or insured typically travels within.

Determining, via the one or more processors, an average travel environment that the vehicle travels in from processor analysis of the telematics and sensor data may include inputting the telematics and sensor data into a trained machine learning program that determines an average travel environment that includes, characterizes, or otherwise identifies (i) a level of pedestrian traffic, and (ii) a level of vehicle traffic that the vehicle typically travels in. The method may include additional, less, or alternate actions, including those discussed elsewhere herein, and may be implemented via one or more local or remote processors, sensors, and transceivers executing computer-readable instructions stored on non-transitory computer-readable medium or media.

Vehicle Collision Cause Determination & Reconstruction

In one aspect, a computer system configured to determine causes of vehicle collisions and reconstruct collisions may be provided. The computer system may include one or more processors, sensors, or transceivers configured to: (1) receive, via wireless communication or data transmission over one or more radio frequency links, smart traffic light data from a smart traffic light transceiver, the smart traffic light data including time-stamped data associated with when the traffic light was red, green, and yellow before, during, and/or after a vehicle collision; (2) receive, via wireless communication or data transmission over one or more radio frequency links, vehicle or mobile device time-stamped GPS (Global Positioning System) and speed data from a vehicle or mobile device transceiver acquired before, during, and/or after the vehicle collision; (3) compare the time-stamped smart traffic light data with the time-stamped GPS and speed data to determine if the vehicle or another vehicle was a cause of the vehicle collision occurring at an intersection associated with the smart traffic light; and/or (4) update an insurance policy premium or discount based upon which vehicle caused the vehicle accident to facilitate not penalizing not-at-fault drivers and generating insurance premiums or discounts more reflective of actual risk, or lack thereof, associated with certain types of vehicles and/or risk averse drivers. The system may include additional, less, or alternate functionality, including that discussed elsewhere herein.

For instance, the one or more processors may be further configured to generate a virtual reconstruction of the vehicle collision that includes a graphical representation of the traffic light changing. The one or more vehicles involved in the vehicle collision may be autonomous or semi-autonomous vehicles. The one or more processors may be further configured to generate a virtual reconstruction of the vehicle collision which includes a time-lapsed graphical representation of the speed and location of the vehicle and depicts the traffic light changing.

The one or more processors or transceivers may be further configured to receive telematics and sensor data indicating time-stamped actions taken by the vehicle or driver, and compare the time-stamped actions taken by the vehicle or driver with the time-stamped smart traffic light data to determine fault, or lack thereof, for the vehicle collision. The one or more processors may be further configured to generate a virtual reconstruction of the vehicle accident which includes a time-lapsed graphical representation of the speed and location of the vehicle that is based upon the telematics and sensor data received from the vehicle, and visually depicts the traffic light changing. The sensor data may be collected or generated by one or more vehicle-mounted and front facing sensors, including one or more of: a camera, video recording, infrared device, or radar unit. The telematics data may include acceleration, speed, braking, and cornering information.

The one or more processors may further compare the time-stamped smart traffic light data with the time-stamped GPS and speed data to (i) determine if the vehicle was traveling in accordance with the color of the smart traffic light at a time that a vehicle collision occurred at an intersection associated with the smart traffic light, or (ii) otherwise determine that the vehicle or driver did not cause the vehicle collision. The time-stamped smart traffic light data, and telematics and sensor data received from the vehicle may be input into a machine learning program that is trained to (i) determine if the vehicle was traveling in accordance with the color of the smart traffic light at a time that a vehicle collision occurred at an intersection associated with the smart traffic light, or (ii) otherwise determine that the vehicle or driver did not cause the vehicle collision.

In another aspect, a computer-implemented method of vehicle collision cause determination and vehicle collision reconstruction may be provided. The method may include (1) receiving, at or by one or more processors or associated transceivers via wireless communication or data transmission over one or more radio frequency links, smart traffic light data from a smart traffic light transceiver, the smart traffic light data including time-stamped data associated with when the traffic light was red, green, and yellow before, during, and/or after a vehicle collision; (2) receiving, at or by the one or more processors or associated transceivers via wireless communication or data transmission over one or more radio frequency links, vehicle or mobile device time-stamped GPS (Global Positioning System) and speed data from a vehicle or mobile device transceiver acquired before, during, and/or after the vehicle collision; (3) comparing, via the one or more processors, the time-stamped smart traffic light data with the time-stamped GPS and speed data to determine if the vehicle or another vehicle was a cause of the vehicle collision occurring at an intersection associated with the smart traffic light; and/or (4) updating, via the one or more processors, an insurance policy premium or discount based upon which vehicle caused the vehicle accident to facilitate not penalizing not-at-fault drivers and generating insurance premiums or discounts more reflective of actual risk, or lack thereof, associated with certain types of vehicles and/or risk averse drivers.

The method may include additional, less, or alternate actions, including those discussed elsewhere herein, and may be implemented via one or more local or remote processors, sensors, and transceivers executing computer-readable instructions stored on non-transitory computer-readable medium or media. For instance, the method may include comparing, via the one or more processors, the time-stamped smart traffic light data with the time-stamped GPS and speed data to (i) determine if the vehicle was traveling in accordance with the color of the smart traffic light at a time that a vehicle collision occurred at an intersection associated with the smart traffic light, or (ii) otherwise determine that the vehicle or driver did not cause the vehicle collision. The method may include inputting the time-stamped smart traffic light data, and telematics and sensor data received from the vehicle into a machine learning program that is trained to (i) determine if the vehicle was traveling in accordance with the color of the smart traffic light at a time that a vehicle collision occurred at an intersection associated with the smart traffic light, or (ii) otherwise determine that the vehicle or driver did not cause the vehicle collision.

Electric Vehicle Battery Conservation

In one aspect, a computer system configured to perform accident reconstruction for an electric or battery-powered vehicle, the computer system comprising one or more vehicle-mounted processors, sensors, and transceivers mounted on an electric vehicle, the one or more processors, sensors, and transceivers configured to: (1) receive or determine an indication of a trigger event from computer analysis of telematics or sensor data gathered by one or more sensors; (2) turn on a front-facing camera or video camera mounted on the vehicle, the front-facing camera or video camera configured to acquire or take images in front of, or to the side of, a moving vehicle; and/or (3) transmit, via wireless communication or data transmission, the image data associated with the images acquired after the trigger event is detected to a remote server for computer analysis of the image data to facilitate not only accident reconstruction and cause of loss determination, but to also facilitate conserving a battery powering an electric vehicle and only turning on a camera or video camera immediately prior to an anticipated or actual vehicle collision. The system may include additional, less, or alternate functionality, including that discussed elsewhere herein.

The trigger event may be the one or more processors or sensors detecting vehicle speed unexpectedly or rapidly decreasing; detecting the vehicle following distance unexpectedly or rapidly decreasing; detecting a brake pedal being engaged or otherwise triggered by brake system pressure or force applied to the brakes being determined to be above a predetermined threshold; detecting vehicle deceleration above a predetermined threshold; detecting vehicle cornering to be above a predetermined threshold, or detecting that vehicle unexpectedly swerved given vehicle GPS location or direction of the road; detecting an animal in the vicinity of the vehicle; and/or other events. For instance, the trigger event may be an infrared camera or radar unit detecting an animal in the vicinity of the vehicle, or the automatic deployment of a vehicle collision avoidance system or feature, or the detection of that automatic deployment.

The one or more processors may be configured to receive or generate telematics and sensor data from vehicle-mounted sensors, and input the telematics and sensor data into a machine learning program that is trained to identify a trigger event potentially associated with, or associated with, a vehicle collision, or trigger event that indicates an anomalous condition or a high risk of vehicle collision.

In another aspect, a computer-implemented method of vehicle collision cause determination and/or reconstruction for an electric or battery-powered vehicle may be provided. The method may include (1) receiving or determining, via one or more processors, an indication of a trigger event; (2) turning on, via the one or more processors, a front-facing camera or video camera mounted on the vehicle, the front-facing camera or video camera configured to acquire or take images in front of, or to the side of, a moving vehicle; and/or (3) transmitting, via the one or more processors or an associated transceiver, the image data associated with the images acquired after the trigger event is detected to a remote server for computer analysis of the image data to facilitate not only accident reconstruction, but to also facilitate conserving a battery powering an electric vehicle and only turning on a video camera immediately prior to an anticipated or actual vehicle collision.

The method may include additional, less, or alternate actions, including those discussed elsewhere herein, and may be implemented via one or more local or remote processors, sensors, and transceivers executing computer-readable instructions stored on non-transitory computer-readable medium or media. For instance, the one or more processors may be configured to receive or generate telematics and sensor data from vehicle-mounted sensors, and the method may include inputting the telematics and sensor data into a machine learning program that is trained to identify a trigger event potentially associated with, or associated with, a vehicle collision, or a trigger event that indicates an anomalous condition or a high risk of vehicle collision.

Generating Vehicle-Usage Profile to Provide Discounts

In one aspect, a computer system configured to generate a driving score for individuals and build vehicle-usage profiles may be provided. The computer system may include one or more processors, sensors, or transceivers configured to: (1) detect or determine which individual within a household is driving a vehicle or sitting in the driver's seat at the outset of a vehicle trip by analyzing sensor data from one or more vehicle-mounted sensors; (2) collect telematics data for that vehicle trip; (3) assign or associate the telematics data for that vehicle trip to the individual within the household that was identified as the driver during the vehicle trip; (4) determine a driving score for the individual and vehicle trip based upon the one or more processors analyzing the telematics data for the vehicle trip; (5) update or build a vehicle-usage profile for the vehicle based upon the telematics data for the vehicle trip or the driving score, the vehicle-usage profile indicating how much and what time of day each member of a household typically drives or uses the vehicle, and accounting for driving behavior of each driver within the household; and/or (6) update an auto insurance premium or discount for the household or the vehicle based upon the vehicle-usage profile to provide insurance cost savings to lower risk households and/or risk averse drivers. The computer system may include additional, less, or alternate functionality, including that discussed elsewhere herein.

For instance, the one or more processors may be further configured to transmit via wireless communication or data transmission over one or more radio frequency links, using a transceiver, the updated auto insurance discount to the insured's mobile device for their review and/or approval. The one or more processors and sensors may be local to vehicle, such as mounted within a mobile device, and/or mounted on or within the vehicle or a vehicle controller. The one or more processors may be remote to the vehicle, such as a remote located server associated with an insurance provider. The insurance premium may be associated with usage-based auto insurance.

The sensor data may be input into a machine learning program trained to detect or determine which individual within a household is driving a vehicle or sitting in the driver's seat at the outset of a vehicle trip from the sensor data. The sensor data may include data from weight, seat, or pressure sensors, image data from one or more cameras, or voice data of the driver that is captured or generated by one or more vehicle-mounted sensors.

The one or more processors may detect or determine which individual within a household is driving a vehicle or is positioned to drive the vehicle (i.e., sitting in the driver's seat) at the outset of a vehicle trip by analyzing sensor data from one or more vehicle-mounted sensors includes the driver being authenticated by one or more of the following: PIN, voice recognition, facial scan, finger print scan, retina scan, authenticated key fob, and/or presence and/or identification of a mobile device (e.g., smart phone, smart watch, or wearable electronics). The telematics data may be input into a trained machine learning program to determine a driving score for (i) the individual, and (ii) the vehicle trip. The telematics data may be input into a trained machine learning program to update or build a vehicle-usage profile for the vehicle that indicates how much and what time of day each member of a household typically drives or uses the vehicle, and accounts for driving behavior of each driver within the household.

In another aspect, a computer-implemented method of generating a vehicle-usage profile may be provided. The method may include (1) detecting or determining, via one or more processors or sensors, which individual within a household is driving a vehicle or sitting in the driver's seat at the outset of a vehicle trip by analyzing sensor data from one or more vehicle-mounted sensors; (2) collecting, via the one or more processors or sensors, telematics data for that vehicle trip; (3) assigning, via the one or more processors, the telematics data for that vehicle trip to the individual within the household that was identified as the driver during the vehicle trip; (4) determining, via the one or more processors, a driving score for the individual and vehicle trip based upon the one or more processors analyzing the telematics data for the vehicle trip; (5) updating or building, via the one or more processors, a vehicle-usage profile for the vehicle based upon the telematics data for the vehicle trip or the driving score, the vehicle-usage profile indicating how much and what time of day each member of a household typically drives or uses the vehicle, and accounting for driving behavior of each driver within the household; and/or (6) updating, via the one or more processors, an auto insurance premium or discount for the household or the vehicle based upon the vehicle-usage profile to provide insurance cost savings to lower risk households and/or risk averse drivers.

The method may include inputting the telematics data into a trained machine learning program to determine a driving score for (i) the individual, and (ii) the vehicle trip. The method may include inputting the telematics data into a trained machine learning program to update or build a vehicle-usage profile for the vehicle, the vehicle-usage profiling indicating how much and what time of day each member of a household drives or otherwise uses the vehicle on average, and accounts for driving behavior of each driver within the household.

Machine Learning

As discussed above, a processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data (such as telematics data; autonomous vehicle system, feature, or sensor data; autonomous vehicle system control signal data; vehicle-mounted sensor data; mobile device sensor data; and/or image or radar data) in order to facilitate making predictions for subsequent data (again, such as telematics data; autonomous vehicle system, feature, or sensor data; autonomous vehicle system control signal data; vehicle-mounted sensor data; mobile device sensor data; and/or image or radar data). Models may be created based upon example inputs of data in order to make valid and reliable predictions for novel inputs.

Additionally or alternatively, the machine learning programs may be trained by inputting sample data sets or certain data into the programs, such as autonomous system sensor and/or vehicle-mounted, smart infrastructure, or mobile device sensor data, and other data discuss herein. The machine learning programs may utilize deep learning algorithms are primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the sensed items, such as driving behaviors or vehicle operation, generated by one or more sensors, and under what conditions those items were encountered.

Additionally, the machine learning programs may be trained with autonomous system data, autonomous sensor data, and/or vehicle-mounted or mobile device sensor data to identify actions taken by the autonomous vehicle before, during, and/or after vehicle collisions; identify who was behind the wheel of the vehicle (whether actively driving, or riding along as the autonomous vehicle autonomously drove); identify actions taken by the human driver and/or autonomous system, and under what (road, traffic, congestion, or weather) conditions those actions were directed by the autonomous vehicle or the human driver; identify damage (or the extent of damage) to insurable vehicles after an insurance-related event or vehicle collision; and/or generate proposed insurance claims for insureds after an insurance-related event.

Additional Considerations

With the foregoing, an insurance customer may opt-in to a rewards, insurance discount, or other type of program. After the insurance customer provides their permission or affirmative consent, an insurance provider telematics application and/or remote server may collect telematics and/or other data (including image or audio data) associated with insured assets, including before, during, and/or after an insurance-related event or vehicle collision. In return, risk averse drivers, and/or vehicle owners may receive discounts or insurance cost savings related to auto, home, life, and other types of insurance from the insurance provider.

In one aspect, telematics data, and/or other data, including the types of data discussed elsewhere herein, may be collected or received by an insured's mobile device or smart vehicle, a Telematics Application running thereon, and/or an insurance provider remote server, such as via direct or indirect wireless communication or data transmission from a Telematics Application ("App") running on the insured's mobile device or smart vehicle, after the insured or customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk driving behavior and/or technology that mitigates or prevents risk to (i) insured assets, such as vehicles or even homes, and/or (ii) vehicle operators or passengers.

Although the disclosure provides several examples in terms of two vehicles, two mobile computing devices, two on-board computers, etc., aspects include any suitable number of mobile computing devices, vehicles, etc. For example, aspects include an external computing device receiving telematics data and/or geographic location data from a large number of mobile computing devices (e.g., 100 or more), and issuing alerts to those mobile computing devices in which the alerts are relevant in accordance with the various techniques described herein.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method of providing alerts, the method comprising:
   receiving sensor data from one or more sensors associated with a vehicle, the sensor data defining an electronic vehicle environment, the electronic vehicle environment indicating a vehicle location of the vehicle within the electronic vehicle environment;
   identifying within the electronic vehicle environment, by one or more processors, an electronic pedestrian or cyclist location associated with a pedestrian or cyclist, the electronic pedestrian or cyclist location determined by a mobile device associated with the pedestrian or cyclist;
   determining, by one or more processors, that the pedestrian or cyclist meets predetermined alert criteria based upon the electronic vehicle location and the electronic pedestrian or cyclist location;
   generating, by one or more processors, an alert indicating a presence of the pedestrian or cyclist within the vicinity of the vehicle; and
   presenting the alert on a display screen.

2. The computer-implemented method of claim 1, wherein the identifying the electronic pedestrian or cyclist location within the electronic vehicle environment is further based upon wireless communication between the vehicle and the mobile device associated with the pedestrian or cyclist.

3. The computer-implemented method of claim 1, wherein the identifying the electronic pedestrian or cyclist within the electronic vehicle environment is further based upon global positioning system (GPS) data received via a communication network from GPS-enabled devices associated with the one or more pedestrians or cyclists.

4. The computer-implemented method of claim 1, wherein the identifying the electronic pedestrian or cyclist within the electronic vehicle environment includes determining that the electronic pedestrian or cyclist location is within a threshold distance of the electronic vehicle location within the electronic vehicle environment.

5. The computer-implemented method of claim 1, further comprising:
   determining, by one or more processors, a projected path for the identified pedestrian or cyclist based upon the sensor data, and
   wherein determining that the pedestrian or cyclist meets the predetermined alert criteria includes determining that the projected path of the identified pedestrian or cyclist will pass within an alert threshold distance of the vehicle.

6. The computer-implemented method of claim 5, wherein the alert threshold distance depends upon a speed at which the vehicle is traveling.

7. The computer-implemented method of claim 5, wherein the determining that the pedestrian or cyclist meets the predetermined alert criteria includes determining that the pedestrian or cyclist will be within a roadway when the projected path of the pedestrian or cyclist will pass within the alert threshold distance of the vehicle.

8. The computer-implemented method of claim 1, wherein the determining that the pedestrian or cyclist meets the predetermined alert criteria includes determining that the pedestrian or cyclist will pass the vehicle at a speed exceeding a speed threshold.

9. The computer-implemented method of claim 1, wherein the alert indicates a direction of the pedestrian or cyclist relative to the vehicle.

10. A computer system for providing alerts, the computer system including one or more processors configured to:
    receive, by the one or more processors, sensor data from one or more sensors associated with a vehicle, the sensor data defining an electronic vehicle environment, the electronic vehicle environment indicating a vehicle location of the vehicle within the electronic vehicle environment;
    identify within the electronic vehicle environment, by the one or more processors, an electronic pedestrian or cyclist location associated with a pedestrian or cyclist, the electronic pedestrian or cyclist location determined by a mobile device associated with the pedestrian or cyclist;
    determine, by the one or more processors, that the pedestrian or cyclist meets predetermined alert criteria based upon the electronic vehicle location and the electronic pedestrian or cyclist location;
    determine, by the one or more processors, an alert indicating a presence of the pedestrian or cyclist within the vicinity of the vehicle; and
    transmit, via the one or more processors, the alert, wherein the alert is presented on a display screen.

11. The computer system of claim 10, further comprising a wireless communication transceiver, wherein the identification of the electronic pedestrian or cyclist location within the electronic vehicle environment is further based upon wireless communication received at the wireless communication transceiver from the mobile device associated with the pedestrian or cyclist.

12. The computer system of claim 10, further comprising a wireless communication transceiver, wherein the identification of the electronic pedestrian or cyclist location within the electronic vehicle environment is further based upon global positioning system (GPS) data received at the wireless communication transceiver via a communication network from a GPS-enabled device associated with the pedestrian or cyclist.

13. The computer system of claim 10, wherein the instructions that cause the computer system to identify the electronic pedestrians or cyclist location within the electronic vehicle environment include instructions that cause the computer system to determine that the pedestrian or cyclist is within a threshold distance of the vehicle.

14. The computer system of claim 10, wherein:
    the program memory further stores instructions that cause the computer system to determine a projected path for the identified pedestrian or cyclist based upon the sensor data, and
    wherein the instructions that cause the computer system to determine that the pedestrian or cyclist meets the predetermined alert criteria further include instructions that cause the computer system to determine that the projected path of the pedestrian or cyclist will pass within an alert threshold distance of the vehicle and within a roadway on which the vehicle is operating.

15. The computer system of claim 10, wherein the alert indicates a direction of the pedestrian or cyclist relative to the vehicle.

16. A tangible, non-transitory computer-readable medium storing instructions for providing alerts, that, when executed by one or more processors of a computer system, cause the computer system to:

- receive, by the one or more processors, sensor data from one or more sensors associated with a vehicle, the sensor data defining an electronic vehicle environment, the electronic vehicle environment indicating a vehicle location of the vehicle within the electronic vehicle environment;
- identify within the electronic vehicle environment, by the one or more processors, an electronic pedestrian or cyclist location associated with a pedestrian or cyclist, the electronic pedestrian or cyclist location determined by a mobile device associated with the pedestrian or cyclist;
- determine, by the one or more processors, that the pedestrian or cyclist meets predetermined alert criteria based upon the electronic vehicle location and the electronic pedestrian or cyclist location;
- determine, by the one or more processors, an alert indicating a presence of the pedestrian or cyclist within the vicinity of the vehicle; and
- transmit, via the one or more processors, the alert, wherein the alert is presented on a display screen.

17. The tangible, non-transitory computer-readable medium of claim 16, wherein the identification of the electronic pedestrian or cyclist location within the electronic vehicle environment is further based upon wireless communication between the vehicle and the mobile device associated with the pedestrian or cyclist.

18. The tangible, non-transitory computer-readable medium of claim 16, wherein the identification of the electronic pedestrian or cyclist location within the electronic vehicle environment is further based upon global positioning system (GPS) data received via a communication network from a GPS-enabled device associated with the pedestrian or cyclist.

19. The tangible, non-transitory computer-readable medium of claim 16, wherein the identification of the electronic pedestrian or cyclist location within the electronic vehicle environment includes determining that the pedestrian or cyclist is within a threshold distance of the vehicle.

20. The tangible, non-transitory computer-readable medium of claim 16, wherein the alert indicates a direction of the pedestrian or cyclist relative to the vehicle.

* * * * *